(12) United States Patent
Manyapu et al.

(10) Patent No.: US 12,006,074 B2
(45) Date of Patent: *Jun. 11, 2024

(54) MULTI-USE DUST MITIGATION SYSTEM

(71) Applicant: The Boeing Company, Chicago, IL (US)

(72) Inventors: Kavya K. Manyapu, Friendswood, TX (US); Leora Peltz, Pasadena, CA (US)

(73) Assignee: The Boeing Company, Arlington, VA (US)

( * ) Notice: Subject to any disclaimer, the term of this patent is extended or adjusted under 35 U.S.C. 154(b) by 1617 days.

This patent is subject to a terminal disclaimer.

(21) Appl. No.: 16/030,844

(22) Filed: Jul. 9, 2018

(65) Prior Publication Data

US 2019/0177011 A1 Jun. 13, 2019

Related U.S. Application Data

(63) Continuation-in-part of application No. 15/199,618, filed on Jun. 30, 2016, now Pat. No. 10,016,766.

(Continued)

(51) Int. Cl.
*B64G 6/00* (2006.01)
*B03C 3/017* (2006.01)
(Continued)

(52) U.S. Cl.
CPC ............. *B64G 6/00* (2013.01); *B03C 3/017* (2013.01); *B03C 3/06* (2013.01); *B03C 3/32* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,534,856 A | 8/1985 | Weiss et al. | |
| 7,037,468 B2 * | 5/2006 | Hammerstrom | A61L 2/14 204/164 |

(Continued)

FOREIGN PATENT DOCUMENTS

| | | |
|---|---|---|
| JP | S48-002454 A | 1/1973 |
| KR | 10-1434175 B1 | 8/2014 |
| WO | 2005/045112 A1 | 5/2005 |

OTHER PUBLICATIONS

Nima Afshar-Moharjer et al., "Review of dust transport and mitigation technologies in lunar and Martian atmospheres", Advances in Space Research, vol. 56, 2015, pp. 1222-1241.

(Continued)

*Primary Examiner* — Christopher P Jones
*Assistant Examiner* — Sonji Turner
(74) *Attorney, Agent, or Firm* — McDonnell Boehnen Hulbert & Berghoff LLP

(57) ABSTRACT

Disclosed is a Multi-Use Dust Mitigation System ("MDMS"). The MDMS includes a finger section, a hand section physically attached to the finger section, a fabric-material within both the finger section and hand section, a plurality of conductive-fibers within the fabric-material, and a plurality of input-nodes approximately adjacent to the fabric-material. The fabric-material includes a front-surface and a back-surface. The plurality of conductive-fibers are approximately parallel along the fabric-material and are approximately adjacent to the front-surface of the fabric-material. The plurality of input-nodes are in signal communication with the plurality of conductive-fibers and configured to receive an alternating-current ("AC") voltage-signal from an input-signal-source and the plurality of conductive-fibers are configured to generate an electric-field on the front-surface of the fabric-material in response to the plu- (Continued)

rality of input-nodes receiving the AC voltage-signal from the input-signal-source.

25 Claims, 31 Drawing Sheets

Related U.S. Application Data

(60) Provisional application No. 62/312,931, filed on Mar. 24, 2016.

(51) Int. Cl.
| | | |
|---|---|---|
| B03C 3/06 | (2006.01) | |
| B03C 3/32 | (2006.01) | |
| B03C 3/47 | (2006.01) | |
| B03C 3/60 | (2006.01) | |
| B03C 3/66 | (2006.01) | |
| B08B 7/02 | (2006.01) | |
| D03D 1/00 | (2006.01) | |
| D03D 15/533 | (2021.01) | |
| H01B 1/04 | (2006.01) | |
| H01B 3/50 | (2006.01) | |
| H01B 5/06 | (2006.01) | |
| B08B 7/00 | (2006.01) | |
| B08B 17/02 | (2006.01) | |

(52) U.S. Cl.
CPC ............... *B03C 3/47* (2013.01); *B03C 3/60* (2013.01); *B03C 3/66* (2013.01); *B08B 7/02* (2013.01); *D03D 1/0088* (2013.01); *D03D 15/533* (2021.01); *H01B 1/04* (2013.01); *H01B 3/50* (2013.01); *H01B 5/06* (2013.01); *B08B 7/0028* (2013.01); *B08B 17/02* (2013.01); *D10B 2401/18* (2013.01)

(56) References Cited

U.S. PATENT DOCUMENTS

| | | | | |
|---|---|---|---|---|
| 8,009,409 | B2* | 8/2011 | Reynolds | H01G 9/058 361/502 |
| 8,513,531 | B2* | 8/2013 | Trigwell | H01L 31/022466 174/254 |
| 8,978,187 | B2* | 3/2015 | Maxik | B08B 17/02 15/1.51 |
| 9,757,735 | B2* | 9/2017 | Wang | B03C 1/30 |
| 2003/0164095 | A1* | 9/2003 | Joannou | B03C 3/09 96/59 |
| 2004/0055632 | A1 | 3/2004 | Mazumder et al. | |
| 2008/0060101 | A1 | 3/2008 | Cadogan | |
| 2013/0263393 | A1 | 10/2013 | Mazumder | |
| 2013/0298399 | A1* | 11/2013 | Trigwell | H01L 31/022466 29/846 |
| 2017/0274390 | A1 | 9/2017 | Manyapu et al. | |

OTHER PUBLICATIONS

Kavya K. Manyapu et al., "Investigating the Feasibility of Utilizing Carbon Nanotube Fibers for Spacesuit Dust Mitigation", 46th International Conference on Environment Systems, Jul. 10-14, 2016, Vienna, Austria, available from https://ntrs.nasa.gov/archive/nasa/casi.ntrs.nasa.gov/20160008971.pdf [accessed Aug. 29, 2010].
Combined Search and Examination Report prepared by the United Kingdom Intellectual Property Office in application humber GB 1911053.5 dated Sep. 2, 2019.
Combined Search and Examination Report under Sections 17 and 18(3) prepared by the Intellectual Property Office of the United Kingdom in application No. GB 2003446.8 dated Jun. 25, 2020.
Kawamoto et al., "Electrostatic Cleaning System for Removing Lunar Dust Adhering to Space Suits", Journal of Aerospace Engineering, vol. 24, No. 4, Oct. 1, 2011, pp. 442-444.
Calle, et al. "Particle Removal of Electrostatic and Dieletrophoretic Forces for Dust Control During Lunar Exploration Missions", Journal of Electrostatics, vol. 67, No. 2-3, May 1, 2009.
Qixia et al., "Mechanism of Dust Removal by a Standing Wave Electric Curtain", Science China Physics, Mechanics and Astronmy, vol. 55, No. 6, Jun. 2012, pp. 1018-1025.
Atten, et al. "Study of Dust Removal by Standing Wave Electric Curtain for Application to Solar Cells on Mars", Conference Record of the 2005 IEEE Industry Applications Conference Fortieth IAS Meeting, IEEE Cat. vol. 1, Oct. 2, 2005, pp. 334-340.
Extended European Search Report prepared by the European Patent Office in application No. 19 18 5161.7 dated Dec. 2, 2019.
Decision of Rejection issued by the Japanese Patent Office in application No. 2017-048548, dated Sep. 28, 2021.
Examination Report under Section 18(3) for GB Application No. 1703683.1 from the Intellectual Property Office—United Kingdom; dated Mar. 11, 2019, 3 pages.
Notice of Reasons for Rejection issued by the Japanese Patent Office in application No. 2017-048548, dated Mar. 30, 2021.
Kawamoto, "Mitigation of lunar dust adhered to mechanical parts of equipment used for lunar exploration", Journal of Electrostatics, vol. 69, No. 4, Aug. 2011, pp. 365-369.
Kawamoto, "Electrostatic Cleaning Device for Removing Lunar Dust Adhered to Spacesuits", Journal of Aerospace Engineering, vol. 25, No. 3, Jul. 2012, pp. 470-473.
Kawamoto, "Dynamics of Electromagnetic Particles and Application for Space Technology", Journal of the Institute of Electrostatics Japan, Dec. 10, 2012, vol. 36, No. 6, p. 326-331.
English translation of Notice of Reasons for Rejection prepared by the Japanese Patent Office in Application No. 2019-126602 dated Sep. 5, 2023.

\* cited by examiner

MULTI-USE DUST MITIGATION SYSTEM

CROSS-REFERENCE TO RELATED APPLICATION AND CLAIM OF PRIORITY

The present patent application claims priority under 35 U.S.C. § 120 to the earlier filed U.S. patent application Ser. No. 15/199,618, filed on Jun. 30, 2016, and titled "Dust Mitigation System Utilizing Conductive Fibers," now issued as U.S. patent Ser. No. 10/016,777 dated Jul. 10, 2018, and 35 U.S.C. § 119(e) to earlier filed U.S. provisional patent application No. 62/312,931, filed on Mar. 24, 2016, and titled "Dust Mitigation System Utilizing Carbon Nanotube Fibers," which are both hereby incorporated herein by reference in their entireties.

BACKGROUND

1. Field

The present disclosure relates to dust mitigation, and more, particularly to a dust mitigation system utilizing conductive-fibers.

2. Related Art

Exploration activities preformed on the Moon by both humans and robotic spacecraft occur on a planetary surface that is comprised of unconsolidated fragmental rock material known as the lunar regolith. The lunar surface is covered by several layers of thick regolith formed by high-velocity micrometeoroid impacts, and is characterized by the steady bombardment of charged atomic particles from the sun and the stars. The lunar regolith includes rock fragments and, predominantly, much smaller particles that are generally referred to as lunar soil. From the time of their first interactions with the lunar soil, the NASA Apollo astronauts reported that the lunar soil contained abundant small particles, which have been referred to as "lunar dust" (or just "dust"). This dust had caused several anomalies during the Apollo missions because of the lunar dust's strong tendency to collect on, adhere to, or otherwise contaminate the surface of equipment that were utilized in extravehicular activity ("EVA") operations. Today, lunar dust is formally defined as "lunar soil" particles that are smaller than 20 µm in diameter; however for the purposes of this disclosure the term "lunar dust," "lunar soil," or "dust" may be utilized interchangeably.

Additionally, the Apollo mission also exposed the ability of lunar dust to rapidly degrade spacesuits and impact the mission operations. As an example, the Apollo technical crew debriefings and post-mission reports include numerous references by the Apollo crews to the effects of lunar dust on a range of systems and crew activities during lunar surface operations. Among the EVA systems that were mentioned frequently by the crews in relation to possible lunar dust effects were the Apollo spacesuits that were worn during lunar surface operations. These effects included: 1) dust adhering and damaging spacesuit fabrics and system 2) mechanical problems associated to lunar dust that included problems with fittings and abrasion of suit layers causing suit pressure decay 3) vision obscuration; 4) false instrument readings due to dust clogging sensor inlets; 5) dust coating and contamination causing thermal control problems; 6) loss of traction; 7) clogging of joint mechanisms; 8) abrasion; 9) seal failures; and 10) inhalation and irritation.

As an example, in FIG. 1 an image is shown of a NASA astronaut 100 during the Apollo 17 mission weaver a lunar dust 102 coated spacesuit 104 after an EVA operation. Similarly, in FIG. 2 an image of a spacesuit 200 is shown with a hole (or rip) 202 in the knee section of the spacesuit 200 that was caused by abrasion due to the lunar dust. As such, there is a need for a system and method to mitigate (i.e., remove or minimize) dust prior to sending humans back to either the lunar surface or other similar planetary surface. Moreover, there is also a need for to mitigate dust on Earth because of dust exposed systems such as, for example, flexible solar panels and other flexible systems that may be clogged by dust.

At present, attempted solutions have proposed the utilization of both active and passive methods that have been mostly limited to utilization on rigid surfaces such as solar panels, optical planes, glass structures and thermal radiators. Unfortunately, applying these technologies for spacesuit dust removal have remained a challenge due to the complexity of spacesuit design that includes irregular contours of the spacesuit, flexible structure of the soft areas of the spacesuit and polytretrafluroethylene (as an example, TEFLON® produced by The Chemours Company of Wilmington, Delaware) coated spacesuit material. As such, there is also a need for a system and method for mitigating dust that is compatible with existing fabric-materials for utilization in a spacesuit (for example ortho-fabric or emerging new flexible materials) or other devices/systems utilizing fabric-materials such as, for example, space habitats, inflatable structures, flexible and/or deployable antennas, and flexible solar panels.

SUMMARY

A Multi-use Dust Mitigation System ("MDMS") is disclosed. The MDMS includes a finger section, a hand section physically attached to the finger section, a fabric-material within both the finger section and hand section, a plurality of conductive-fibers within the fabric-material, and a plurality of input-nodes approximately adjacent to the fabric-material. The fabric-material includes a front-surface and a back-surface. The plurality of conductive-fibers are approximately parallel along the fabric-material and are approximately adjacent to the front-surface of the fabric-material. The plurality of input-nodes are in signal communication with the plurality of conductive-fibers and configured to receive an alternating-current ("AC") voltage-signal from an input-signal-source and the plurality of conductive-fibers are configured to generate an electric-field on the front-surface of the fabric-material in response to the plurality of input-nodes receiving the AC voltage-signal from the input-signal-source.

In an example of operation, the MDMS performs a method for dust mitigation that includes receiving the AC voltage-signal from the input-signal-source at the plurality of input-nodes, generating the electric-field on the front-surface of the fabric-material with the plurality of conductive-fibers, and generating a traveling-wave, from the electric-field, that travels along the front-surface of the fabric-material in a second direction that is approximately transverse to a first direction of the along the fabric-material.

As another example of operation, the MDMS also performs a method for particle collection that includes receiving the AC voltage-signal from the input-signal-source at the plurality of input-nodes, generating the electric-field on the front-surface of the fabric-material with the plurality of conductive-fibers, and generating a standing-wave, from the electric-field, along the front-surface of the fabric-material to capture a plurality of particles.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The disclosure can be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

Figure 1:
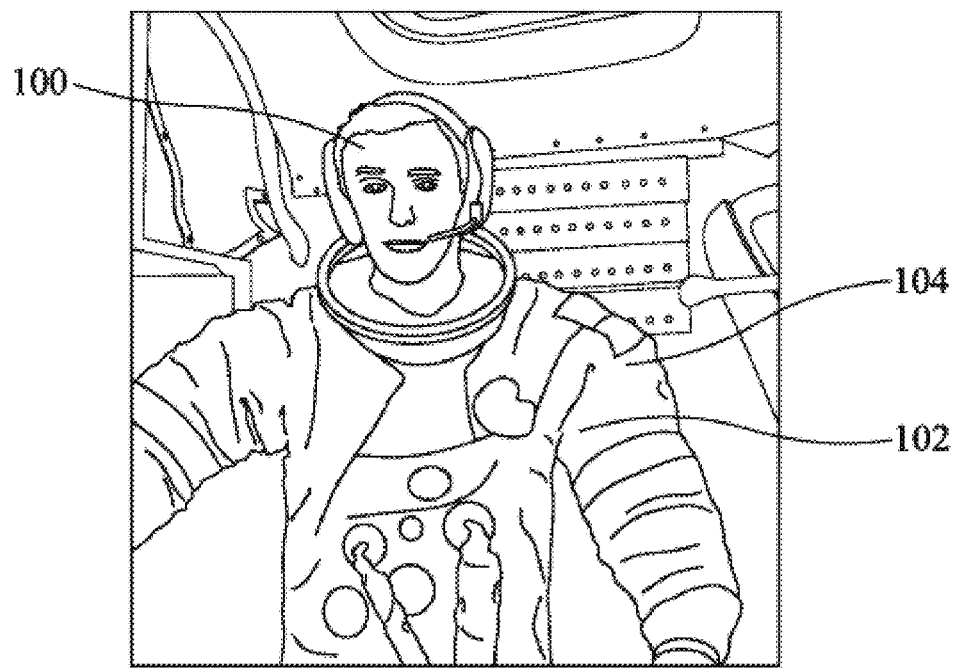
FIG. 1 is an image of a NASA astronaut having a spacesuit contaminated with lunar dust after an EVA operation.
Figure 2:
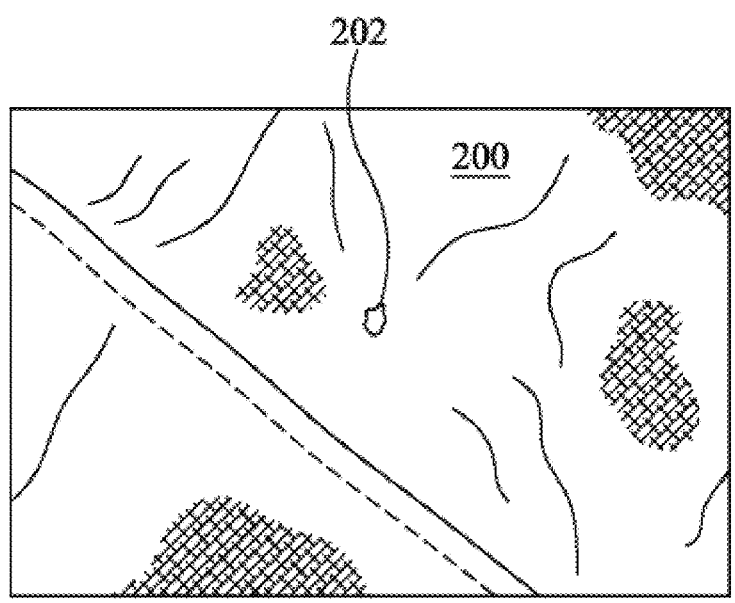
FIG. 2 is an image of a spacesuit with a hole in the knee section of the spacesuit that was caused by abrasion due the lunar dust.

Disclosed is a Multi-Use Dust Mitigation System ("MDMS"). The MDMS includes a finger section, a hand section physically attached to the finger section, a fabric-material within both the finger section and hand section, a plurality of conductive-fibers within the fabric-material, and a plurality of input-nodes approximately adjacent to the fabric-material. The fabric-material includes a front-surface and a back-surface. The plurality of conductive-fibers are approximately parallel along the fabric-material and are approximately adjacent to the front-surface of the fabric-material. The plurality of input-nodes are in signal communication with the plurality of conductive-fibers and configured to receive an alternating-current ("AC") voltage-signal from an input-signal-source and the plurality of conductive-fibers are configured to generate an electric-field on the front-surface of the fabric-material in response to the plurality of input-nodes receiving the AC voltage-signal from the input-signal-source.

In an example of operation, the MDMS performs a method for dust mitigation that includes receiving the AC voltage-signal from the input-signal-source at the plurality of input-nodes, generating the electric-field on the front-surface of the fabric-material with the plurality of conductive-fibers, and generating a traveling-wave, from the electric-field, that travels along the front-surface of the fabric-material in a second direction that is approximately transverse to a first direction of the along the fabric-material.

As another example of operation, the MDMS also performs a method for particle collection that includes receiving the AC voltage-signal from the input-signal-source at the plurality of input-nodes, generating the electric-field on the front-surface of the fabric-material with the plurality of conductive-fibers, and generating a standing-wave, from the electric-field, along the front-surface of the fabric-material to capture a plurality of particles.

In one example of an implementation, the MDMS implements an electrodynamic dust shield ("EDS") with active electrodes into a spacesuit, glove, mitt, or other device or systems (such as flexible space habitats, deployable structures, etc.) that utilizes fabric-materials or other flexible-materials by utilizing the conductive-fibers as electrodes. In this example, the active electrodes are conductive-fibers that can be carbon-nanotube ("CNT") fibers which are flexible electrically conductive-fibers. Generally, EDS technology utilizes electrostatic and/or electrodynamic and/or dielectrophoretic forces to repel dust particles from approaching the surface, and/or carry deposited dust particles off the surface of a material. Repelling of dust particles is accomplished by creating electric fields that levitate the approaching dust particles away from the surface. Deposited dust particles are carried away by breaking the adhesive forces between the dust and the surface due to electrostatics or Van der Waal forces and then levitate the dust away from the surface of the material. The magnitude of the forces repelling, levitating and carrying away dust particles depends on the dielectric properties of the dust particles, the substrate (in this case flexible structures), the size of the dust particles, and the characteristics of the input AC voltage-signals applied. As an example utilizing the MDMS, typical electrodynamic forces required to repel dust particles with sizes between about 10 micrometers ("μm") to 75 μm can be generated by applying AC voltage-signals in the range of approximately 800 volts ("V") to 1,200V utilizing approximately 180 μm to 200 μm thick uninsulated CNT fibers spaced between approximately 1.2 millimeters ("mm") to 2.0 mm apart.

In this example, the MDMS includes a fabric-material having a top-surface where a portion of the top-surface (also herein referred to as a "shield" having a "shield area" associated with the portion of the top-surface) includes a series (i.e., a plurality) of approximately parallel or slightly divergent (for example with a divergence of approximately 15 to 20 degrees) conductive-fibers through, which an AC voltage-signal of high voltage (for example, approximately 800V to 1,200V at a frequency between approximately 5 to 100 Hertz) is applied resulting in the generation of a traveling-wave of electric-field along the shield.

Each conductive-fiber of the plurality of conductive-fibers can be positioned approximately parallel or slightly divergent to adjacent conductive-fibers. Additionally, the surface of the fabric material can be partitioned into different sections, where each section of the fabric-material can be configured to have different conductive-fiber patterns that are not parallel to other sections of the shield. For example, the shield can include sections that are at angles up to approximately 90 degrees from other sections of the shield. The position and spacing of the plurality of conductive-fibers depends upon the application and enables re-configurability of the traveling-wave of the electric-field along the shield. In this example, the resulting traveling-wave of the electric-field repels the dust particles on the shield and the repelled dust particles travel in a direction that is along or against the direction of the travelling-wave, depending on the dielectric properties of the dust particles and the charges (and induced charges) on the dust particles. This approach also prevents further accumulation of dust particles on the shield and removes most charged dust particles from the shield. In general, the conductive-fibers can either be excited by utilizing single-phase or multi-phase AC voltage-signals or direct current ("DC") voltage-signals produced by an input-signal-source that can be a multi-phase signal source.

In general, the MDMS may be configured to operate in multiple ways that include, for example, an initial configuration of the MDMS at fabrication and/or a reconfiguration of the MDMS after the activation of the MDMS during operation. Specifically, as an example, when fabricating the MDMS on a device (such as, for example, a spacesuit, glove, mitt, space habitat, inflatable structures, fabric-based antenna, blanket, flexible material devices, or other similar systems, devices, or components), the orientation of the conductive-fibers may be designed and configured to allow for various contours, flexibility, or both of the fabric-material in which the MDMS is implemented so as to optimize the dust repelling properties of the MDMS. Additionally, the type of fabric-material may be chosen to have electrical and mechanical properties that optimize the operation of the MDMS. As an example, the configuration of both the placement and geometric alignment of the conductive-fibers within the fabric-material and the optimization of the surface properties of the fabric or flexible material are directly related to the physical robustness and dust repelling (i.e., dust mitigation) performance of the MDMS.

Additionally, as a reconfiguration during operation example, the MDMS can include feedback controlled electronics (described later in relation to FIGS. 26 to 28), electromechanical devices, or both within (or associated with) the fabric-material or flexible-material that receive inputs from sensors associated with or within the shield area of either the fabric-material or flexible-material. Examples of the sensors can include optical or capacitive sensors that may be located on, or within, the shield area of the fabric-material or flexible-material or somewhere remote from the shield area but associated with the fabric-material or flexible-material shield area. As such, these sensors can be local sensors within the shield area embedded within the fabric-material or flexible-material, the conductive-fibers themselves, or both. Additionally, the sensors can be remote sensors that are located remote from the shield areas such as, for example, sensors located at different areas of a spacesuit or other devices or systems associated with the MDMS at the shield area. As a further example, some of these sensors may be completely remote from the shield areas such as sensors on a weather satellite (or satellites) that provide dust data to the MDMS for adjusting the operation of the MDMS to better optimize dust mitigation on the shield.

In all of these sensor examples, the sensors provide sensor output signals (which are information signals having sensor data information that was produced by the individual sensors) to a MDMS controller of the MDMS. The MDMS controller is configured to vary the waveforms and frequencies of the AC voltage-signals provided to the conductive-fibers based on the received sensor output signals so as to optimize the dust mitigation properties of the MDMS. The MDMS controller can be in signal communication with the input-signal-source and capable of fixing or adjusting the individual AC voltage-signals produced by the input-signal-source in voltage, frequency, and phase in response to the received sensor output signals. In this example, the MDMS controller can be any general electronic controller that may include a microcontroller, a central processing unit ("CPU") based processor, digital signal processor ("DSP"), an application specific integrated circuit ("ASIC"), field-programmable gate array ("FPGA"), or other similar device or system.

In addition to sensors, the MDMS can also include a plurality of actuators that may be located on the back-surface of the fabric-material or flexible material below the shield area. These actuators can be electromechanical devices capable of moving, shaking, vibrating, or performing other types of mechanical work that assists in dislodging, moving, and repelling dust particles on the shield. The actuators are in signal communication with the MDMS controller and the MDMS controller is also configured to control the operation of the actuators based on the received sensor output signals so as to optimize the dust mitigation properties of the MDMS at the shield. Utilizing the sensors, actuators, or both, the MDMS controller is configured to adjust the AC voltage-signals from input-signal-source to optimize the dust mitigation of the MDMS based on the properties of the fabric-material or flexible-material (e.g., the layers, coatings, dielectric properties, etc.) and the dust (e.g., the size, mass, dielectric proprieties, distribution, etc.). As such, the MDMS controller is configured to vary the AC voltage-signals to adjust the mode of operation of the MDMS.

As an example in a first mode of operation (i.e., a dynamic dust movement mode), a first optimized AC voltage-signal having a first waveform and first frequency value can be utilized by the MDMS to repel dust before the dust settles on the shield of the fabric-material. Alternatively, as an example of a second mode of operation where static dust has settled (i.e., shield is predisposed to dust prior to activation of MDMS) on the shield of the fabric-material, a second optimized AC voltage-signal having a second waveform and second frequency value can be utilized by the MDMS to repel dust that has settled on the shield of fabric-material.

For example, if the MDMS is active prior to the dust settling on the shield, about 90 percent or more of the dust is repelled utilizing a lower voltage AC voltage-signal (e.g., approximately 800V to 900V), while alternatively if the dust has already settled on the shield prior to activating the MDMS, the MDMS will need to utilize a higher voltage AC voltage-signal (e.g., approximately 1,000V to 1,200V) to repel the dust from the shield. Additionally, once the dust has settled on the shield, the MDMS may need to utilize AC voltage-signals with higher spectral bandwidths that can be up to approximately 200 Hz to dislodge the settled dust from the shield. In these examples, the MDMS controller can utilize a lookup database on a storage unit (i.e., a memory unit or module) to determine the type of AC voltage-signal (i.e., the type of signal waveform, frequency, voltage, phase, etc.) to utilize or adjust in the MDMS to dislodge, repel, or both, the dust that is settling or settled on the shield based on input data from sensors that can provide the status of dust contamination on the shield. The lookup database can include values based on the sensors or other sources that are in signal communication with the MDMS. The storage unit can be part of the MDMS or remote but in signal communication with the MDMS. As an example, the location of the driving and control electronics that generate the AC voltage-signals (such as, for example, the input-signal source) that are passed to the conductive-fibers within the fabric-material can be locally embedded in the fabric-material, centrally located and/or remote from the MDMS, or co-located with the MDMS and the rest of the device that the MDMS is implemented on such as, for example, the systems and electronics of a spacesuit. In this example, a DC voltage-signal can also be utilized to dislodge dust particles that can be stuck on the shield. In this example, a DC voltage-signal can be initially applied prior to utilizing the low voltage AC voltage-signal.

In another example of an implementation, the MDMS also implements a particle sorting device ("PSD") or sample collection device ("SCD") with the active electrodes in the spacesuit, glove, mitt, or other device or systems that utilize fabric-materials or other flexible-materials by again utilizing the conductive-fibers as electrodes. In this example, the MDMS can function to clean dust, sort particles, collect samples, and move dust and charged and uncharged particles in a precise manner. In this example, the MDMS may be incorporated into a specialized glove or mitt (or other similar device), having the embedded conductive-fibers within the fabric-material, for cleaning dust contaminated surface (utilizing the dust repellant properties described earlier), for particle sorting, or both.

In this example, the palm side of the glove or mitt and the fingers are embedded with electrodes made of conductive-fibers based yarn (or similar electrically conductive yarns) and insulated yarns at predefined spacing intervals, suitable for applying AC or DC high voltages, or both, in predefined time sequence, for repelling dust and optimized for multi-se (multiple spin-echo) functions of particle sorting. The MDMS based gloves or mitts can be optimized for use as a particle sorting tool, sample collection tool, and other related implementations. In general, the conductive-fibers can have a signal phase signal applied to produce a standing-wave of electric-field along the shield so as to levitate and suspend but not move particles within the electric-field.

In the example of glove or mitt, the MDMS can have a palm section configured for cleaning dust and a finger section configured for sorting or collection particles.

Figure 3:
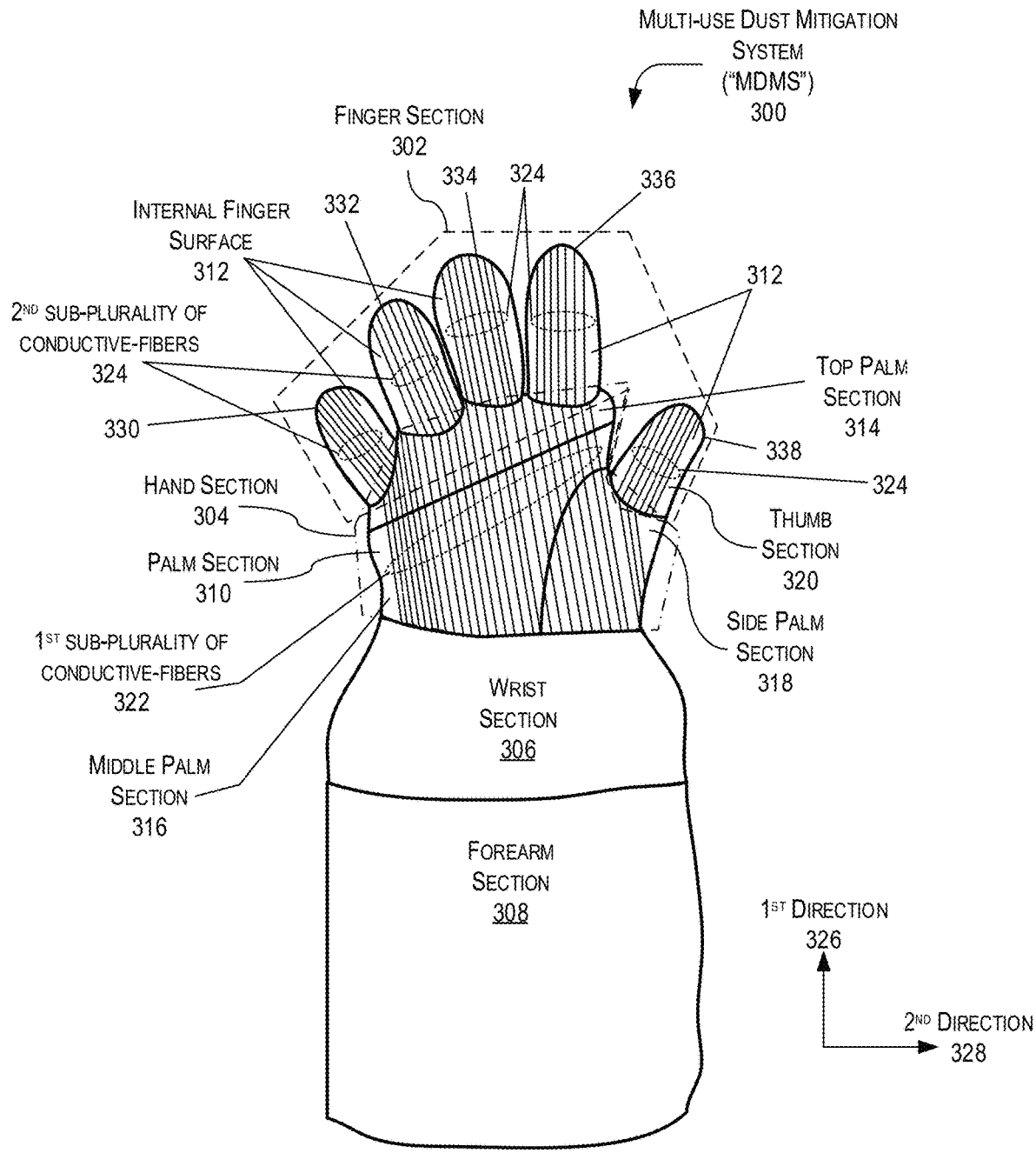
FIG. 3 is a front-side view of an example of an implementation of a Multi-use Dust Mitigation System ("MDMS") in the form of a glove in accordance with the present disclosure.

Specifically, in the example of the MDMS being incorporated into a glove, in FIG. 3, a front-side view of an example of an implementation of a MDMS 300 in the form of a glove is shown in accordance with the present disclosure. The MDMS 300 includes a finger section 302 and a hand section 304 physically attached to the finger section 302. The hand section 304 is also physically attached to a wrist section 306 that is part of a forearm section 308. In this example, the hand section 304 includes a palm section 310 (on the front side of the glove) and an opisthenar (i.e., back of the hand) section (not shown) and the finger section 302 includes an internal finger surface 312 (on the front side of the glove) and an external finger surface (not shown) on the back side of the glove. The finger section 302 includes five finger sub-sections configured to accept five fingers from a user. The palm section 310 can include a top palm section 314, a middle palm section 316, and a side palm section 318 corresponding to the palm sections of human hand, where the middle palm section 316 is located between the top palm section 314 and side palm section 318. The top palm section 314 is located between the middle palm section 316 and the finger section 302 and the side palm section 318 is located between the middle palm section 316 and a thumb section 320. Similar to a human hand, the top palm section 314, middle palm section 316, and side palm section 318 allow the glove to open and close in the same physical fashion as a human hand.

In this example, the MDMS 300 includes a fabric-material within both the finger section 302 and hand section 304. The wrist section 306 and forearm section 308 can also include the fabric-material. The fabric-material includes a plurality of conductive-fibers which can be optionally located throughout the fabric-material or in specific sections of the fabric-material. For example, a first sub-plurality of conductive-fibers 322 (of the plurality of conductive-fibers) can be located within the fabric-material located in the palm section 310 of the glove as shown in FIG. 3. In this example, the first sub-plurality of conductive-fibers 322 can extend throughout the top palm section 314, middle palm section 316, and side palm section 318. Moreover, the internal finger surface 312 can include a second sub-plurality of conductive fibers 324 of the plurality of conductive-fibers. Furthermore, while not shown in this example, it is appreciated that another sub-plurality of the plurality of conductive fibers (of the plurality of conductive-fibers) can be optionally located in the wrist section 306, forearm section 308, or both.

In this example, the first sub-plurality of conductive-fibers 322 run along the fabric-material within the palm section 310 approximately parallel along a first direction 326 of the glove. The second sub-plurality of conductive-fibers 324 run along the fabric-material, in the finger section 302, in varying directions that are approximately along the first direction 326 when the glove is a resting position. In this example, the second sub-plurality of conductive-fibers 322 includes further sub-portions of the second sub-plurality of conductive-fibers for a first sub-portion 330, second sub-portion 332, third sub-portion 334, fourth sub-portion 336, and fifth sub-portion 338 of the finger section 302. Each of the corresponding sub-portions of the second sub-plurality of conductive-fibers 324 within the first sub-portion 330, second sub-portion 332, third sub-portion 334, fourth sub-portion 336, and fifth sub-portion 338 of the finger section 302 are approximately parallel to each other within the corresponding sub-portion of the finger section 302 and extend from the palm section 310 to the tips (i.e., the ends) of the corresponding sub-portion of the finger section 302. In this example, the first sub-portion 330, second sub-portion 332, third sub-portion 334, fourth sub-portion 336 may be referred to as a first finger section of the finger section 302 and the fifth sub-portion 338 that corresponds to the thumb of the user may be referred to as a second finger section of the finger section 302. The plurality of conductive-fibers can be a plurality of carbon nanotube ("CNT") fibers and the plurality of CNT-fibers can be braided with the fabric-material.

The fabric-material includes a front-surface and a back-surface, where the back-surface is within the glove adjacent to the hand, wrist, and forearm of the user. The front-surface includes the internal finger surface 312, an outer surface of the palm section 310, the external finger surface on the back side of the glove, an outer surface of the opisthenar section, an outer surface of the wrist section 306, and an outer surface of the forearm section 308. In this example, the plurality of conductive-fibers are within the fabric-material along the internal finger surface 312 and the outer surface of the palm section 310 such that the plurality of conductive-fibers are approximately parallel along the fabric-material and are approximately adjacent to the front-surface of the fabric-material, which in this example, the front-surface of the fabric-material includes the internal finger surface 312 and the outer surface of the palm section 310.

The MDMS 300 also includes a plurality of input-nodes (not shown) approximately adjacent to the fabric-material along the back-surface of the fabric-material. The plurality of input-nodes are in signal communication with the plurality of conductive-fibers and configured to receive an AC voltage-signal from an input-signal-source and the plurality of conductive-fibers are configured to generate an electric-field on a portion of the front-surface of the fabric-material in response to the plurality of input-nodes receiving the AC voltage-signal from the input-signal-source. In this example, the portion of the front-surface of the fabric-material can be optionally a first portion of the front-surface of the fabric-material located at the internal finger surface 312, the outer surface of the palm section 310, or both.

In this example, the plurality of conductive-fibers are approximately parallel along the fabric-material in the first direction 326 along the glove. In an example of operation, the plurality of conductive-fibers are configured to generate a traveling-wave, from the electric-field, that travels along the front-surface of the fabric-material in a second direction 328 along the glove that is approximately transverse to the first direction 326. In another example of operation, the plurality of conductive-fibers are configured to generate a standing-wave, from the electric-field, along the front-surface of the fabric-material in the second direction 328 that is also approximately transverse to the first direction 326.

In this example, the first sub-plurality of conductive fibers 322 and second sub-plurality of conductive fibers 324 are configured for cleaning, particle sorting, and sample collection. The MDMS controller is configured to provide a multiphase AC signal to produce with the input-signal-source a traveling-wave, single phase AC signal to produce a standing-wave, variable phase shift signal, or variable voltage waveform.

In other words, the MDMS controller is configured to selectively cause the input-signal-source to produce a single phase AC signal that is transmitted to the plurality of conductive-fibers to generate a standing-wave or cause the input-signal-source to produce a multi-phase signal that is transmitted to the plurality of conductive-fibers to generate a traveling-wave. The MDMS controller is further configured to selectively cause the input-signal-source to produce a variable phase shift in the multi-phase signal, the multi-phase signal with a variable voltage waveform, and the multi-phase signal with a variable phase for individual conductive-fibers within the plurality of conductive-fibers.

As an example of operation, the MDMS controller can configure the palm section 310 and finger section 302 for both the palm section 310 and finger section 302 to clean dust or to clean dust with the palm section 310 and sort particles with the finger section 302. In another example of operation, the MDMS controller can configure the palm section 310 and finger section 302 to clean dust, particle sort, and sample collect. In this example, the MDMS controller reconfigures the electrodes within the MDMS and excites the electrodes with different waveform signals with the input-signal-source. In this example, a portion of the electrodes can be utilized to levitate (i.e., "pick-up") specific particles having specific particle sizes utilizing specific waveform signals from the input-signal-source. The specific particles can be levitated by utilizing a standing-wave pattern on the conductive-fibers that are feed by a waveform signal from the electrodes. As an example, for sample collection, the standing-wave pattern can levitate specific sized particles and then drop them into a collection bin. This is accomplished by utilizing the MDMS controller to turn on (i.e., energizes) the energy to the electrodes to produce the standing-wave pattern on the conductive-fibers that levitates the specific sized particles and then turns off (i.e., de-energizes) the energy to the electrodes to eliminate the standing-wave pattern on the conductive-fibers that drops the specific sized particles into the collection bin. In this example, the heavier the particles that are to be levitated, the more voltage that is needed to drive the electrodes within the MDMS with the exception of polarized particles that can be levitated with a lower diving voltage. For cleaning, the MDMS controller configures the MDMS to receive and the input-signal-source to produces a multi-phase signal.

Moreover, in this example of operation, the spreading the fingers (i.e., first sub-portion 330, second sub-portion 332, third sub-portion 334, fourth sub-portion 336, and fifth sub-portion 338) or shaping the position of the fingers within the finger section 302 optimizes the distribution of the electric field produced within the finger section 302 for a particular task or function. Specifically, pointing the individual fingers concentrates the electric field and when the fingers are closer the finger section 302 produces an intensified electric field that can be utilized for sorting, cleaning, or both of particles of smaller grain sizes. The fingers can also be spread out wider such that the finger section 302 produces an electric field that is capable of cleaning a larger area.

In this example, it is appreciated that while both finger section 302 and palm section 310 may be configured for cleaning, the finger section 302 can be useful for sorting and capturing specific particles of a given size because of the range of motion available (i.e., the movement of the fingers to a closer configuration or the point (i.e., tip) of the fingers). The fingers in the finger section 302 can also be used for capturing particles that are dispersed in a cloud. However, if particles are more distributed on the surface, the palm section 310 can be utilized to cover larger surfaces for cleaning.

Figure 4:
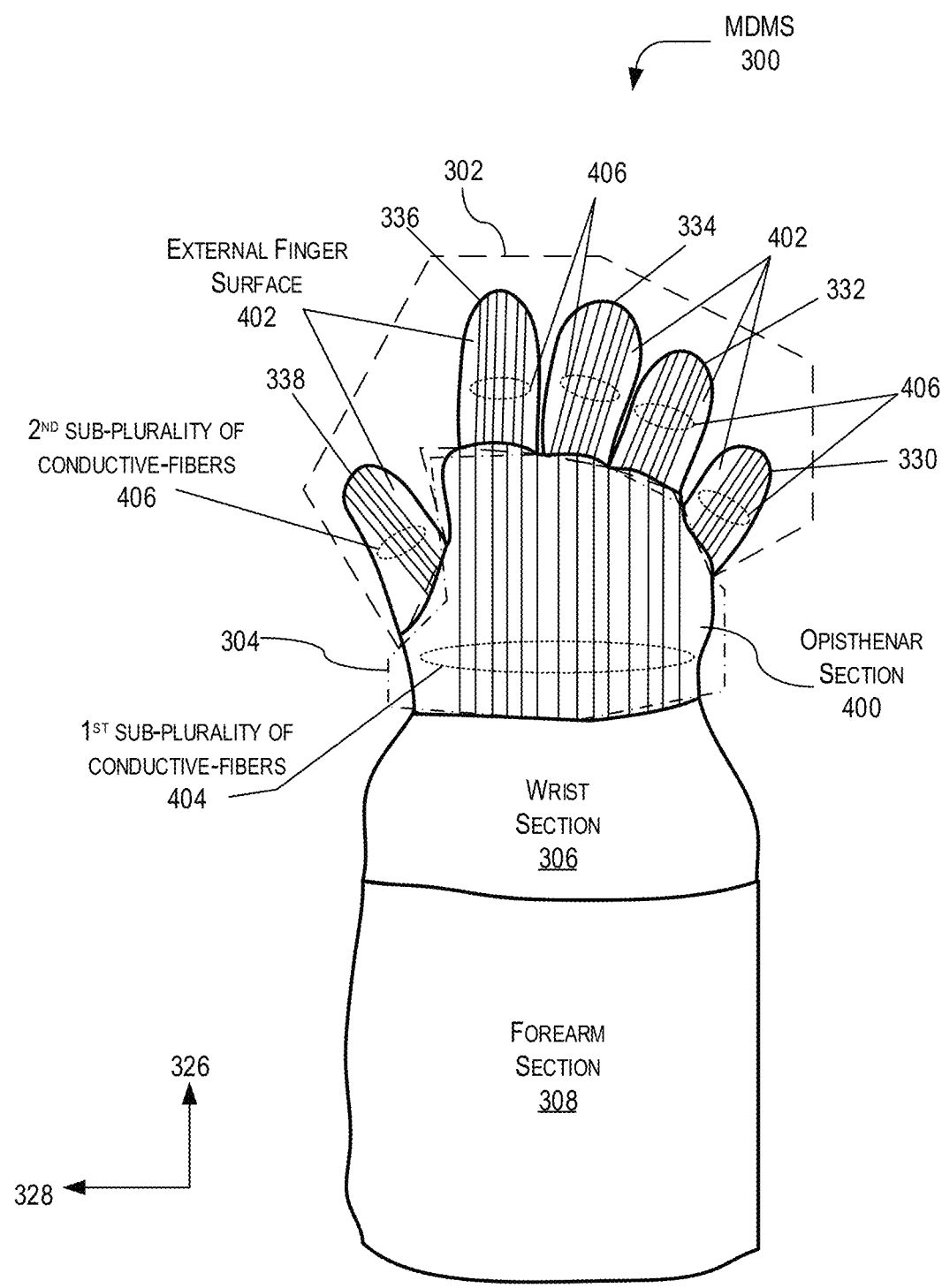
FIG. 4 is a back-side view of the MDMS in the form of the glove (shown in FIG. 3) in accordance with the present disclosure.

In FIG. 4, a back-side view of an example of an implementation of the MDMS 300 is shown in accordance with the present disclosure. In this example, the hand section 304 includes the opisthenar section 400 and the finger section 302 includes the external finger surface 402 on the back side of the glove. Similar to the example shown in FIG. 3, the external finger surface 402 and opisthenar section 400 can also have a plurality of conductive-fibers within the fabric-material. In this example, the hand section 304 within the opisthenar section 400 can include a first sub-plurality of conductive fibers 404 (of the plurality of conductive-fibers) and the finger section 302 can include a second sub-plurality of conductive fibers 406 of the plurality of conductive-fibers.

In this example, the first sub-plurality of conductive-fibers 404 run along the fabric-material within the opisthenar section 400 approximately parallel along the first direction 326. The second sub-plurality of conductive-fibers run along the fabric-material, in the finger section 302, in varying directions that are approximately along the first direction 326 when the glove is a resting position. In this example, the second sub-plurality of conductive-fibers 406 includes further sub-portions of the second sub-plurality of conductive-fibers 406 for the first sub-portion 330, second sub-portion 332, third sub-portion 334, fourth sub-portion 336, and fifth sub-portion 338 of the finger section 302. Each of the corresponding sub-portions of the second sub-plurality of conductive-fibers 406 within the first sub-portion 330, second sub-portion 332, third sub-portion 334, fourth sub-portion 336, and fifth sub-portion 338 of the finger section 302 are approximately parallel to each other within the corresponding sub-portion of the finger section 302 and extend from the opisthenar section 400 to the tips of the corresponding sub-portion of the finger section 302. As discussed earlier, in this example, the first sub-portion 330, second sub-portion 332, third sub-portion 334, fourth sub-portion 336 are part of the first finger section of the finger section 302 and the fifth sub-portion 338 that corresponds to the thumb of the user is part of the second finger section of the finger section 302.

It is appreciated that based on the examples shown in FIGS. 3 and 4, the plurality of conductive-fibers within the fabric-material can be located in the palm section 310 and internal finger surface 312, opisthenar section 400 and external finger surface 402, or both the palm section 310 and internal finger surface 312 and opisthenar section 400 and external finger surface 402. Moreover, while not shown in this example, it is appreciated that another sub-plurality of the plurality of conductive fibers (of the plurality of conductive-fibers) can be optionally located in the wrist section 306, forearm section 308, or both.

Similar to the example described in regards to the front side of the glove in regards to FIG. 3, in this example, the first sub-plurality of conductive fibers 404 and second sub-plurality of conductive fibers 406 can also be configured for cleaning, particle sorting, and sample collection. Again, the MDMS controller is configured to provide a multiphase AC signal to produce with the input-signal-source a traveling-wave, single phase AC signal to produce a standing-wave, variable phase shift signal, or variable voltage waveform.

Figure 5:
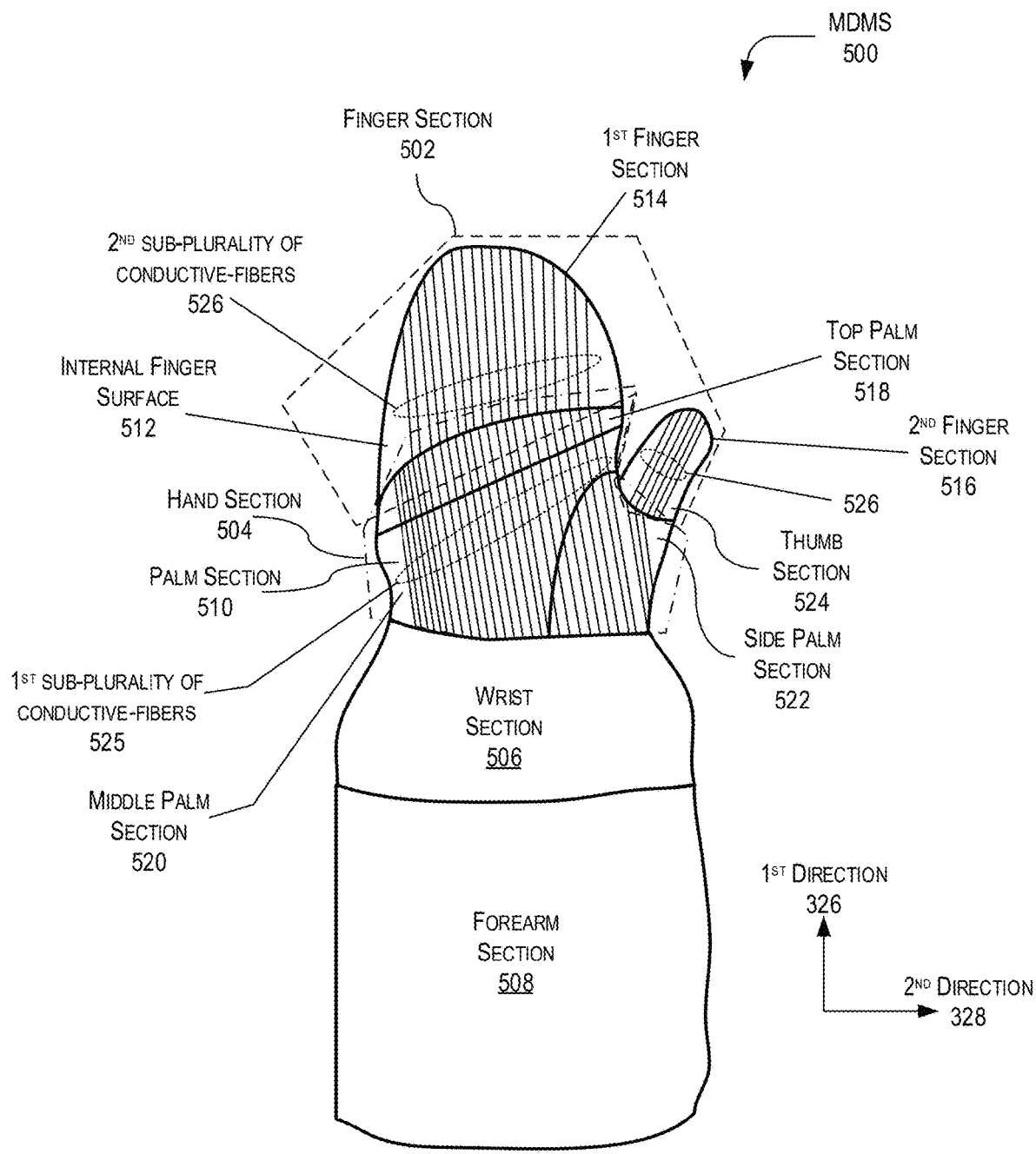
FIG. 5 is a front-side view of another example of an implementation of a MDMS in the form of a mitt in accordance with the present disclosure.

Turning to FIG. 5, a front-side view of another example of an implementation of a MDMS 500 in the form of a mitt is shown in accordance with the present disclosure. The MDMS 500 includes a finger section 502 and a hand section 504 physically attached to the finger section 502. The hand section 504 is also physically attached to a wrist section 506 that includes a forearm section 508. In this example, the hand section 504 includes a palm section 510 (on the front side of the mitt) and an opisthenar section (not shown) and the finger section 502 includes an internal finger surface 512 (on the front side of the mitt) and an external finger surface (not shown) on the back side of the mitt. The finger section 502 includes a first finger section 514 configured to accept four fingers from a user and a second finger section 516 configured to accept a thumb from the user. The palm section 510 can include a top palm section 518, a middle palm section 520, and a side palm section 522 corresponding to the palm sections of human hand, where the middle palm section 520 is located between the top palm section 518 and side palm section 522. The top palm section 518 is located between the middle palm section 520 and the finger section 502 and the side palm section 522 is located between the middle palm section 520 and a thumb section 524. Similar to a human hand, the top palm section 518, middle palm section 520, and side palm section 522 allow the mitt to open and close in the same physical fashion as a human hand.

In this example, the MDMS 500 includes a fabric-material within both the finger section 502 and hand section 504. The wrist section 506 and forearm section 508 can also include the fabric-material. As described earlier, the fabric-material includes a plurality of conductive-fibers which can be optionally located throughout the fabric-material or in specific sections of the fabric-material. For example, a first sub-plurality of conductive-fibers 525 (of the plurality of conductive-fibers) can be located within the fabric-material located in the palm section 510 of the mitt as shown in FIG. 5. In this example, the first sub-plurality of conductive-fibers 525 can extend throughout the top palm section 518, middle palm section 520, and side palm section 522. Moreover, the internal finger surface 512 can include a second sub-plurality of conductive-fibers 526 (of the plurality of conductive-fibers).

In this example, the first sub-plurality of conductive-fibers 525 run along the fabric-material within the palm section 510 approximately parallel along the first direction 326. The second sub-plurality of conductive-fibers 526 run along the fabric-material, in the finger section 502, in directions that are approximately along the first direction 326 along the mitt when the mitt is a resting position and extend from the palm section 510 to the tips of the first finger section 514 and second finger section 516 of the finger section 502. Again, the plurality of conductive-fibers can be a plurality of CNT fibers and the plurality of CNT-fibers can be braided with the fabric-material.

The fabric-material again includes a front-surface and a back-surface, where the back-surface is within the mitt adjacent to the hand, wrist, and forearm of the user. The front-surface includes the internal finger surface 512, an outer surface of the palm section 510, the external finger surface on the back side of the mitt, an outer surface of the opisthenar section, an outer surface of the wrist section 506, and an outer surface of the forearm section 508. In this example, the plurality of conductive-fibers are within the fabric-material along the inner finger surface 512 and the outer surface of the palm section 510 such that the plurality of conductive-fibers are approximately parallel along the fabric-material and are approximately adjacent to the front-surface of the fabric-material, which in this example the front-surface of the fabric-material includes the inner finger surface 512 and the outer surface of the palm section 510.

As described earlier, the MDMS 500 also includes a plurality of input-nodes (not shown) approximately adjacent to the fabric-material along the back-surface of the fabric-material. The plurality of input-nodes are in signal communication with the plurality of conductive-fibers and configured to receive an AC voltage-signal from an input-signal-source and the plurality of conductive-fibers are configured to generate an electric-field on a portion of the front-surface of the fabric-material in response to the plurality of input-nodes receiving the AC voltage-signal from the input-signal-source. In this example, the portion of the front-surface of the fabric-material can be optionally a first portion of the front-surface of the fabric-material located at the internal finger surface 512, the outer surface of the palm section 510, or both.

In this example, the plurality of conductive-fibers are approximately parallel along the fabric-material in the first direction 326. In an example of operation, the plurality of conductive-fibers are configured to generate a traveling-wave, from the electric-field, that travels along the front-surface of the fabric-material in the second direction 328 along the mitt that is approximately transverse to the first direction 326. In another example of operation, the plurality of conductive-fibers are configured to generate a standing-wave, from the electric-field, along the front-surface of the fabric-material in the second direction 328 that is also approximately transverse to the first direction 326.

Similar to the example described in regards to the front side of the glove in regards to FIG. 3, in this example, the first sub-plurality of conductive fibers 525 and second sub-plurality of conductive fibers 526 can also be configured for cleaning, particle sorting, and sample collection. Again, the MDMS controller is configured to provide a multiphase AC signal to produce with the input-signal-source a traveling-wave, single phase AC signal to produce a standing-wave, variable phase shift signal, or variable voltage waveform.

Figure 6:
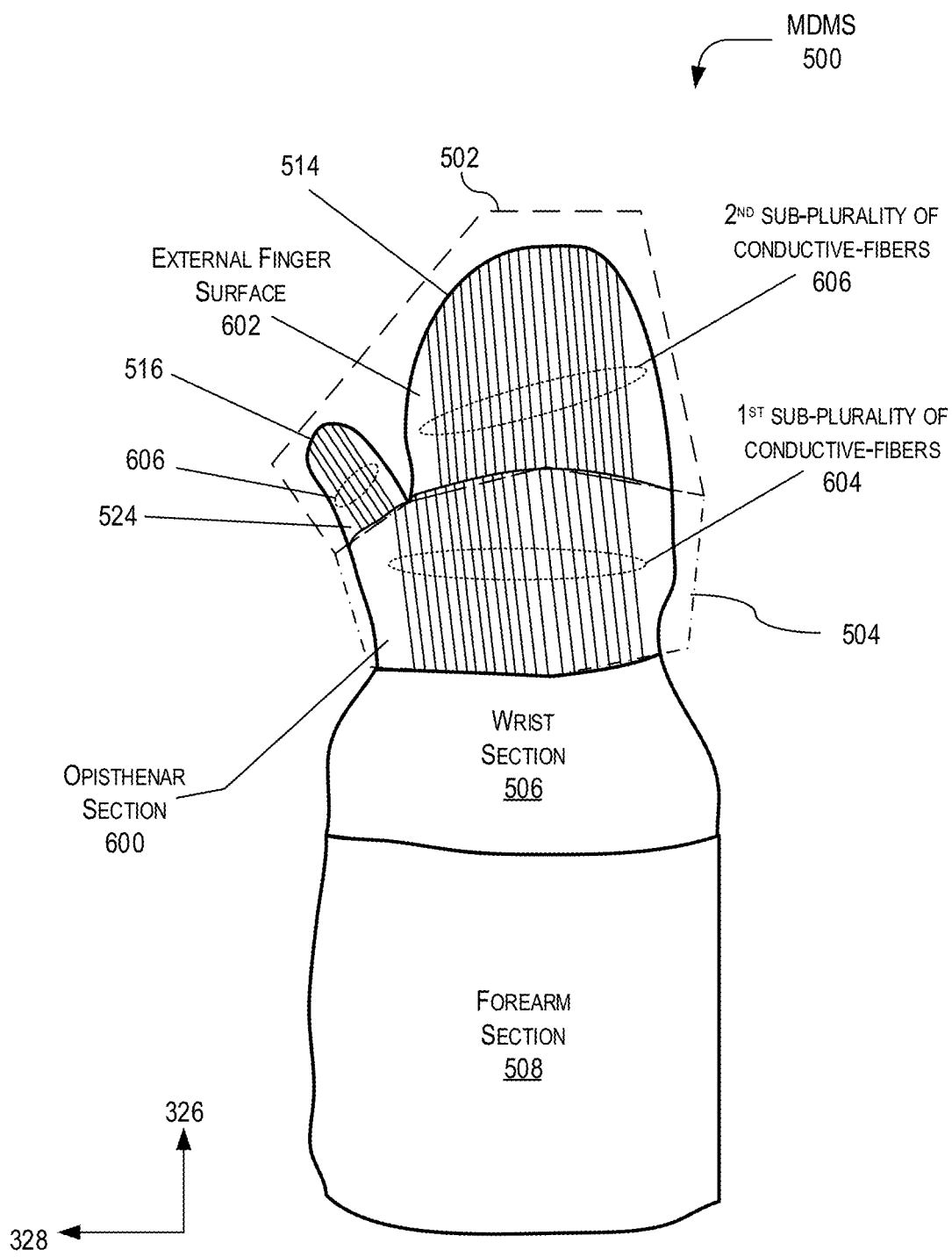
FIG. 6 is a back-side view of the MDMS in the form of the mitt (shown in FIG. 5) in accordance with the present disclosure.

In FIG. 6, a back-side view of example of an implementation of the MDMS 500 in the form of the mitt is shown in accordance with the present disclosure. In this example, the hand section 504 includes the opisthenar section 600 and the finger section 602 includes the external finger surface 602 on the back side of the mitt. Similar to the example shown in FIG. 5, the external finger surface 602 and opisthenar section 600 can also have a plurality of conductive-fibers within the fabric-material. In this example, the hand section 504 can include a first sub-plurality of conductive fibers 604 (of the plurality of conductive-fibers) and the finger section 502 can include a second sub-plurality of conductive fibers 606 of the plurality of conductive-fibers.

In this example, the first sub-plurality of conductive-fibers 604 run along the fabric-material within the opisthenar section 600 approximately parallel along the first direction 326. The second sub-plurality of conductive-fibers run along the fabric-material, in the finger section 502, in directions that are approximately along the first direction 326 when the mitt is a resting position. In this example, the second sub-plurality of conductive-fibers 606 includes further sub-portions of the second sub-plurality of conductive-fibers 606 for the first finger section 514 and second finger section 516 of the finger section 502. Each of the corresponding sub-portions of the second sub-plurality of conductive-fibers 606 within the first finger section 514 and second finger section 516 of the finger section 502 are approximately parallel to each other within the corresponding first finger section 514 and second finger section 516 of the finger section 502 and extend from the opisthenar section 600 to the tips of the corresponding first finger section 514 and second finger section 516 of the finger section 502.

It is appreciated that based on the examples shown in FIGS. 5 and 6, the plurality of conductive-fibers within the fabric-material can be located in the palm section 510 and internal finger surface 512, opisthenar section 600 and external finger surface 602, or both the palm section 510 and internal finger surface 512 and opisthenar section 600 and external finger surface 602.

Similar to the example described in regards to the front side of the glove in regards to FIG. 3, in this example, the first sub-plurality of conductive fibers 604 and second sub-plurality of conductive fibers 606 can also be configured for cleaning, particle sorting, and sample collection. Again, the MDMS controller is configured to provide a multiphase AC signal to produce with the input-signal-source a traveling-wave, single phase AC signal to produce a standing-wave, variable phase shift signal, or variable voltage waveform.

Figure 7:
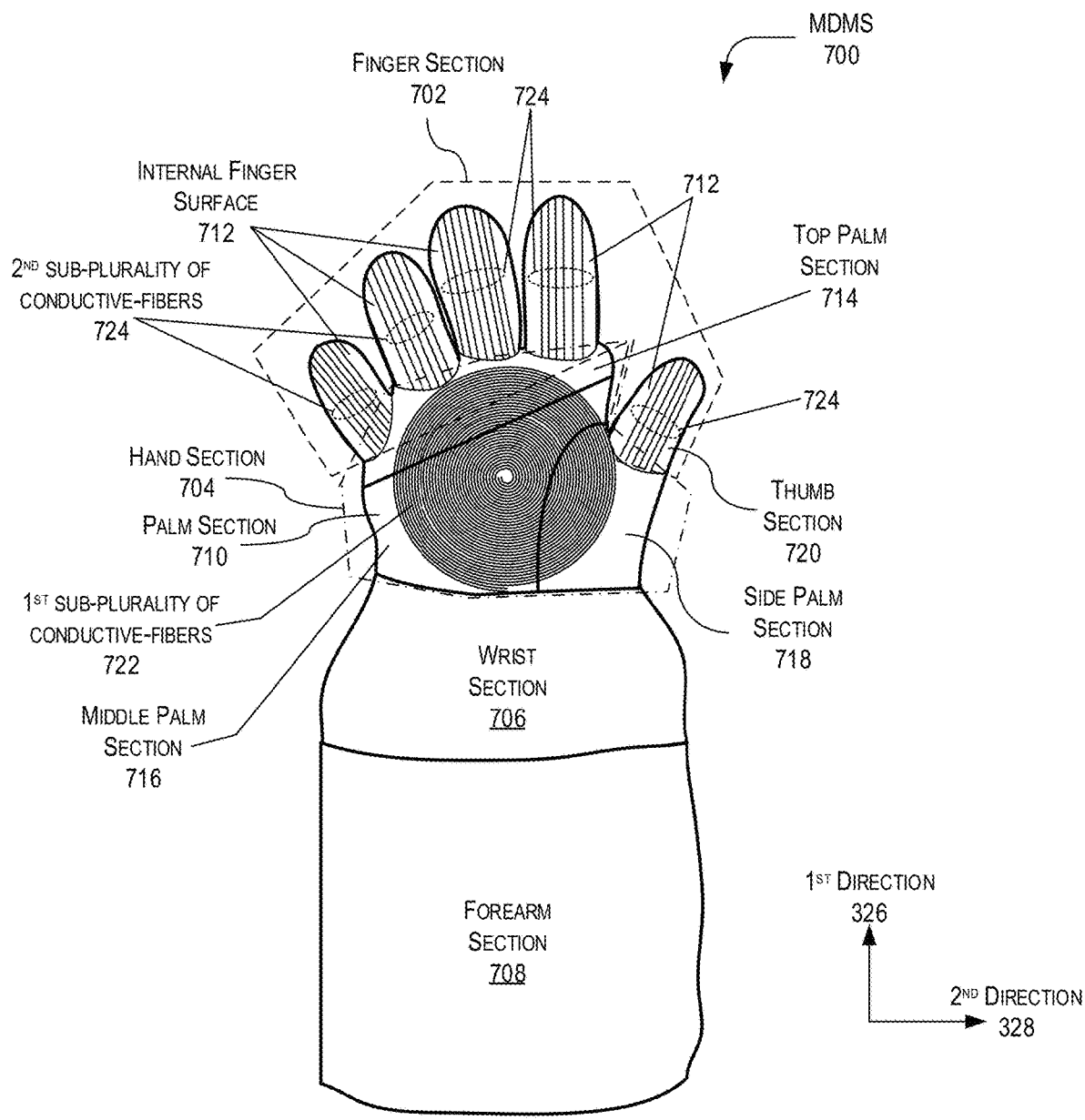
FIG. 7 is a front-side view of still another example of an implementation of a MDMS in the form of a glove in accordance with the present disclosure.

FIG. 7 is a front-side view of still another example of an implementation of a MDMS 700 in the form of a glove in accordance with the present disclosure. Similar to the example shown in relation to FIG. 3, the MDMS 700 includes a finger section 702 and a hand section 704 physically attached to the finger section 702. The hand section 704 is also physically attached to a wrist section 706 that is part of a forearm section 708. In this example, the hand section 704 includes a palm section 710 and an opisthenar section (not shown) and the finger section 702 includes an internal finger surface 712 and an external finger surface (not shown) on the back side of the glove. The finger section 702 includes five finger sub-sections configured to accept five fingers from a user. The palm section 710 can include a top palm section 714, a middle palm section 716, and a side palm section 718 corresponding to the palm sections of human hand, where the middle palm section 716 is located between the top palm section 714 and side palm section 718. The top palm section 714 is located between the middle palm section 716 and the finger section 702 and the side palm section 718 is located between the middle palm section 716 and a thumb section 720. Similar to a human hand, the top palm section 714, middle palm section 716, and side palm section 718 allow the glove to open and close in the same physical fashion as a human hand.

In this example, the MDMS 700 includes a fabric-material within both the finger section 702 and hand section 704. The wrist section 706 and forearm section 708 can also include the fabric-material. The fabric-material includes a plurality of conductive-fibers which can be optionally located throughout the fabric-material or in specific sections of the fabric-material. For example, a first sub-plurality of conductive-fibers 722 (of the plurality of conductive-fibers) can be located within the fabric-material located in the palm section 710 of the glove as shown in FIG. 7. In this example, the first sub-plurality of conductive-fibers 722 can extend throughout the top palm section 714, middle palm section 716, and side palm section 718. Moreover, the internal finger surface 712 can include a second sub-plurality of conductive fibers 724 of the plurality of conductive-fibers. Furthermore, while not shown in this example, it is appreciated that another sub-plurality of the plurality of conductive fibers (of the plurality of conductive-fibers) can be optionally located in the wrist section 706, forearm section 708, or both.

Unlike the previous examples, in this example, the first sub-plurality of conductive-fibers 722 run along the fabric-material within the palm section 710 as approximately parallel spirals. The second sub-plurality of conductive-fibers 724 run along the fabric-material, in the finger section 302, in varying directions that are approximately along the first direction 326 when the glove is a resting position. In this example, the approximately parallel spirals are located within the fabric-material of the top palm section 714, middle palm section 716, and side palm section 718.

Similar to the example described in regards to the front side of the glove in regards to FIG. 3, in this example, the first sub-plurality of conductive fibers 722 and second sub-plurality of conductive fibers 724 can also be configured for cleaning, particle sorting, and sample collection. Again, the MDMS controller is configured to provide a multiphase AC signal to produce with the input-signal-source a traveling-wave, single phase AC signal to produce a standing-wave, variable phase shift signal, or variable voltage waveform.

Figure 8:
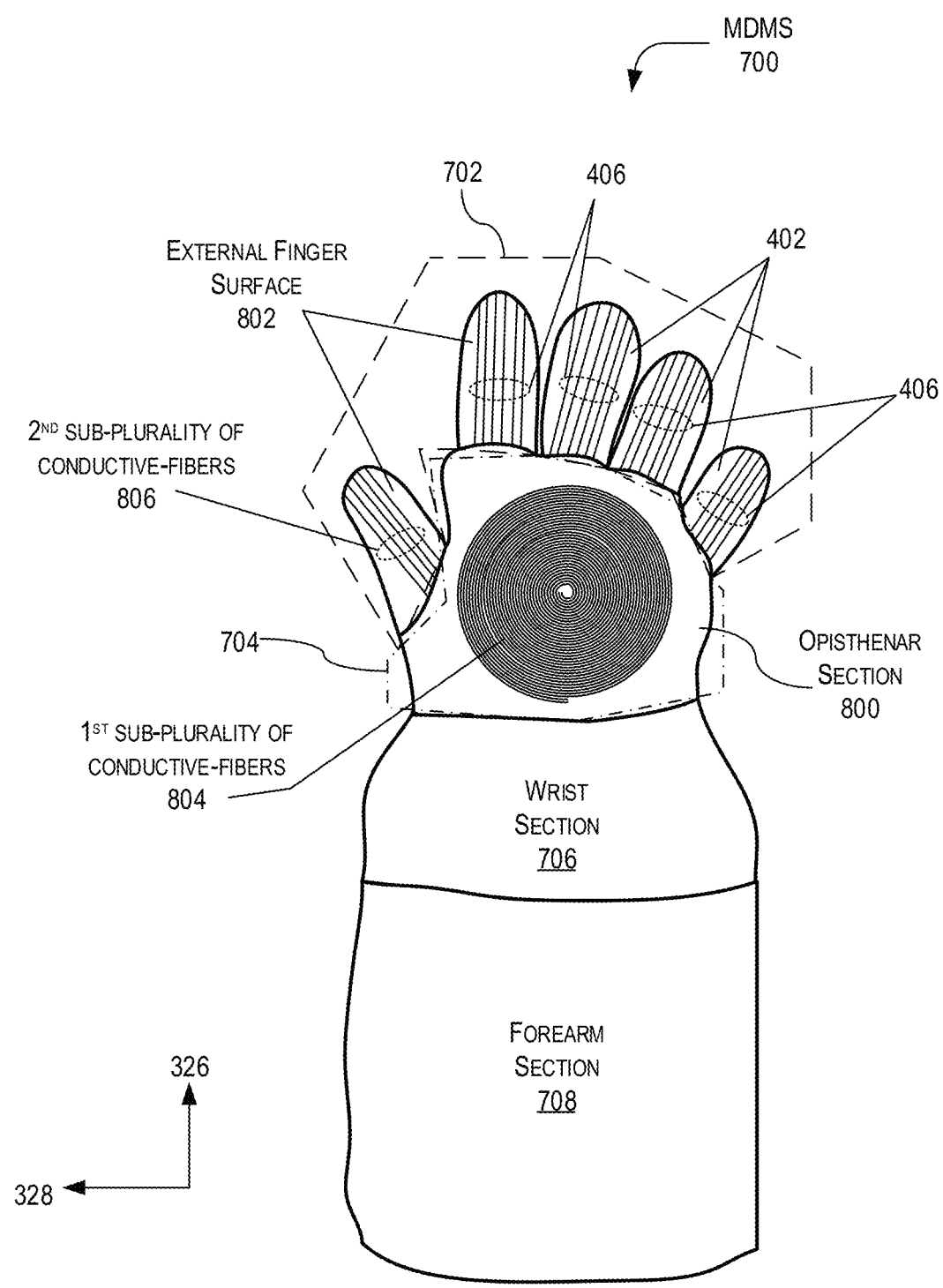
FIG. 8 is a back-side view of the MDMS in the form of the glove (shown in FIG. 7) in accordance with the present disclosure.

In FIG. 8, a back-side view of example of an implementation of the MDMS 700 is shown in accordance with the present disclosure. In this example, the hand section 704 includes the opisthenar section 800 and the finger section 302 includes the external finger surface 802 on the back side of the glove. Similar to the example shown in FIG. 3, the external finger surface 802 and opisthenar section 800 can also have a plurality of conductive-fibers within the fabric-material. In this example, the hand section 704 within the opisthenar section 800 can include a first sub-plurality of conductive fibers 804 (of the plurality of conductive-fibers) and the finger section 702 can include a second sub-plurality of conductive fibers 806 of the plurality of conductive-fibers.

In this example, the first sub-plurality of conductive-fibers 804 run in a spiral direction along the fabric-material within the opisthenar section 800 approximately parallel. The second sub-plurality of conductive-fibers 806 run along the fabric-material, in the finger section 702, in varying directions that are approximately along the first direction 326 when the glove is a resting position. In this example, the second sub-plurality of conductive-fibers 806 includes further sub-portions of the second sub-plurality of conductive-fibers 406 for the finger sub-portions of the finger section 702. As discussed earlier, each of the corresponding sub-portions of the second sub-plurality of conductive-fibers 806 within the finger sub-portions of the finger section 702 are approximately parallel to each other within the corresponding sub-portion of the finger section 702 and extend from the opisthenar section 800 to the tips of the corresponding sub-portion of the finger section 702.

Similar to the example described in regards to the front side of the glove in regards to FIG. 3, in this example, the first sub-plurality of conductive fibers 804 and second sub-plurality of conductive fibers 806 can also be configured for cleaning, particle sorting, and sample collection. Again, the MDMS controller is configured to provide a multiphase AC signal to produce with the input-signal-source a traveling-wave, single phase AC signal to produce a standing-wave, variable phase shift signal, or variable voltage waveform.

It is appreciated that based on the examples shown in FIGS. 7 and 8, the plurality of conductive-fibers within the fabric-material can be located in the palm section 710 and internal finger surface 712, opisthenar section 800 and external finger surface 802, or both the palm section 710 and internal finger surface 712 and opisthenar section 800 and external finger surface 802. Moreover, while not shown in this example, it is appreciated that another sub-plurality of the plurality of conductive fibers (of the plurality of conductive-fibers) can be optionally located in the wrist section 706, forearm section 708, or both.

Figure 9:
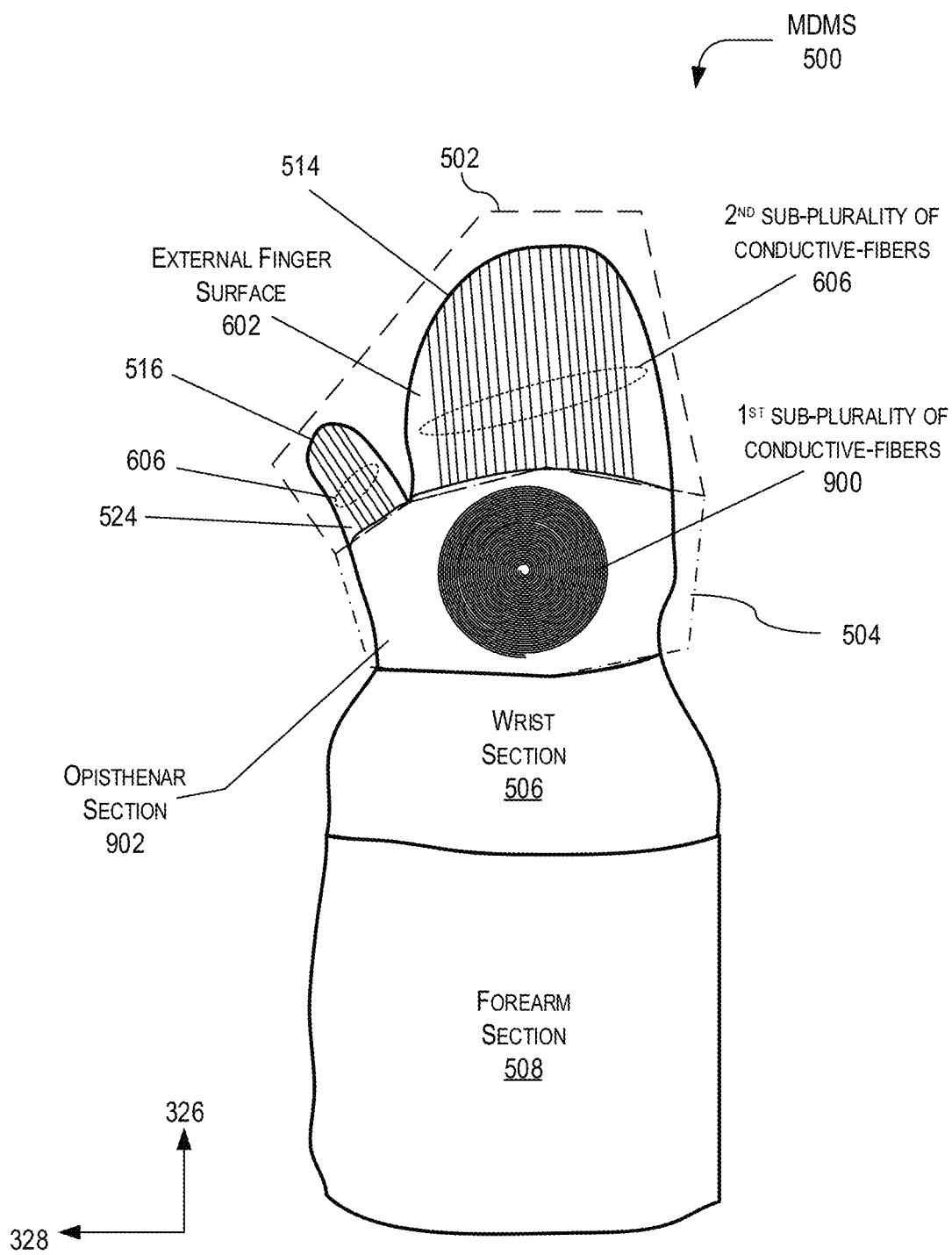
FIG. 9 is a back-side view of another example of an implementation of a MDMS in the form of the mitt (shown in FIG. 5) in accordance with the present disclosure.

Turing back to the example shown in relation to FIG. 5, in FIG. 9, a back-side view of another example of an implementation of the MDMS 900 is shown in accordance with the present disclosure. In this example, the MDMS 900 is alternative implementation of the back of the mitt shown as MDMS 500 shown in FIG. 5. This example is similar to the example shown in FIG. 5, except that first sub-plurality of conductive-fibers 900 are approximately parallel spirals located within the opisthenar section 902.

Similar to the example described in regards to the front side of the glove in regards to FIG. 3, in this example, the first sub-plurality of conductive fibers 900 and second sub-plurality of conductive fibers 608 can also be configured for cleaning, particle sorting, and sample collection. Again, the MDMS controller is configured to provide a multiphase AC signal to produce with the input-signal-source a traveling-wave, single phase AC signal to produce a standing-wave, variable phase shift signal, or variable voltage waveform.

Turning back to the examples shown in relation to FIGS. 3 and 5, the hand section 304 or 504 and finger sections 302 and 502 can have different types orientations for the first sub-plurality of conductive-fibers 322 and 525 and the second sub-plurality of conductive-fibers 324 and 526 within the top palm section 314 and 518, middle palm section 316 and 520, side palm section 318 and 522 and sub-portions 330, 332, 334, 336, 338, 514, and 524 of the finger section 302.

Figure 10:
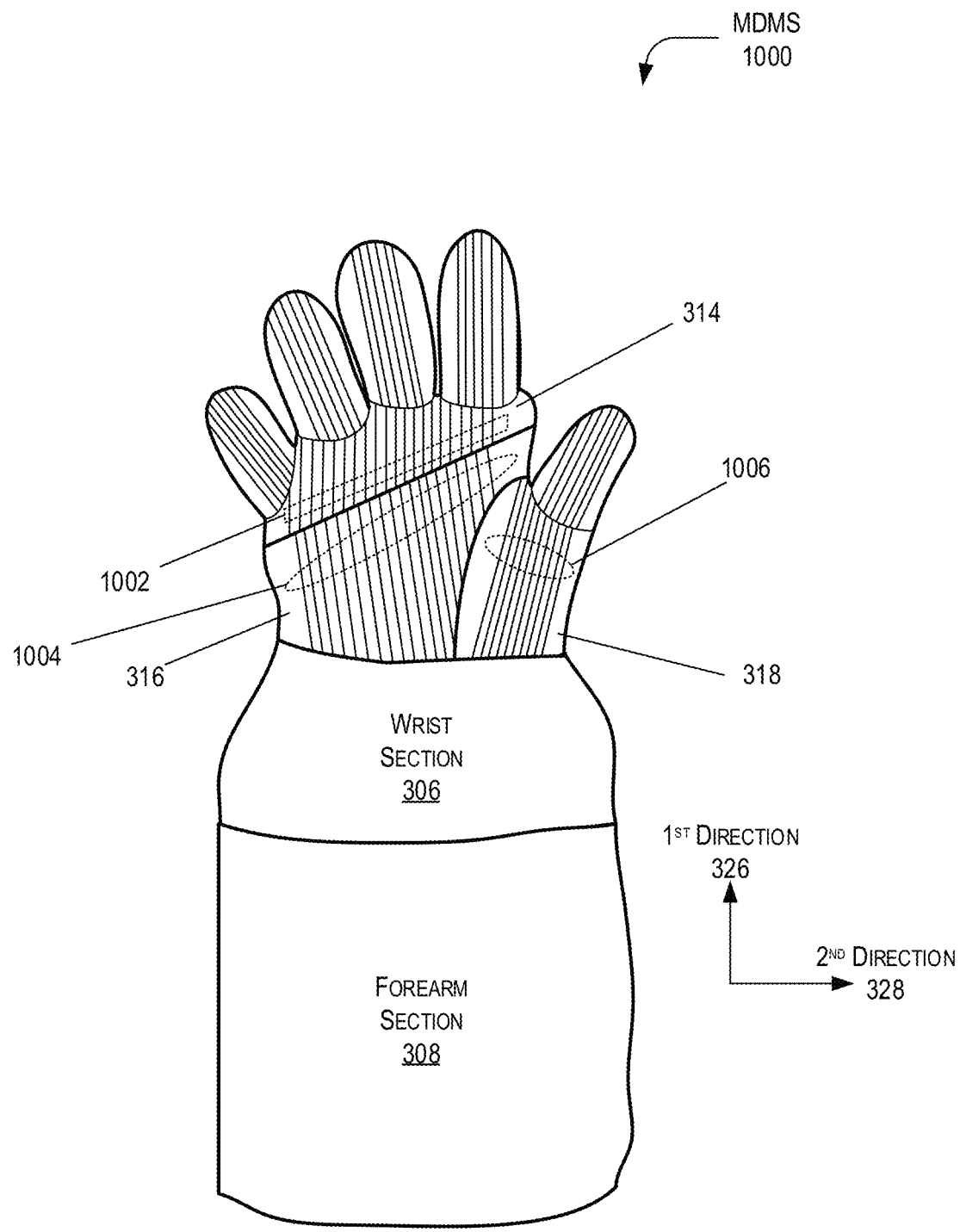
FIG. 10 is a front-side view of yet another example of an implementation of a MDMS in the form of a glove in accordance with the present disclosure.

In FIG. 10, a front-side view of yet another example of an implementation of a MDMS 1000 is shown in the form of a glove in accordance with the present disclosure. In this example, the glove is the same as the one shown in the example in relation to FIG. 3 with the exception that each of the top palm section 314, middle palm section 316, and side palm section 318 have portions of the first sub-plurality of conductive-fibers that are configured in different orientations. In this example, the first sub-plurality of conductive-fibers includes a first portion 1002 of the sub-plurality of conductive-fibers that are located within the top palm section 314 and are approximately parallel along the first direction 326, a second portion 1004 of the sub-plurality of conductive-fibers that are located within the middle palm section 316 and are approximately parallel along the first direction 326, and a third portion 1006 of the sub-plurality of conductive-fibers that are located within the side palm section 318 and are approximately parallel along the first direction 326. In this example, the first portion 1002, second portion 1004, and third portion 1006 of the sub-plurality of conductive-fibers are oriented approximately along the first direction 326 along the glove, however, while approximately along the first direction 326, they each can vary by a predetermined angle from each other.

Figure 11:
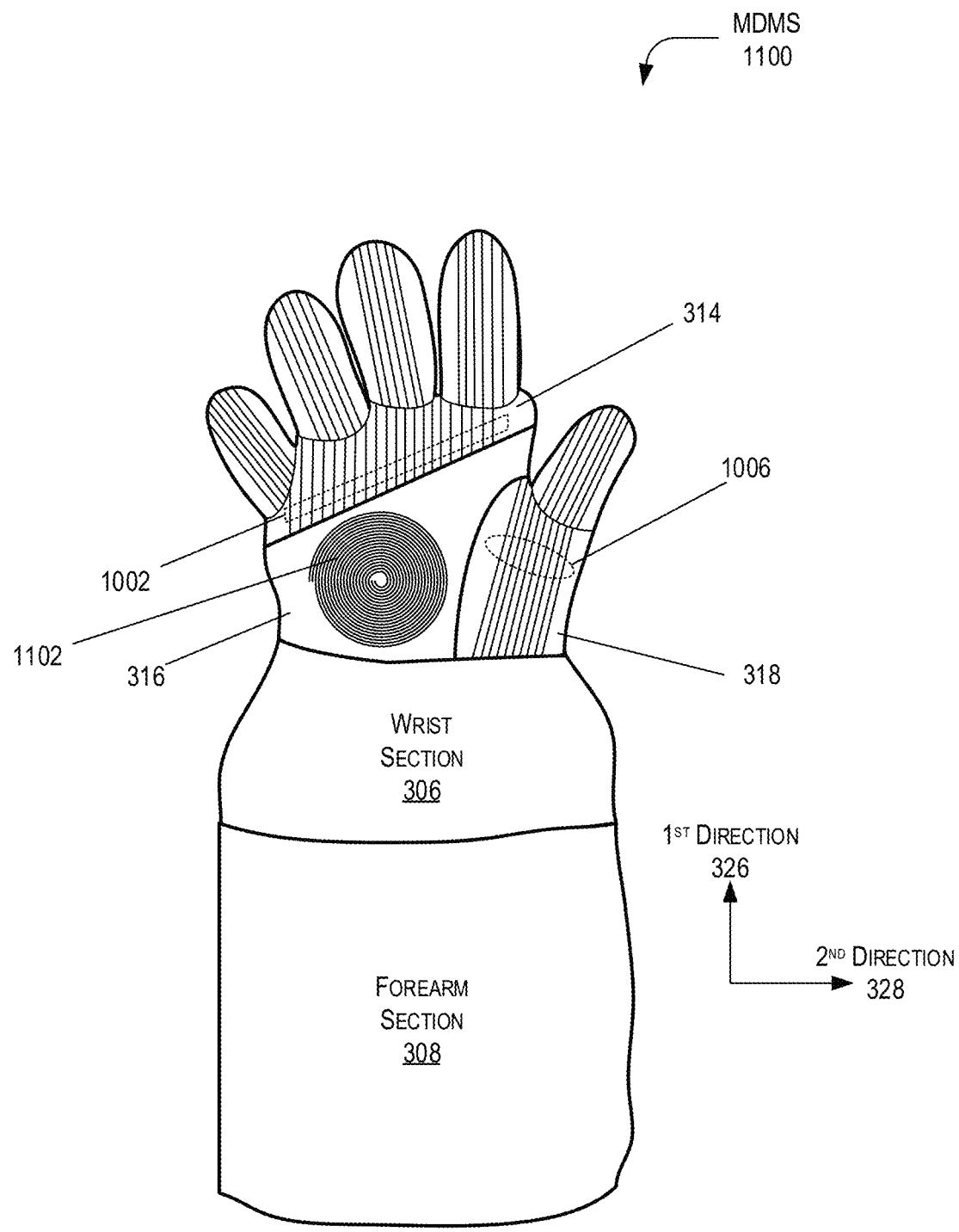
FIG. 11 is a front-side view of still another example of an implementation of a MDMS in the form of a glove in accordance with the present disclosure.

FIG. 11 is a front-side view of still another example of an implementation of a MDMS 1100 in the form of a glove in accordance with the present disclosure. The MDMS 1100 is similar to the example of the MDMS 1000 described and shown in relation to FIG. 10 except that the middle palm section 316 includes a first portion 1102 of the first sub-plurality of conductive-fibers that are approximately parallel spirals instead of straight approximately parallel conductive-fibers as shown in FIG. 10.

Figure 12:
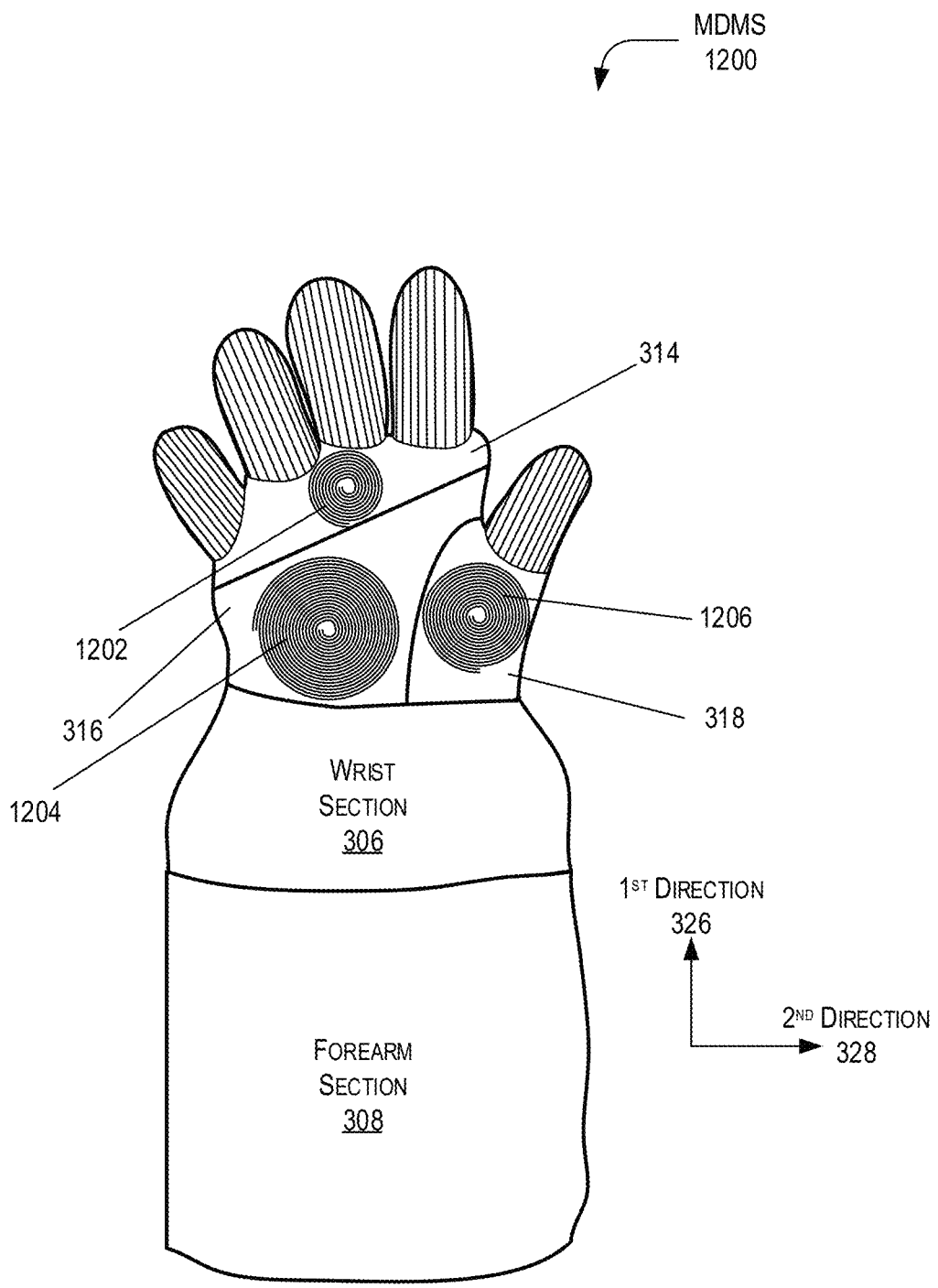
FIG. 12 is a front-side view of still another example of an implementation of a MDMS in the form of a glove in accordance with the present disclosure.

FIG. 12 is a front-side view of still another example of an implementation of a MDMS 1200 in the form of a glove in accordance with the present disclosure. The MDMS 1200 is similar to the example of the MDMS 1000 and 1100 described and shown in relation to FIGS. 10 and 11 except that the top palm section 314, middle palm section 316, and side palm section 318 include approximately parallel spirals for the first portion 1202, second portion 1204, and third portion 1206 of the first sub-plurality of conductive-fibers that are approximately parallel spirals instead of straight approximately parallel conductive-fibers as shown in FIGS. 10 and 11.

It is appreciated by those of ordinary skill in the art that the same approach described in relation to FIGS. 10 to 12, can be utilized for the hand section 504 if the MDMS is a mitt instead of a glove.

It is further appreciated that while approximately parallel straight or spiral conductive-fibers orientations have be shown, other orientations for the conductive-fibers can also be utilized. For example, orientations of concentric rectangles, concentric triangles, zig-zag or other variations can also be utilized for the conductive-fibers.

Figure 13A:
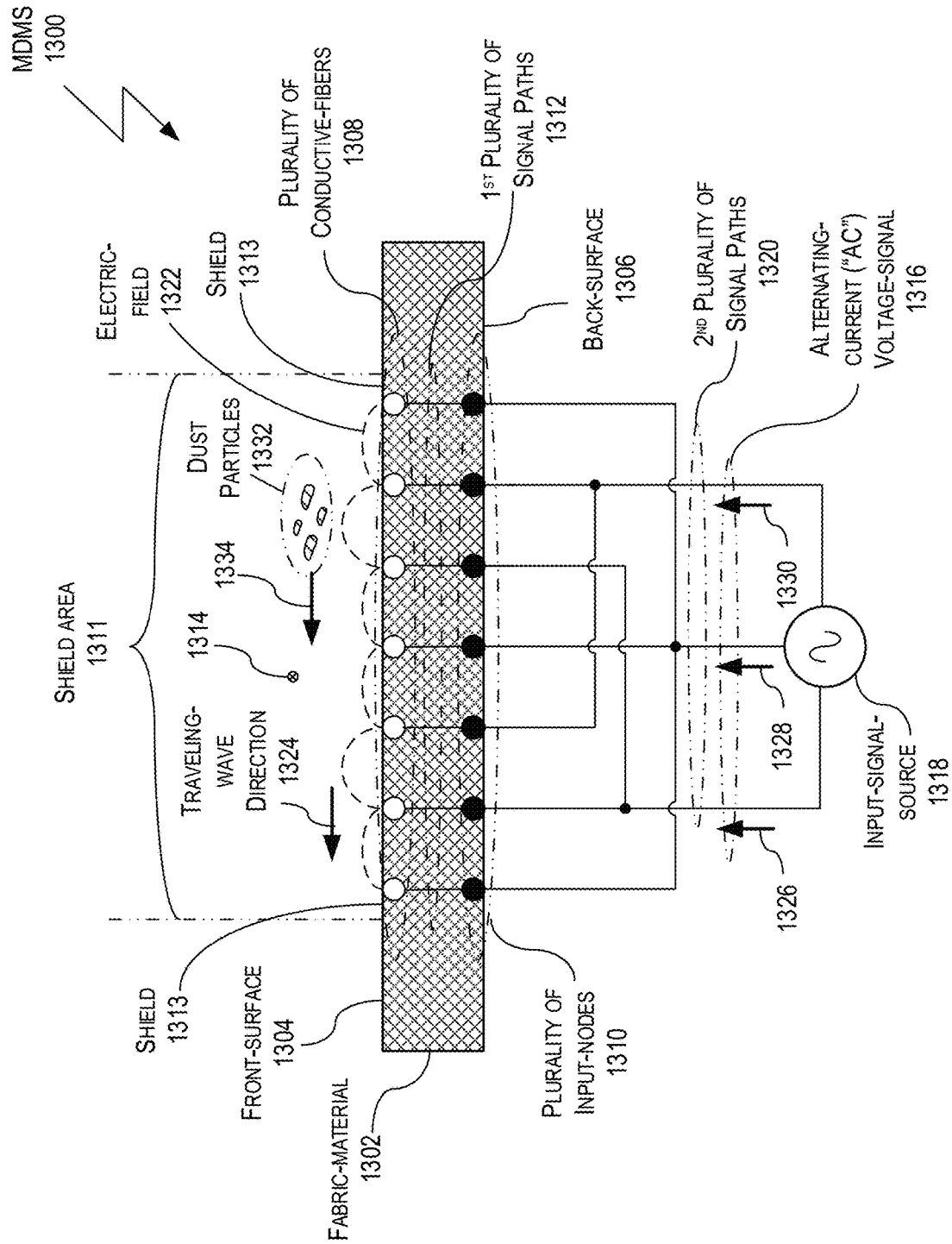
FIG. 13A is a side-view of a system block diagram of an example of an implementation of a MDMS in accordance with the present disclosure.

Turning to FIG. 13A, a side-view of a system block diagram is shown of an example of an implementation of the MDMS 1300 in accordance with the present disclosure. The MDMS 1300 includes a fabric-material 1302 having a front-surface 1304 and back-surface 1306, a plurality of conductive-fibers 1308 within the fabric-material 1302, and a plurality of input-nodes 1310 on the back-surface 1306 of the fabric-material 1302 in signal communication with the plurality of conductive-fibers 1308 via a first plurality of signal paths 1312 within the fabric-material 1302.

The plurality of conductive-fibers 1308 are configured as a series (i.e., a plurality) of approximately parallel conductive-fibers 1308 along the fabric-material 1302 approximately adjacent to (i.e., either on or close to) the front-surface 1304 and the plurality of input-nodes 1310 are configured as a series of input-nodes that are approximately adjacent to the back-surface 1306 of the fabric-material 1302 where each input-node from the plurality of input-nodes is in signal communication with a corresponding conductive-fiber from the plurality of conductive-fibers 1308 via an corresponding signal path of the first plurality of signal paths 1312. The plurality of conductive-fibers 1308 are located within a shield area 1311 that is a portion of the front-surface 1304 (also referred to as the top-surface of the fabric-material 1302) defining the shield 1313 of the MDMS 1300.

In this example, the plurality of conductive-fibers 1308 are shown as approximately parallel and oriented in first direction 1314 along the shield 1313 of the fabric-material 1302 (within the shield area 1311) that is either into or out of the page in the side-view of FIG. 13A. For the purposes of illustration, the first direction 1314 is shown as being into the page, however, it is appreciated by those of ordinary skill in the art that the first direction 1314 can alternatively be in the opposite direction out of the page without limiting the present disclosure. If the plurality of conductive-fibers 1308 are not parallel, the plurality of conductive-fibers 1308 can be slightly divergent such as, for example, the plurality of conductive-fibers 1308 can be divergent with approximately 15 to 20 degrees of deviation from parallel.

In this example, the plurality of conductive-fibers 1308 are woven, or braided, into the front-surface 1304 of the fabric-material 1302 (where the fabric-material 1302 can be, for example, a woven (or braided) fabric-material, flexible-material, or both) at the shield 1313. Additionally, each conductive-fiber of the plurality of conductive-fibers 1308 can be a CNT-fiber. Moreover, each input-node of the plurality of input-nodes 1310 can be an electrode. Furthermore, each conductive-fiber of the plurality of conductive-fibers 1308 can also be an electrode.

In this example, the plurality of conductive-fibers 1308 are configured to receive an AC voltage-signal 1316 from an input-signal-source 1318 (via a second plurality of signal paths 1320, the plurality of input-nodes 1310, and the first plurality of signal paths 1312), where the input-signal-source 1318 is in signal communication with the plurality of input-nodes 1310 via the second plurality of signal paths 1320. In an example of operation, once the plurality of conductive-fibers 1308 receive the AC voltage-signal 1316, each conductive-fiber of the plurality of conductive-fibers 1308 is electrically energized and acts as an electrical radiating-element along (or approximately adjacent to) the front-surface 1304 of the fabric-material 1302 resulting in an electric-field 1322 along the front-surface 1304 of the fabric-material 1302. The electric-field 1322 generates a traveling-wave along the front-surface 1304 of the fabric-material 1302 in a second direction 1324 that is transverse to the first direction 1314. It is appreciated that the second direction 1324 can optionally be from left-to-right or from right-to-left based on the characteristics of the electric-field 1322 or at a preset angle to the traverse.

Figure 13B:
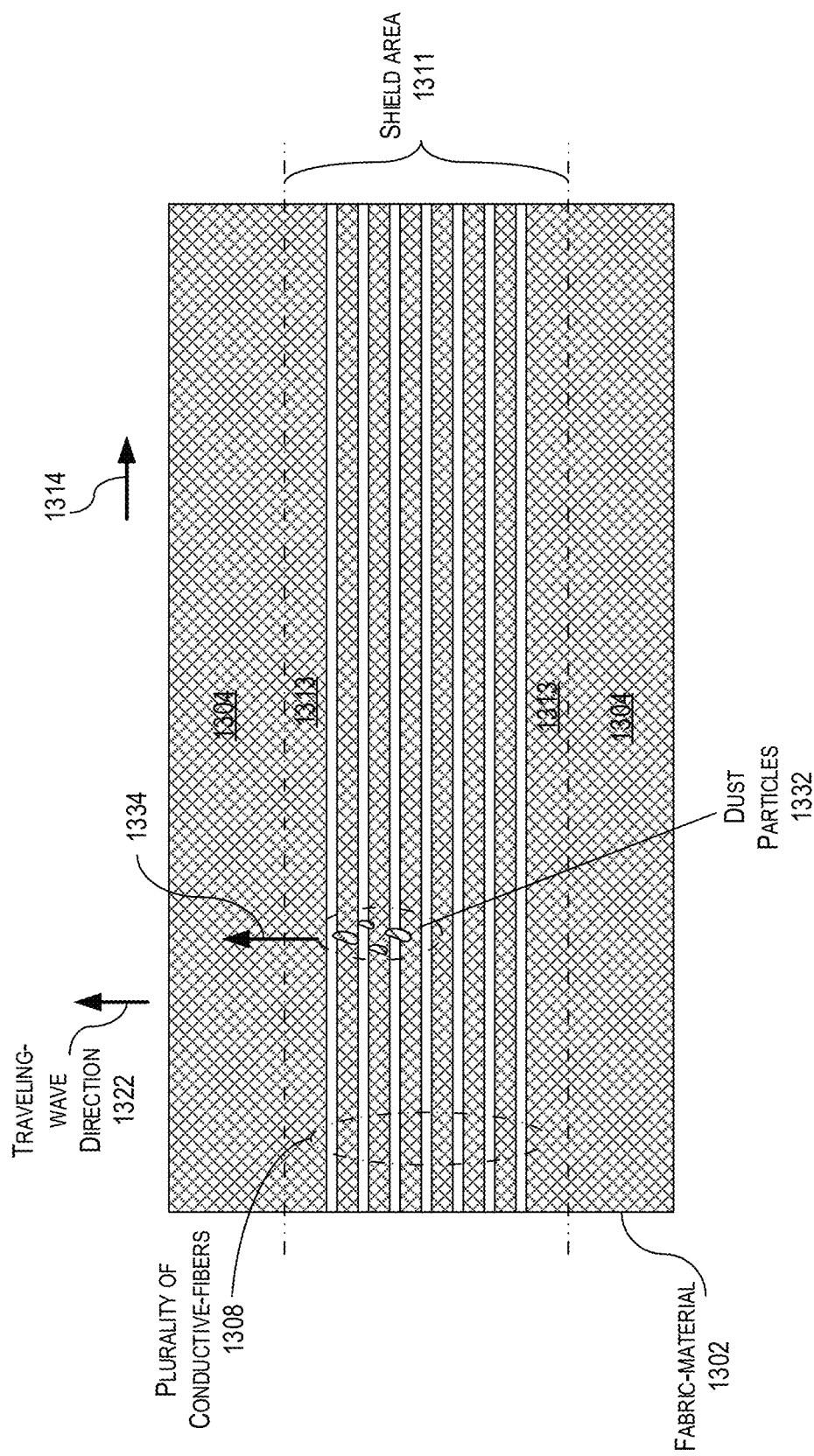
FIG. 13B is a top-view of a system block diagram of the implementation of the MDMS (shown in FIG. 13A) in accordance with the present disclosure.

In this example, the input-signal-source 1318 can be a three-phase power supply signal-source that produces the AC voltage-signal 1316 as a three-phase AC voltage-signal 1316 having a plurality of AC phased-signals that include a first-phase signal 1326, second-phase signal 1328, and third-phase signal 1330. It is appreciated by those of ordinary skill in the art that instead of the input-signal-source 1318 being a three-phase input-signal-source 1318 producing a three-phase AC voltage-signal 1316, other multi-phase input-signal-sources can be utilized such, for example, a two-phase or four phase input-signal-source producing a two-phase or four phase AC voltage-signal respectively can also be utilized. Once the AC voltage three-phase signals 1326, 1328, and 1330 are applied to the MDMS 1300, any dust particles 1332 on the front-surface 1304 of the fabric-material 1302 are repelled and moved off the front-surface 1304 for the fabric-material 1302 in a repulsion direction 1334 that is parallel to the first direction 1314. Turning to FIG. 13B, a top-view of a system block diagram is shown of the implementation of the MDMS 1300 (shown in FIG. 13A) in accordance with the present disclosure.

It is noted that while the plurality of input-nodes 1310 are shown approximately adjacent to the back-surface 1306, this is for the purpose of illustration because the plurality of input-nodes 1310 can be located in varying positions adjacent to the fabric-material 1302. As an example, the plurality of input-nodes 1310 can be located on the back-surface, within the fabric-material 1302 adjacent but just below the back-surface 1306, on the front-surface 1304, within the fabric-material 1302 adjacent but just below the below the front-surface 1304, at a side (not shown) of the fabric-material, within the fabric-material with an access via to either the front-surface 1304 or back-surface 1306, or any place adjacent the fabric-material that does not result in unacceptable interference with the generated electric-field 1322 when the plurality of conductive-fibers 1308 are feed with the AC voltage-signal 1316, since the AC voltage-signal 1316 will induce an electromagnetic fields from the plurality of input nodes 1310 and the first plurality of signal paths 1312 that if too close to the plurality of conductive-fibers 1308 can interact and/or interfere with the induced currents produced by the AC voltage-signal 1316 on the plurality of conductive-fibers 1308 and/or the resulting electric-field 1322. It is also noted that input-signal-source 1318 can also be a multi-phase AC source (as noted earlier) or a DC source.

In this example, the MDMS controller can also be configured to cause the input-signal-source 1318 to produce a single phase AC signal to produce a standing-wave, variable phase shift signal, or variable voltage waveform.

The circuits, components, modules, and/or devices of, or associated with, the MDMS 1300 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection can be along any signal path between the circuits, components, modules, and/or devices that allows signals and/or information to pass from one circuit, component, module, and/or device to another and includes wireless or wired signal paths. The signal paths can be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the plurality of conductive-fibers 1308 are a plurality of CNT-fibers that are utilized as electrodes within the fabric-material 1302 because they are good electrical conductors and are mechanically strong and flexible (i.e., they have high resilience to fatigue) when compared to traditional metal electrodes. It is appreciated by those of ordinary skill in the art that CNT-fibers are a high performance technology breakthrough material with applications in nanotechnology, electronics, material science, optics, etc. Generally, CNT-fibers are multifunctional materials that combine the best properties of polymers, carbon fibers, and metals because CNT-fibers have exceptional properties of mechanical strength and stiffness, electrical and thermal conductivity, and low density (e.g., approximately 1 g/cm$^3$ for a CNT-fiber compared to about 8.96 g/cm$^3$ for copper) that exist on the molecular level. Specifically, CNT-fibers are allotropes of carbon with a cylindrical nanostructure that have a cylindrical structure with a diameter of about one nanometer ("nm" equal to $10^{-9}$), a length-to-diameter ratio up to about 132,000,000 to 1, high thermal conductivity (with a range of approximately 100 mWm$^2$/kgK to 1000 mWm$^2$/kgK), normalized electrical conductivity (with a range of approximately 1 kS m²/kg to 6 kS m²/kg, normalized by density), and high mechanical strength and stiffness (with a tensile strength in the approximate range of 1 GPa to 1.3 GPa).

At present, lightweight CNT-fibers may be produced with lengths that are on the orders of meters while having properties approaching the high specific strength of polymeric and carbon-fibers, high specific electrical conductivity of metals, and specific thermal conductivity of graphite-fibers as shown recently by academic sources. These CNT-fibers are high-strength fibers with relatively low-conductivity (e.g., about 1.1 MS/m for a CNT-fiber) when compared to high-conductivity metals (e.g., about 49 MS/m for off the shelf copper magnet wire) that have relatively low-strength such as, for example, copper. However, while the electrical conductivity for these CNT-fibers might be lower than copper and other known highly conductive materials, the advantage of CNT-fibers is their low-density that makes the current carrying capacity ("CCC"), when normalized by mass, much higher than the metal conductors.

As a result of these properties, in the present example, CNT-fibers have been utilized as the plurality of conductive-fibers 1308 of the MDMS 1300 because the CNT-fibers overcome the challenges of integrating the MDMS 1300 with metal wires or strips as electrodes instead of the conductive-fibers 1308. Specifically, the mechanical properties of CNT-fibers are higher than the mechanical properties of the high-conducting metallic-materials and the mass of a CNT-fiber is low compared to a metal electrode. Therefore, even if the CNT-fiber thickness needs to be increased to match the low-resistance of a metal electrode, the overall mass contribution of the CNT-fiber is less than that of the metal electrode. It is appreciated that while the CNT-fibers are utilized in this example, other fibers such as Litewire may be also utilized, in other applications, as long as the other fibers have high-strength with high-resilience to fatigue, high-conductivity on par with metallic-materials, and that the mass of the other fibers are low when compared to metal-electrodes.

As such, the utilization of CNT-fibers for the plurality of conductive-fibers 1308 within the fabric-material 1302 are preferred because the fabric-material 1302 is flexible and in the case of spacesuit fabrics, flexible and complex to fabricate. Specifically, the use of metallic-materials (such as, for example, copper or indium tin oxide) within the fabric-material 1302 of a spacesuit would be difficult because the metallic-materials are challenged by fatigue breakage and often exhibit high cycle fatigue resulting in failure of the metallic-materials due to cyclic loading under repeated loads. Unfortunately, spacesuits, as an example, undergo repeated motions that flex, bend, fold, or twist spacesuit materials (e.g., fabric-materials and other such flexible-materials) specifically within the leg or arm portions of the spacesuit. As such, spacesuit-materials need to be highly flexible and nearly fatigue-free. Additionally, fabricating a spacesuit with these metallic-materials is also challenging because the spacesuits have irregular contours and non-smooth surfaces. As a result, with spacesuit fabric-materials, it is not possible to adhere metallic-material wires to the fabric-material surfaces of a spacesuit utilizing known techniques such as, for example, sputtering or ink-jet printing. Additionally, spacesuit fabric-materials (e.g., beta cloth, ortho-fabric, or both, or other examples of suitable fabric-materials or flexible-materials, such as used in BIOSUIT® or flexible materials used for space habitats, inflatable structures, flexible deployable antennas and combinations thereof) that are exposed to dust are generally coated with polytertraflouroethylene ("PTFE" a synthetic fluoropolymer of tetrafluorethylene generally known as "TEFLON®") that is not conducive to directly bonding any electrodes to the surface of spacesuit materials. However, it is noted that for other fabric-materials in which bonding is suitable, the electrodes can be bonded without departing from the spirit of the present disclosure.

It is appreciated that beta-cloth is a type of fireproof silica fiber cloth used in the manufacture of spacesuits such as the Apollo/Skylab A7L spacesuits and the Apollo thermal micrometeroid garment. In general, beta-cloth includes fine woven silica fiber that is similar to fiberglass and is a fabric-material that is coated with PTFE and will not burn and will only melt at temperatures exceeding 650° C. Ortho-fabric is utilized for the outer layer of the spacesuit and includes a complex weave blend of GORE-TEX® (i.e., a synthetic waterproof fabric-material that includes a membrane that is permeable to air and water vapor), KEVLAR® (i.e., poly-paraphenylene terephthalamide, a para-aramid synthetic fiber of high tensile strength), and NOMEX® (a flame-resistant meta-aramid synthetic fiber) materials. In addition to Ortho-fabric, the fabric-material can be VEC-TRAN™, Teflon TEFLON® cloth, woven KAPTON®, polyimide fabric, or both, beta cloth, etc.

Figure 14:
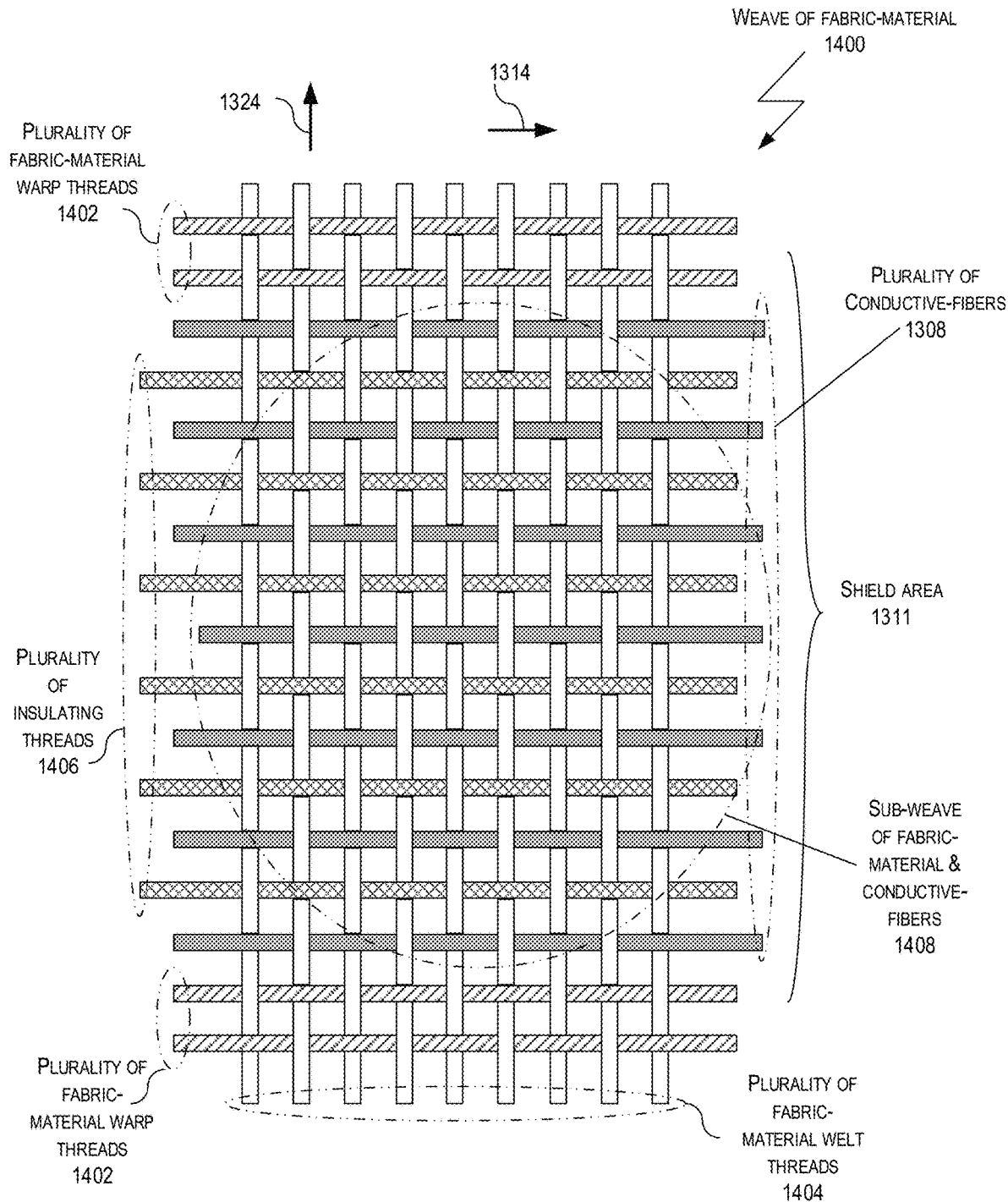
FIG. 14 is a top-view of an implementation of a weave of the fabric-material with the plurality of conductive-fibers (shown in FIGS. 13A and 13B) in accordance with the present disclosure.

Turning to FIG. 14, a top-view of an implementation of a weave 1400 of the fabric-material 1302 with the plurality of conductive-fibers 1308 (shown in FIGS. 13A and 13B) is shown in accordance with the present disclosure. Similar to the examples shown in FIGS. 13A and 13B, seven (7) conductive-fibers 1308 are shown within the shield area 1311 of the fabric-material 1302, however, it is appreciated by of ordinary skill in the art that any plurality of conductive-fibers 1308 may be utilized based on the desired repulsive properties of the shield 1313.

In this example, the conductive-fibers 1308 are CNT-fibers that are weaved into the fabric-material 1302. Moreover in this example, the weave 1400 of the fabric-material 1302 is shown having a plurality of fabric-material 1302 warp threads 1402 (i.e., a plurality of fabric-material 1302 horizontal threads herein referred to as a plurality of fabric-material warp threads 1402) and plurality of fabric-material 1302 welt threads 1404 (i.e., a plurality of fabric-material 1302 vertical threads herein referred to as a plurality of fabric-material welt threads 1404) forming the front-surface 1304 of the fabric-material 1302 and a plurality of insulating threads 1406 adjacent to and in-between the plurality of conductive-fibers 1308. In this example, the plurality of fabric-material 1302 warp threads 1402, plurality of insulating threads 1406, and plurality of conductive-fibers 1308 run along the first direction 1314 of the weave 1400 while the plurality of fabric-material welt threads 1404 run along the second direction 1324 of the weave 1400. In this example, the fabric-material 1302 can be an ortho-fabric-material and the plurality of fabric-material warp threads 1402 and plurality of fabric-material welt threads 1404 are threads (i.e., a yarn or textile fibers) of the ortho-fabric-material generally two-plied (i.e., two threads of material twisted together ("plied") to for a "2-ply" thread) or multi-ply (i.e., more than 2-ply) textile fibers utilized to produce the weave 1400 of fabric-material 1302. It is appreciated by those of ordinary skill in the art that the fabric material 1302 is generally at least 2-plyed to increase the strength of the fabric-material 1302. Additionally, the plurality of insulating threads 1406 can also be of the same ortho-fabric-material as the plurality of fabric-material warp threads 1402 and plurality of fabric-material welt threads 1404 as long as the ortho-fabric-material is capable of electrically insulating each conductive-fiber of the plurality of conductive-fibers 1308 from each other. Furthermore, each conductive-fiber of the plurality of conductive-fibers 1308 may also be 2-plyed or multi-plied conductive-fibers. As such, in this example, the fabric-material 1302 is shown as a sub-weave 1408 of the weave 1400 of the fabric-material 1302. The sub-weave 1408 includes the plurality of conductive-fibers 1308 (as a plurality of warp conductive-fibers) along the plurality of fabric-material weft threads 1404 and in between the plurality of fabric-material 1302 warp threads 1402, where the sub-weave 1408 includes the plurality of insulating threads 1406 spaced in-between the plurality of conductive-fibers 1308.

In this example the plurality of conductive-fibers 1308 and plurality of insulating threads 1406 are shown as extending uniformly in one direction (i.e., first direction 1314), however, it is noted that the plurality of conductive-fibers 1308 and plurality of insulating threads 1406 can be intermixed in both warp and weft in any ordering or pattern desired based on the design of the MDMS 1300 as will be shown later in this disclosure. It is further noted that the plurality of insulating threads 1406 can have a dielectric constant value or values that do not significantly diminish the traveling-wave of the electric-field 1322 produced by the MDMS 1300. While the weave 1400 of fabric-material 1302 is shown in this example, it is noted that the fabric-material 1302 may instead be braided.

Figure 15A:
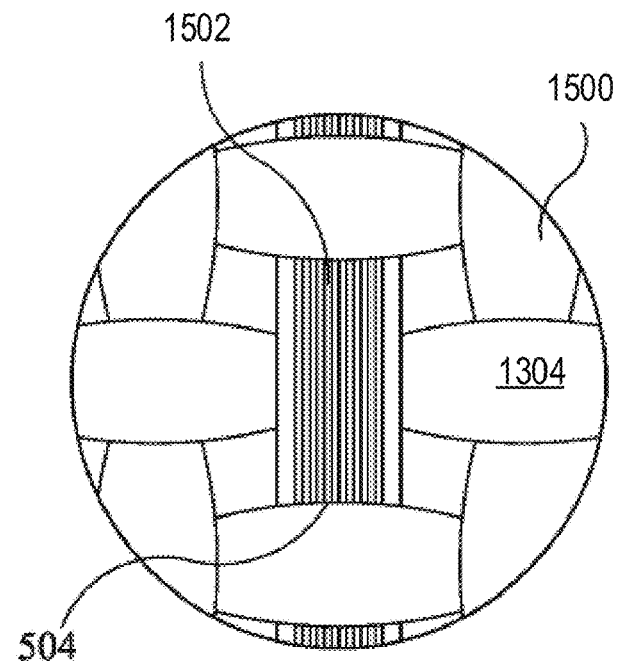
FIG. 15A is an amplified front-view of an example of an implementation of the weave shown in FIG. 14 for an ortho-fabric-material with a plurality of conductive-fibers in accordance with the present invention.
Figure 15B:
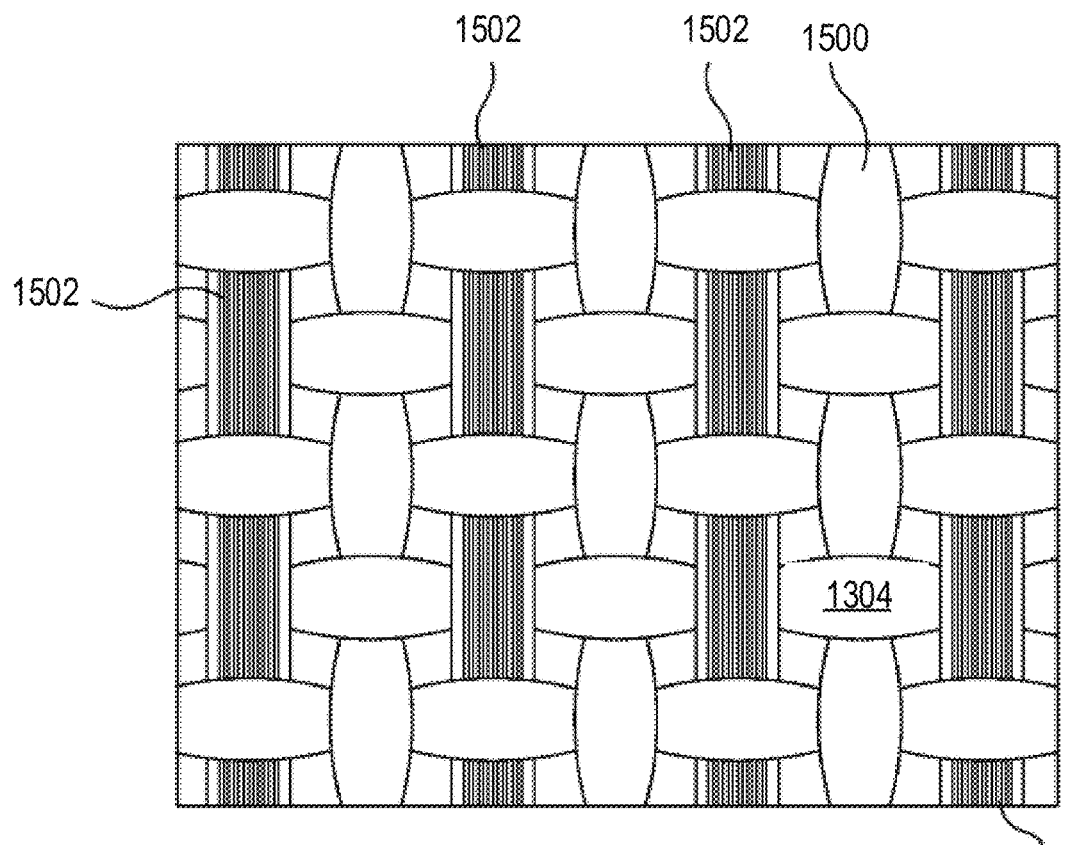
FIG. 15B is a less amplified front-view of the weave shown in FIG. 15A for the ortho-fabric-material with the plurality of conductive-fibers in accordance with the present invention.
Figure 15C:
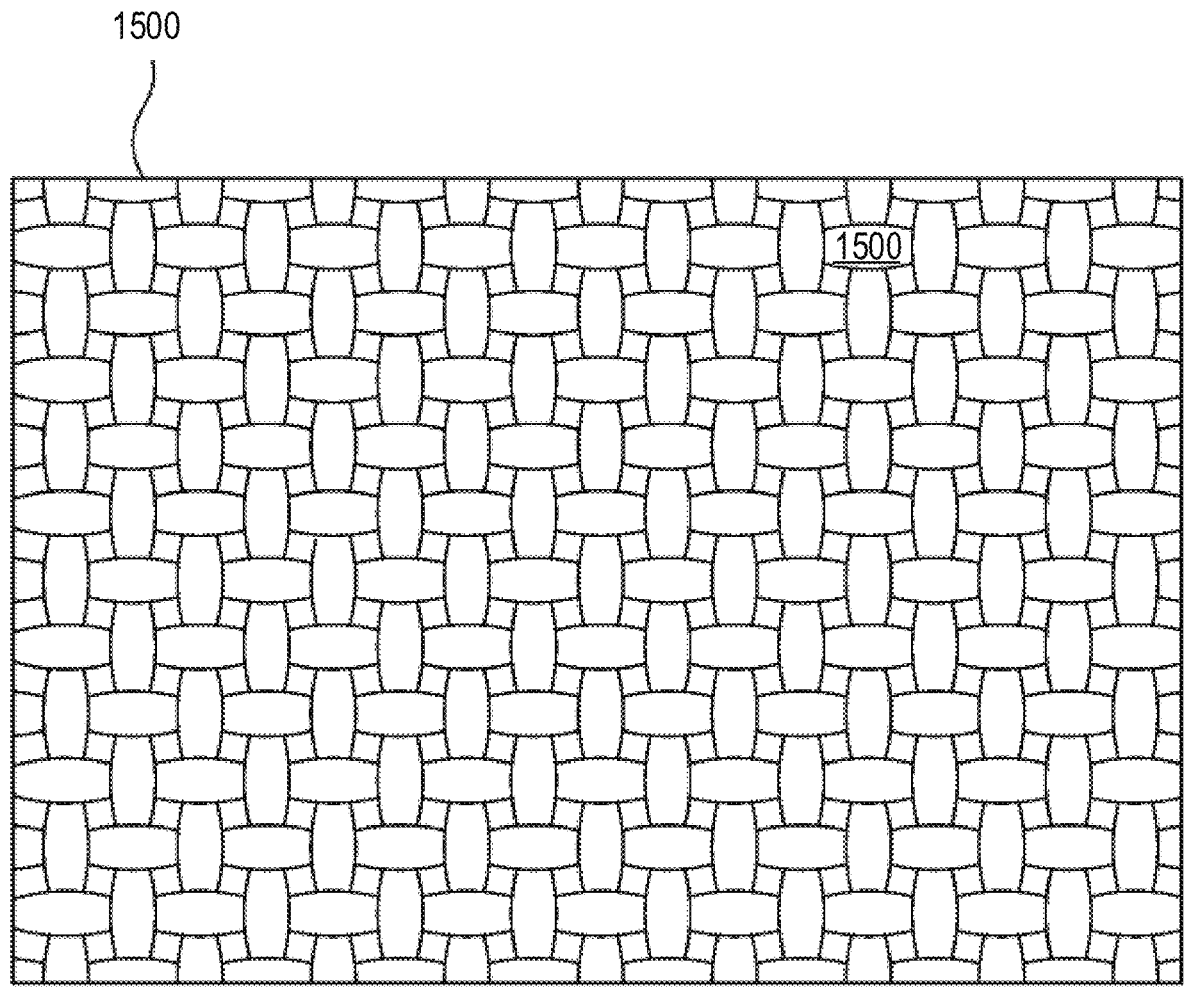
FIG. 15C is a back-view of the weave shown in FIGS. 15A and 15B in accordance with the present disclosure.

Turning to FIGS. 15A, 15B, and 15C, front and back view is shown of an example of an implementation of a weave, or braid, of the fabric-material 1302 as an ortho-fabric-material 1500 (e.g., the outer-layer material of the spacesuit) with a plurality of CNT-fibers 1502 utilized as the plurality of conductive-fibers 1308 in accordance with the present disclosure. In FIGS. 15A and 15B, the front-surface 1304 (also referred to herein as the "top-side") of the ortho-fabric-material 1500 is shown while in FIG. 15C, the back-surface 1306 of the ortho-fabric-material 1500 is shown. FIG. 15A is an amplified front-view of the front-surface 1304 of the ortho-fabric-material 1500 showing a single CNT-fiber 1504 (of the plurality of CNT-fibers 1502) woven, or braided, into the threads (i.e., fibers) of the ortho-fabric-material 1500, while FIG. 15B shows a less amplified front-view of the front-surface 1304 of the ortho-fabric-material 1500 showing multiple CNT-fibers (of the plurality of CNT-fibers 1502) woven, or braided, into the threads of the ortho-fabric-material 1500. In this example, the plurality of CNT-fibers 1502 do not penetrate the entire fabric-material 1302 thickness of the ortho-fabric-material 1500. The weave, or braid, is done such that only the front-surface 1304 has the plurality of CNT-fibers 1502. As such, in FIG. 15C, the ortho-fabric-material 1500 is shown not to have any CNT-fibers 1502 passing through the back-surface 1306 of the ortho-fabric-material 1500.

Figure 16:
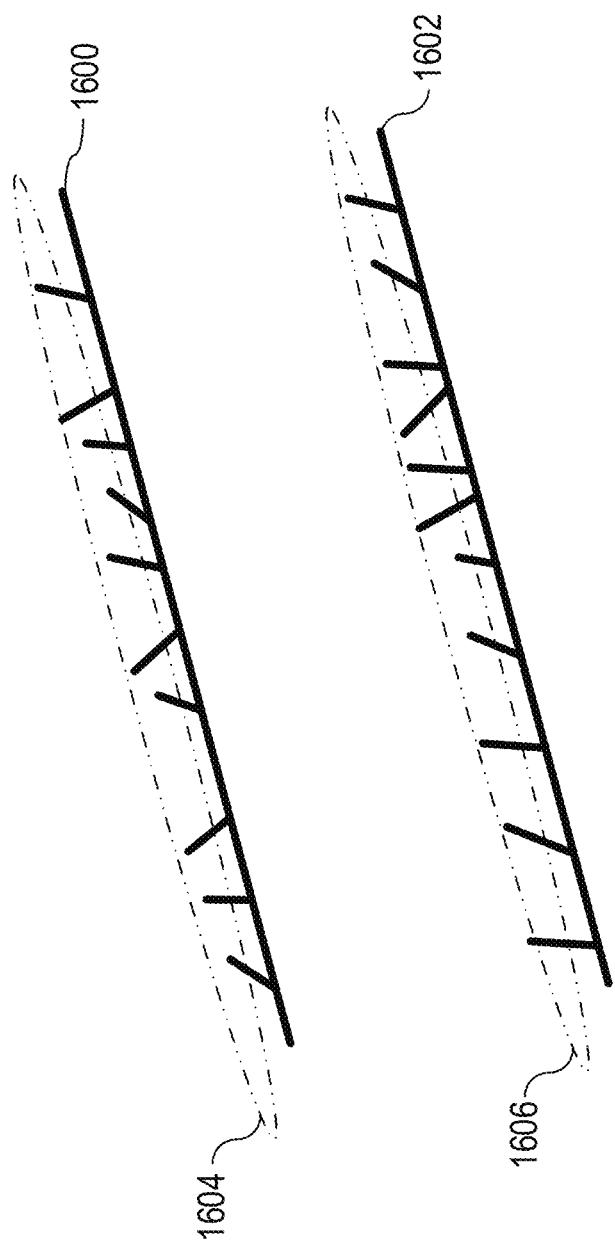
FIG. 16 is an angled side-view of an example of an implementation of a portion of two conductive-fibers in accordance with the present disclosure.

In FIG. 16, an angled side-view of an example of an implementation of a portion of two CNT-fibers 1600 and 1602 is shown in accordance with the present disclosure. The two CNT-fibers 1600 and 1602 (of the plurality of CNT-fibers 1502, FIGS. 15A-15C) can include side fibrils 1604 and 1606 (i.e., generally known as "hairs" of the CNT-fiber) that are formed by slightly frayed strands in the CNT-fibers 1600 and 1602, which can be oriented in an organized or random fashion. In generally, the utilization of the side-fibrils 1604 and 1606 increases the dust repellant effect of the MDMS 1300 by creating irregularities in the electric-field 1322, FIG. 13A.

Figure 17A:
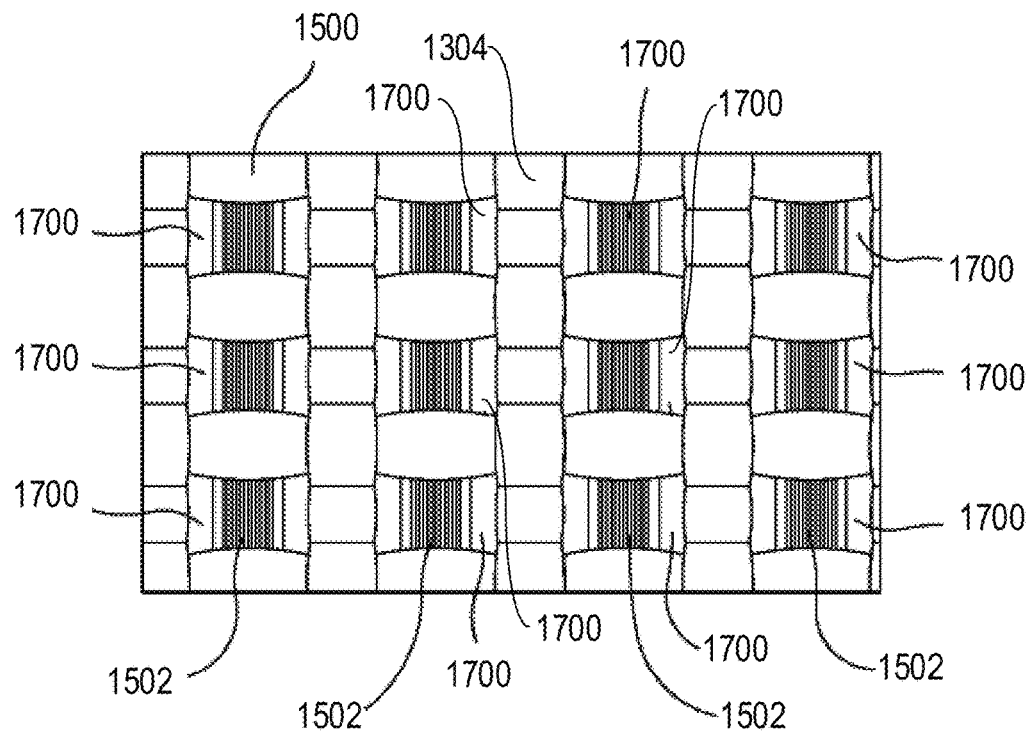
FIG. 17A is an amplified front-view of an example of an implementation of the insulation of the plurality of conductive-fibers on the front-surface of the fabric-material in accordance with the present disclosure.
Figure 17B:
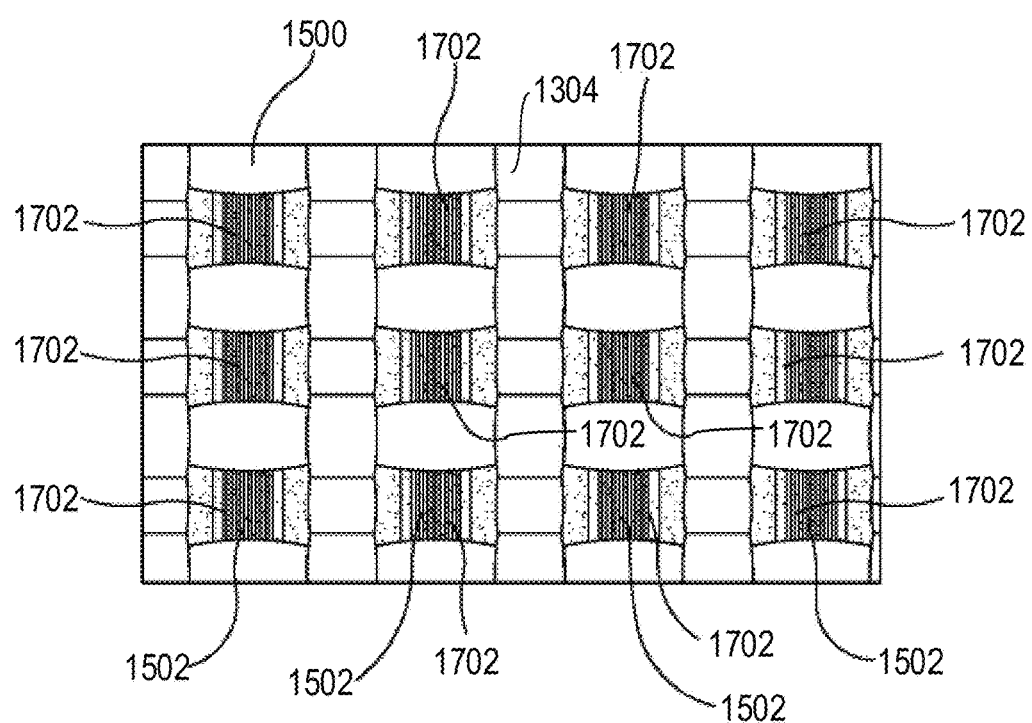
FIG. 17B is an amplified front-view of an example of an implementation of an insulating layer on the front-surface (shown in FIG. 17A) of the fabric-material in accordance with the present disclosure.
Figure 17C:
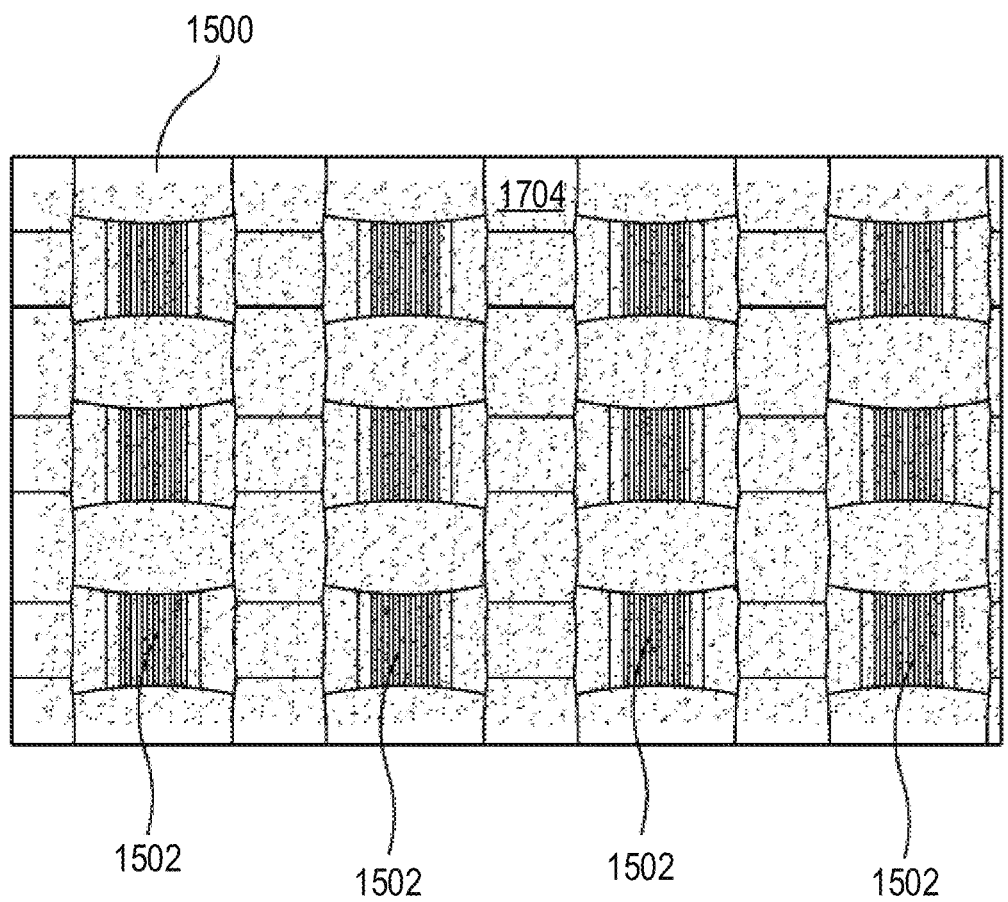
FIG. 17C is an amplified front-view of an example of an implementation of a top-layer coating on the front-surface (shown in FIGS. 17A and 17B) of the fabric-material in accordance with the present disclosure.

In FIGS. 17A, 17B, and 17C, front-views of an example of an implementation of the insulation of the plurality of CNT-fibers 1502 (shown in FIGS. 15A, 15B, and 15C) on the front-surface 1304 of the ortho-fabric-material 1500 are shown in accordance with the present disclosure. In this example, a plurality of thermoplastic-fibers 1700 are mounted during the fabrication of the ortho-fabric-material 1500. In this example, the assembled ortho-fabric-material 1500 and the plurality of thermoplastic-fibers 1700 are annealed at elevated temperatures, melting the thermoplastic-fibers 1700 to create a micron-sized insulating layer 1702 that increase the safety of the combination of ortho-fabric-material 1500 and the plurality of CNT-fibers 1502 while only having minimal reduction in the electric-field 1322 (for example, less than approximately 10% reduction) that repeals the dust particles 1332. In FIG. 17C, a top-layer coating 1704 is shown completely covering the front-surface 1304 of the ortho-fabric-material 1500 and plurality of CNT-fibers 1502. The top-layer coating 1704 can be electrically insulating or polarizing for local enhancement of the electric-field 1322. The top-layer coating 1704 may be applied after the assembly of the plurality of CNT-fibers 1502 and the front-surface 1304 of the ortho-fabric-material 1500 is complete. As an example, the top-layer coating 1704 can be hydrophobic-material with patterning of the surface texture for maximum hydrophobicity (such as, for example, Lotus coating developed by NASA GSFC) and/or a material that bends the electronic-bands structure of the assembly (i.e., the coating plus CNT-fibers) to equalize the bandgap of the plurality of CNT-fiber 1502 in the shield 1313 to the typical bandgap of dust particles (as an example, the work-function developed at NASA GRC).

Figure 18:
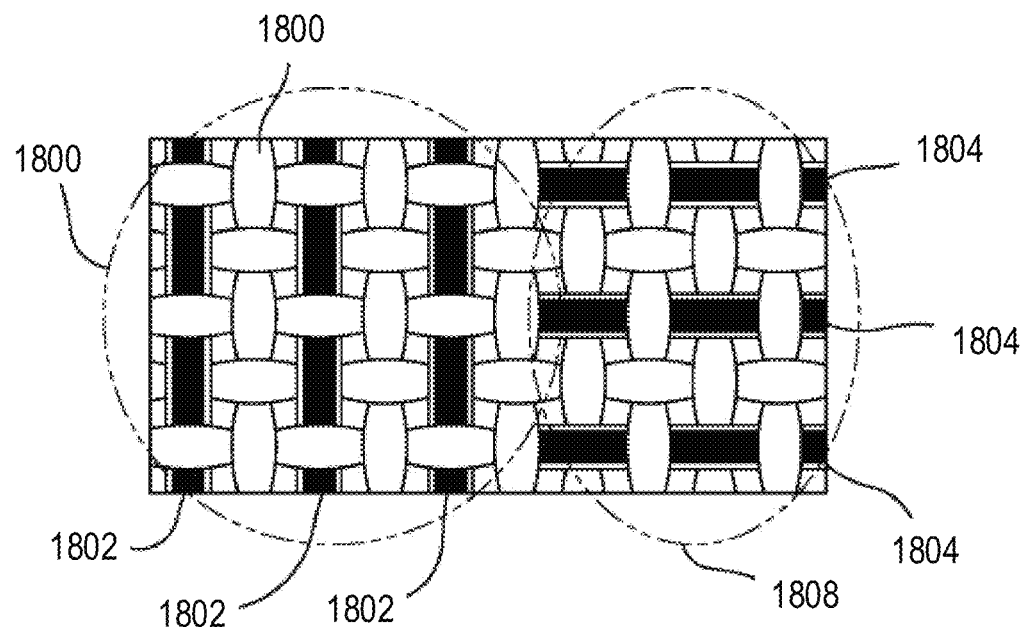
FIG. 18 is an amplified front-view of an example of another implementation of an ortho-fabric-material with a first plurality of carbon-nanotube ("CNT") fibers and second plurality of CNT-fibers in accordance with the present disclosure.

Turning to FIG. 18, an amplified front-view of an example of another implementation of an ortho-fabric-material 1800 with a first plurality of CNT-fibers 1802 and second plurality of CNT-fibers 1804 is shown in accordance with the present disclosure. In this example, the first plurality of CNT-fibers 1802 and second plurality of CNT-fibers 1804 are shown to have multi-directional patterning. As an example, two areas 1806 and 1808 of the ortho-fabric-material 1800 are shown with the first area 1806 having the first plurality of CNT-fibers 1802 oriented in a "vertical" direction (i.e., a vertical weave) while the second area 1808 having the second plurality of CNT-fibers 1804 oriented in a "horizontal" direction (i.e., horizontal weave).

Figure 19:
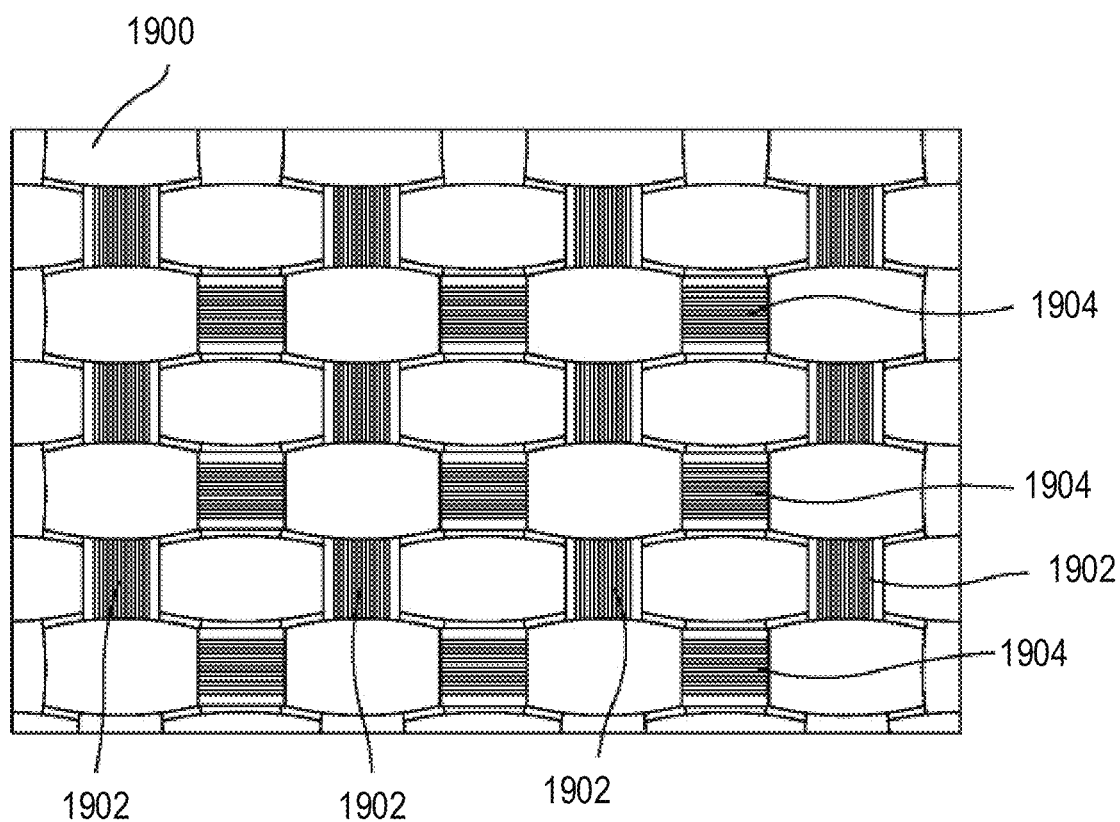
FIG. 19 is an amplified front-view of an example of yet another implementation of an ortho-fabric-material with a first plurality of CNT-fibers and second plurality of CNT-fibers in accordance with the present disclosure.

Similarly, in FIG. 19, a front-view of an example of yet another implementation of an ortho-fabric-material 1900 with a first plurality of CNT-fibers 1902 and second plurality of CNT-fibers 1904 is shown in accordance with the present disclosure. In this example, the first plurality of CNT-fibers 1902 and second plurality of CNT-fibers 1904 are superimposed in a "vertical" weave and "horizontal" weave, insulated by a thin film of insulating-material or fabric-material. The superimposed weaves can be variable and/or different to enhance the electric-field 1322. The individual CNT-fibers of the first plurality of CNT-fibers 1902 and second plurality of CNT-fibers 1904 can be insulated on either side of the individual CNT-fibers.

Figure 20:
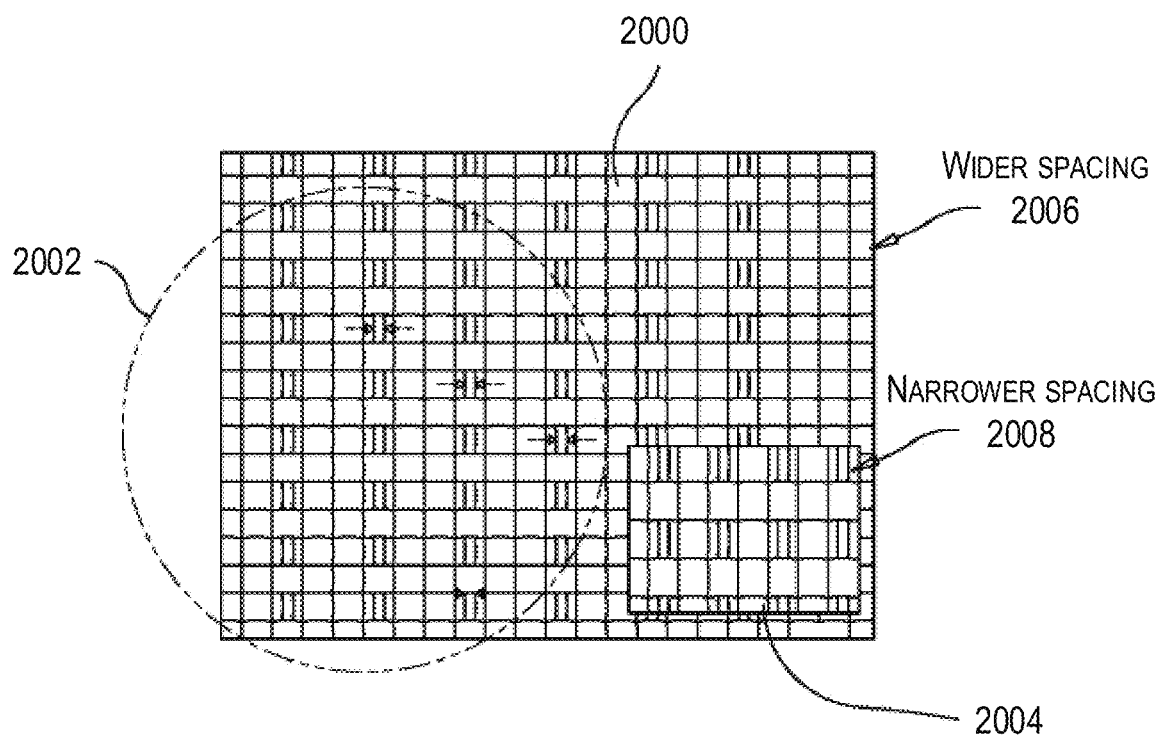
FIG. 20 is a front-view of an example of still another implementation of an ortho-fabric-material with a first plurality of CNT-fibers and second plurality of CNT-fibers in accordance with the present disclosure.

In FIG. 20, a front-view of an example of still another implementation of an ortho-fabric-material 2000 with a first plurality of CNT-fibers 2002 and second plurality of CNT-fibers 2004 is shown in accordance with the present disclosure. In this example, the first plurality of CNT-fibers 2002 and second plurality of CNT-fibers 2004 can have varying spacing and dimensions. The width (e.g., diameter) of the individual CNT-fibers of the first and second plurality of CNT-fibers 2002 and 2004 are not restricted to 90 degrees. The distance between the individual adjacent CNT-fibers of the first and second plurality of CNT-fibers 2002 and 2004 may vary. Additionally, the clustering of the first and second plurality of CNT-fibers 2002 and 2004 may vary with inter-fiber distances having a wider spacing 2006 and a narrow spacing 2008.

Figure 21:
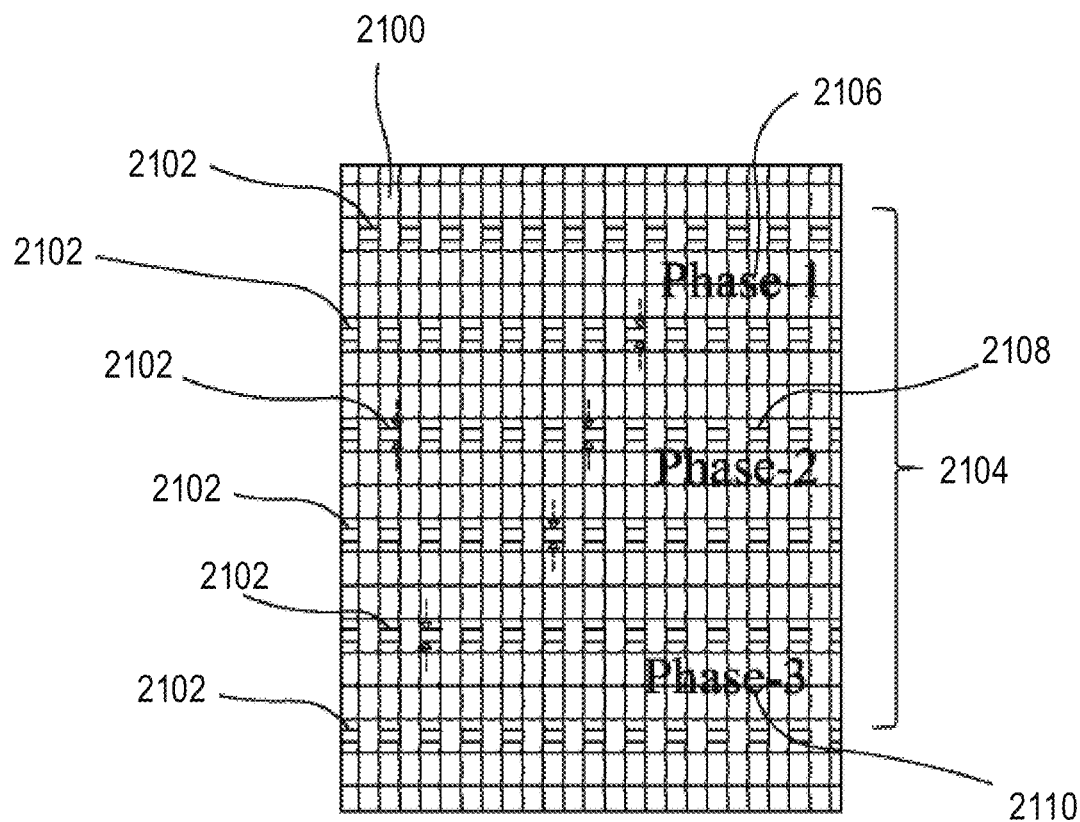
FIG. 21 is a front-view of an example of an implementation of an ortho-fabric-material with a plurality of CNT-fibers driven with multiple electrical waveforms in accordance with the present disclosure.
Figure 22:
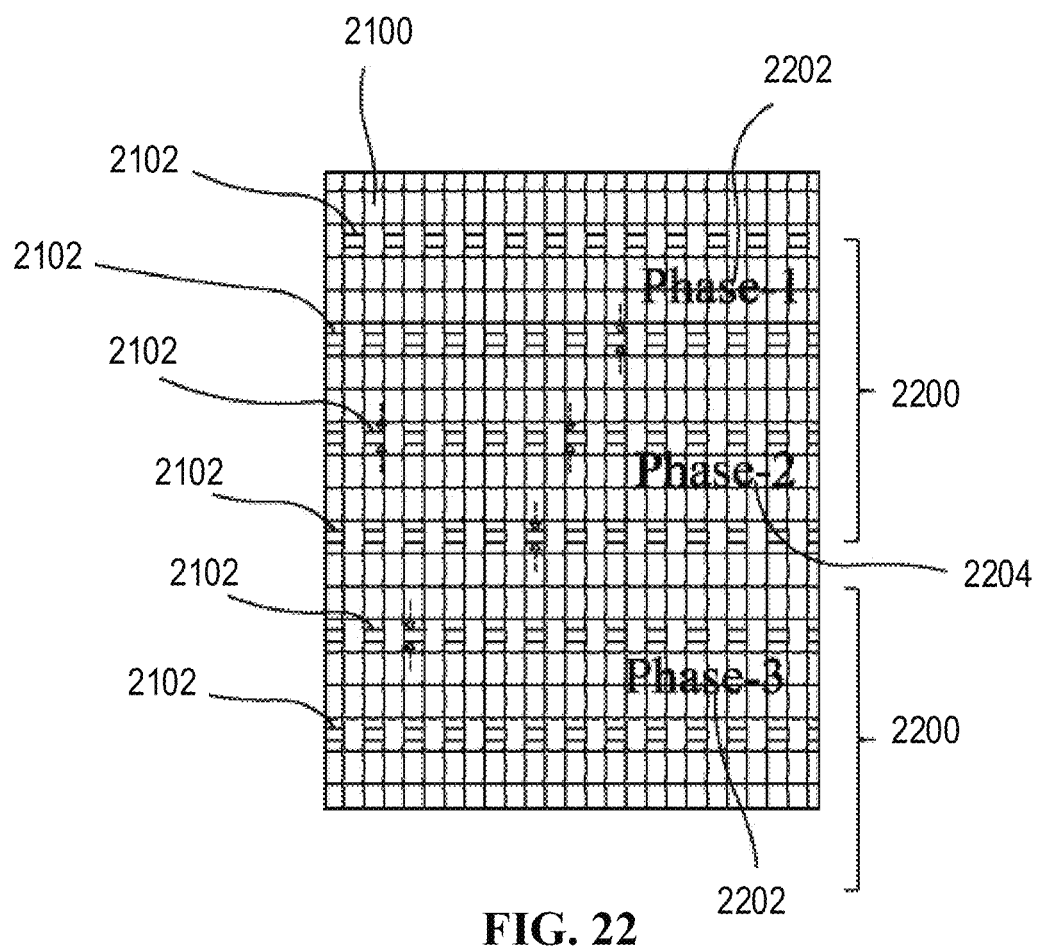
FIG. 22 is a front-view of an example of an implementation of an ortho-fabric-material with a plurality of CNT-fibers driven with another type of multiple electrical waveforms in accordance with the present disclosure.

In FIG. 21, a front-view of an example of an implementation of an ortho-fabric-material 2100 with a plurality of CNT-fibers 2102 driven with multiple electrical waveforms is shown in accordance with the present disclosure. In this example, the plurality of CNT-fibers 2102 are driven by a low-frequency (for example 10 Hz) AC, multi-phase sinusoidal signal 2104 with three-phases among six CNT-fibers (phase-one 2106, phase-two 2108, and phase-three 2110). Similarly, in FIG. 22, a front-view is shown of an example of an implementation of the ortho-fabric-material 2100 with the plurality of CNT-fibers 2102 driven with another type of multiple electrical waveforms in accordance with the present disclosure. In this example, the plurality of CNT-fibers 2102 are driven by a low-frequency (for example 10 Hz) AC, multi-phase sinusoidal signal 2200 with two-phases among four CNT-fibers (phase-one 2202 and phase-two 2204). These examples allow for wider-spectrum waveforms with random spectral components (in the range of 0.1 Hz to 100 Hz) distributed among clusters of CNT-fibers 2102.

Figure 23:
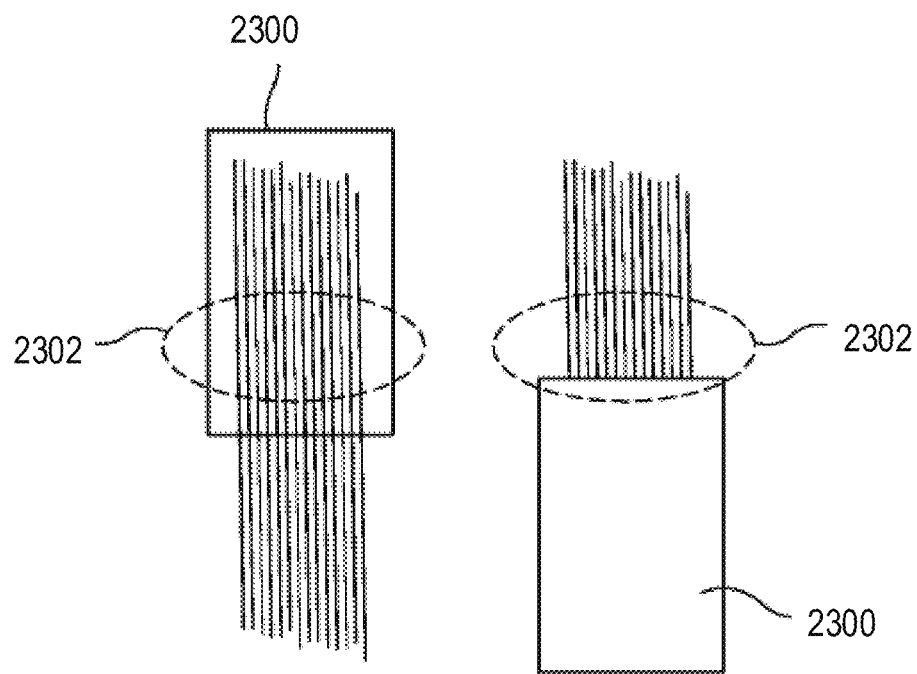
FIG. 23 is a front-view of an example of an implementation of a non-ortho-fabric-material with a plurality of CNT-fibers in accordance with the present disclosure.

In FIG. 23, a front-view of an example of an implementation of a non-ortho-fabric-material 2300 with a plurality of CNT-fibers 2302 is shown in accordance with the present disclosure.

Figure 24:
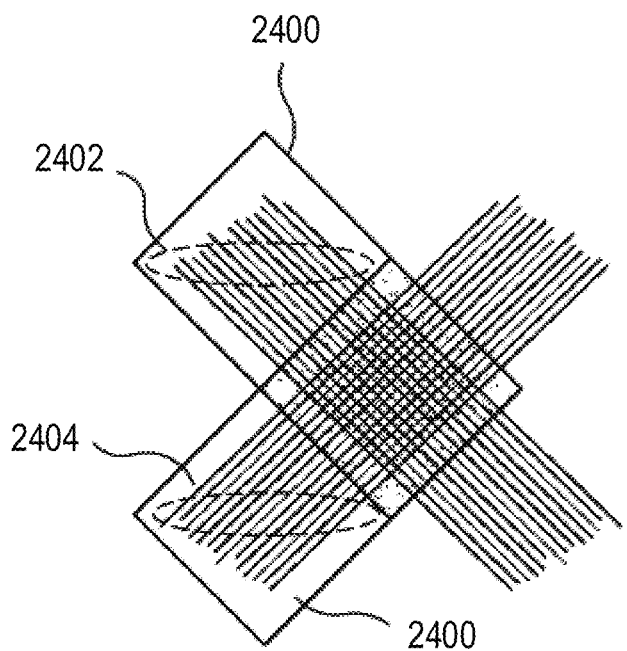
FIG. 24 is a front-view of an example of an implementation of a non-ortho-fabric-material with a plurality of CNT-fibers in accordance with the present disclosure.

In FIG. 24, a front-view of an example of an implementation of a non-ortho-fabric-material 2400 with a plurality of CNT-fibers 2402 and 2404 is shown in accordance with the present disclosure. The non-ortho-fabric-materials 2300 and 2400 can be substrates with ribbons having flexible fibers, oriented fibers of non-conductive material (as example non-conductive polymer), which has the CNT-fibers 2302, 2402, and 2404 embedded at predetermined intervals in a matrix. The ribbons can be stabilized with a backing made of matrix curing material. The non-ortho-fabric-materials 2300 and 2400 can alternatively be charged fabric fibers utilizing charged polymers that allow local enhancement of the electric-field 1322 for complex geometric contours of the assembly. The non-ortho-fabric-materials 2300 and 2400 can also be conductive polymers with embedded CNT-fibers where the fabric-material is composed of two different types of fibers such as one strand of 2-ply that is conductive and one strand that is insulative. In general, materials used in the 1-ply strands and in the first (i.e., non-conductive) side of the two-ply strands should have a dielectric constant that does not significantly diminish the traveling-wave of the electric-field 1322 presented in the first (i.e., nonconductive) side of the fabric-material. Additionally, the spacing, ordering, and pattern of non-conductive and conductive strands and the phasing and frequency of the input-signal-source 1318 may be designed to tailor repelling and dispersing effects on the first (non-conductive) surface of the fabric-material. For example, to repel dust particle sizes between approximately 5 to 300 μm in lunar conditions, the ranges for conductive-fiber width are anticipated to be between approximately 0.5 to 400 μm, conductive-fiber spacing between approximately 0.3 to 4 mm, voltages between approximately 500 to 2,000V, frequency between approximately 5 to 200 Hz, and single to multiphase input signals. These parametric values can increase by a factor of approximately 3 to 5 for Earth applications to account for the effects of gravity, humidity and atmospheric conditions.

Figure 25:
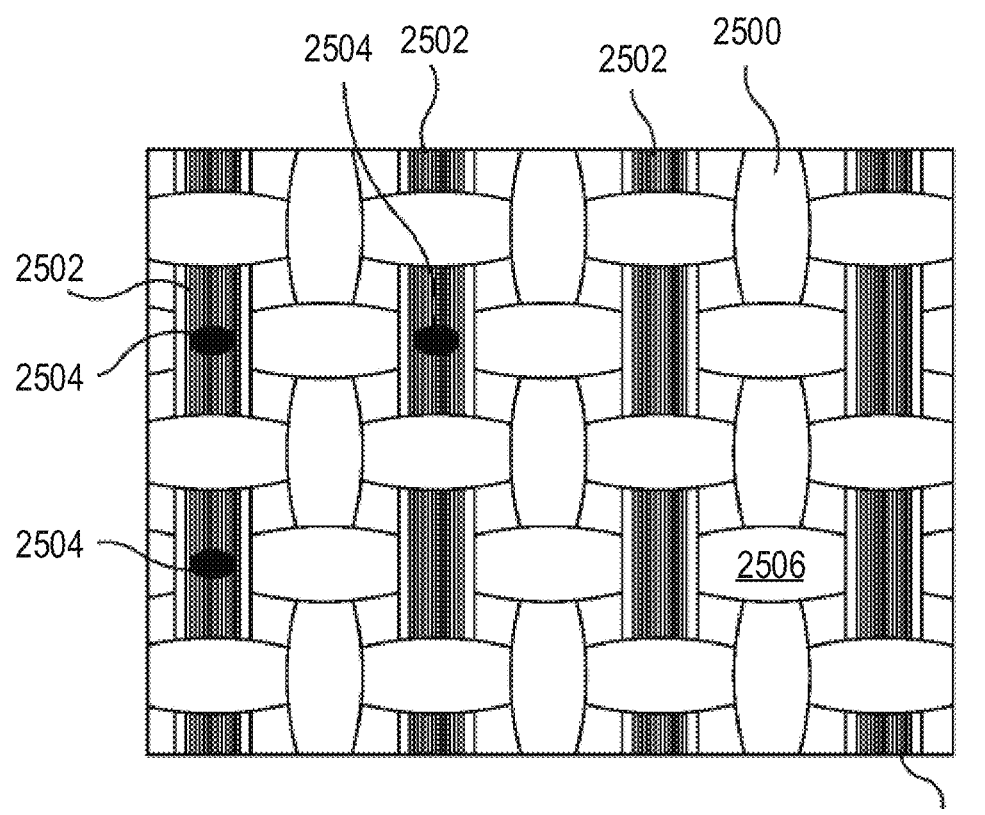
FIG. 25 is a front-view of an example of an implementation of an ortho-fabric-material with a plurality of CNT-fibers and plurality of sensors in accordance with the present disclosure.

Turning to FIG. 25, in FIG. 25 an amplified front-view of an example of an implementation of an ortho-fabric-material 2500 with a plurality of CNT-fibers 2502 and plurality of sensors 2504 is shown in accordance with the present disclosure. The sensors 2504 can be micro-sensors that are attached to the ortho-fabric-material 2500 or embedded within the plurality of CNT-fibers 2502. The sensors 2504 are configured to identify the amount of dust coverage that can then activate the MDMS 1300 with the AC voltage-signal 1316 based on the pre-specified minimum dust coverage value. The sensors 2504 may sense the optical reflectively on the front-surface 2506 of the ortho-fabric-material 2500, change in mass, etc.

Figure 26:
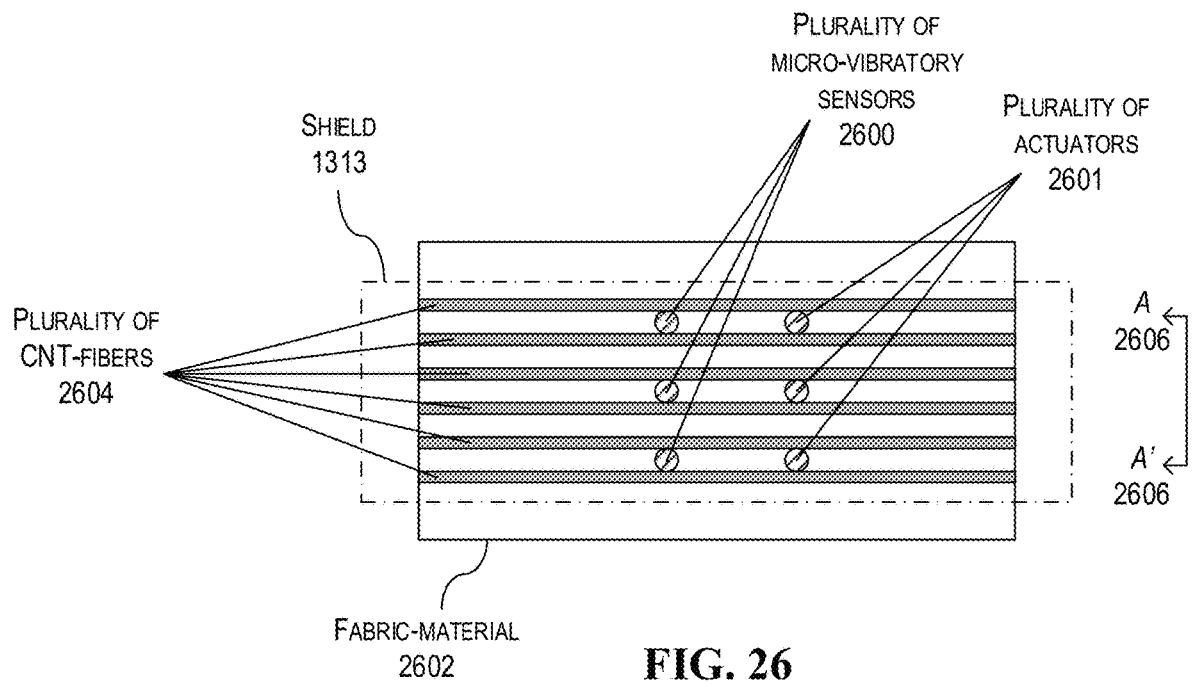
FIG. 26 is a top-view of a system block diagram is shown of an example of an implementation of micro-vibratory sensors and actuators embedded within the fabric-material or within the CNT-fibers that combine mechanical action with the electric-field to enhance dust repelling action of the MDMS.

In FIG. 26, a top-view of a system block diagram is shown of an example of an implementation of a plurality of micro-vibratory sensors 2600 and a plurality of actuators 2601 embedded within the fabric-material 2602 or within the CNT-fibers 2604 (that are woven into the fabric-material 2602) that combine mechanical action with the electric-field 1322 to enhance dust repelling action of the shield 1313 of the MDMS 1300.

Figure 27:
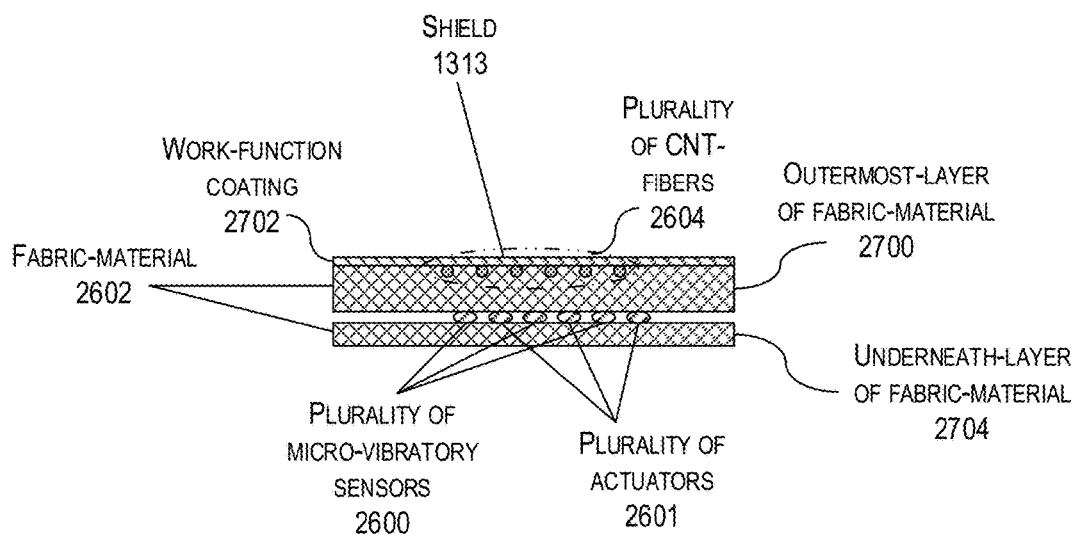
FIG. 27 is a front-view of the system block diagram shown in FIG. 26 of the micro-vibratory sensors embedded within the fabric-material or within the CNT-fibers in accordance with the present disclosure.

In FIG. 27, a front-view (along cutting plane A-A' 2606) is shown of the system block diagram shown in FIG. 26 of the plurality of micro-vibratory sensors 2600 and the plurality of actuators 2601 embedded within the fabric-material 2602 or within the plurality of CNT-fibers 2604 in accordance with the present disclosure. The plurality of CNT-fibers 2604 (i.e., a series of approximately parallel CNT-fibers) are woven into the fabric-material 2602 which, in this example, may be the ortho-fabric-materials of a spacesuit. The fabric-material 2602 has an outermost layer 2700 and on top of the outermost-layer 2700 is a work-function coating 2702. The fabric-material 2602 also includes an underneath-layer 2704 of the fabric-material 2602 underneath the outermost-layer 2700. The plurality of micro-vibratory sensors 2600 and the plurality of actuators 2601 are located between the outermost-layer 2700 and underneath-layer 2704. In this example, the MDMS 1300 combines a passive, electrostatic, and vibratory mechanical action to repel dust off of the shield 1313.

Figure 28:
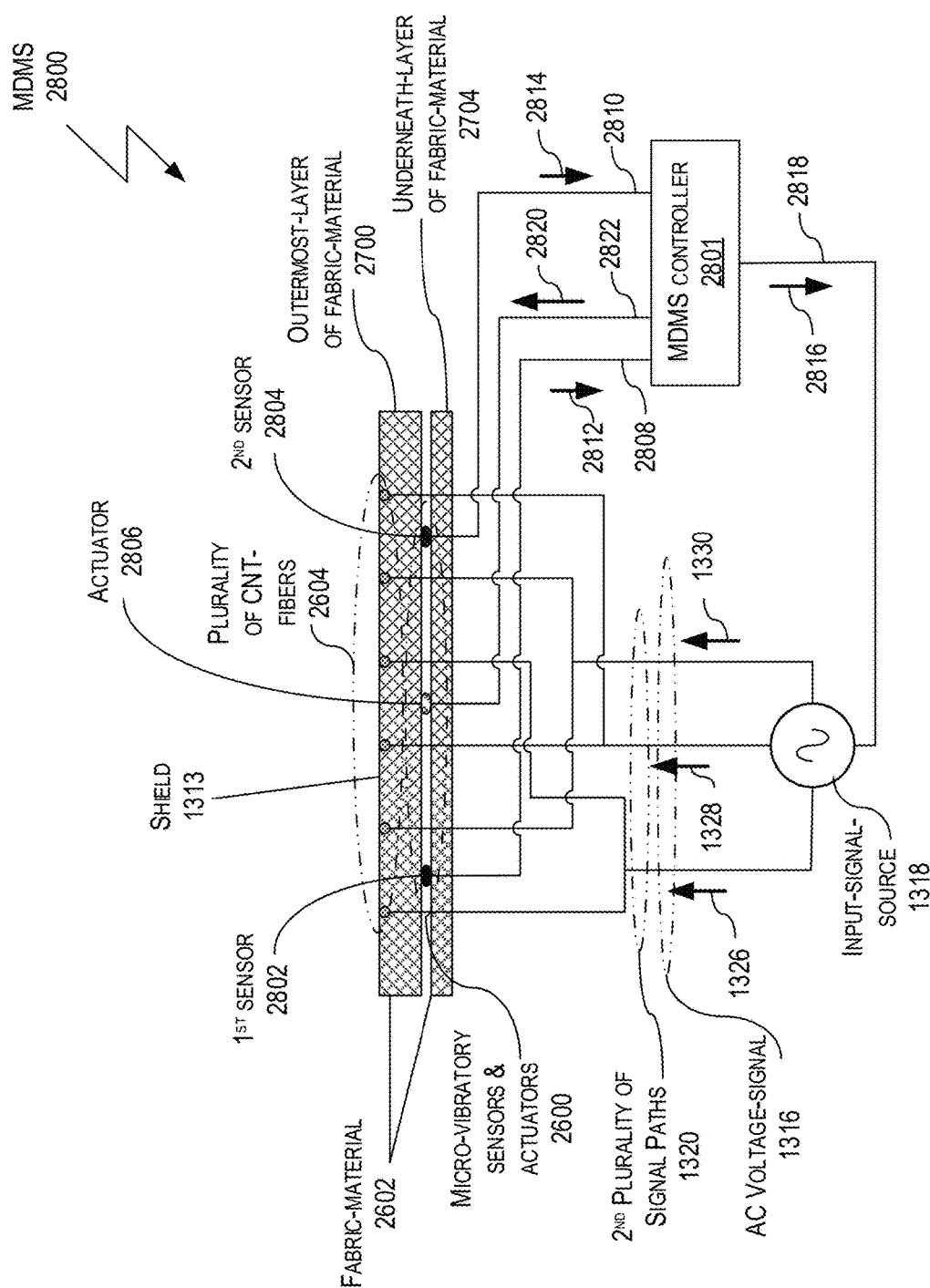
FIG. 28 is a side-view of a system block diagram of an example of an implementation of the MDMS with a MDMS controller and the micro-vibratory sensors and actuators shown of FIGS. 26 and 27 in accordance with the present disclosure.

Turning to FIG. 28, a side-view is shown of a system block diagram of an example of an implementation of the MDMS 2800 with a MDMS controller 2801 and the micro-vibratory sensors and actuators 2600 (shown in FIGS. 26 and 27) in accordance with the present disclosure. This example is similar to the example shown in FIG. 13A with the added elements of a first sensor 2802, a second sensor 2804, and an actuator 2806 within the micro-vibratory sensors and actuators 2600, and the MDMS controller 2801. In this example, as described earlier, the MDMS controller 2801 can be any general electronic controller that can include a microcontroller, a CPU based processor, DSP, an ASIC, FPGA, or other similar device or system. The first sensor 2802 and second sensor 2804 are devices capable of identifying the amount of dust particle 1332 coverage on the shield 1313 and then provide that information to the MDMS controller 2801, which is in signal communication with the first and second sensors 2802 and 2804 via signal paths 2808 and 2810, respectively. The first and second sensors 2802 and 2804 can be micro-sensors that are powered by a MDMS power supply (not shown) or by harvesting the mechanical energy from the motion of the wearer of the MDMS 2800. The first and second sensors 2802 and 2804 determine the amount of dust particle 1332 coverage on the shield 1313 and provide that information to the MDMS controller 2801 via sensor data signals 2812 and 2814 that are transmitted to the MDMS controller 2801 via the signal paths 2808 and 2810, respectively. Once received by the MDMS controller 2801, the MDMS controller 2801 then determines if the AC voltage-signal 1316 needs to be adjusted to change the characteristics of the electric-field 1322 on the shield 1313 to remove the dust particle 1332 on the shield 1313. If the AC voltage-signal 1316 needs to be adjusted, the MDMS controller 2801 sends an adjustment signal 2816 to the input-signal-source 1318 via signal path 2818. Once received, the input-signal-source 1318 modifies the waveform and/or frequency of the AC voltage-signal 1316 (in response to the adjustment signal 2816) provided to the plurality of conductive-fibers 1308 to optimize the dust mitigation properties of the MDMS 2800. In addition, the MDMS controller 2801 can provide an actuation signal 2820 to the actuator 2806 via signal path 2822. Once received, the actuator 2806 will begin to provide mechanical work (e.g., vibrational energy) to the outermost-layer 2700 of the fabric-material 2602 to assist in dislodging and/or removing the dust particles 1332 from the shield 1313. In this example, the actuator 2806 may be a piezoelectric device (such as, for example, a micro-vibratory device) or some strands (not shown) within some of the conductive-fibers 1308. The actuator 2806 may operate under the control of the MDMS controller 2801, from inputs from the first and second sensors 2802 and 2804, or other control devices external to the MDMS 2800. Similar to the first and second sensors 2802 and 2804, the actuator 2806 can be powered by the MDMS power supply (not shown) or by harvesting the mechanical energy from the motion of the wearer of the MDMS 2800.

In this example it is noted that only two sensors 2802 and 2804 and one actuator 2806 are shown for convenience in the illustration of FIG. 28. It is appreciated, that this is not a limitation and the MDMS 2800 can include a plurality of sensors and a plurality of actuators below the outermost-layer 2700 of the fabric-material 2602 without limitation.

Another application for the MDMS 2800 utilizing one or more actuators is the ability to remove sacrificial coatings (e.g., temporary or peel able solar-fabric, camouflage-fabric, coating needed for optical properties, water repellant, anti-radar, etc.) by producing high-frequency vibration or low-frequency curving with the plurality of actuators so assist to peel off of any sacrificial coatings from the front-surface of the fabric-material 2602.

In addition to sensors and actuators, the MDMS 2800 can also include one or more micro-heaters (not shown) that are utilized to assist in the dust mitigation process or personal heating. The micro-heaters may be utilized to increase the resistivity of the plurality of conductive-fibers 1308 or to provide heat to wearer of the MDMS 2800 via heating the plurality of conductive-fibers 1308. In the example of CNT-fibers for the plurality of conductive-fibers 1308, the micro-heaters may be implemented as part of the plurality of conductive-fibers 1308 that can be implemented either on the outermost-layer 2700 of the fabric-material 2602 or as a secondary plurality of conductive-fibers (not shown) in the underneath-layer 2704 of the fabric-material 2602. The micro-heaters are configured to produce a temperature on, or in, the fabric-material 2602 that can be controlled by the MDMS controller 2801 or by direct inputs from the sensors within the fabric-material 2602. The micro-heaters can be powered by the MDMS power supply.

It is further noted that the plurality of conductive-fibers 1308 can also be utilized for radiation protection of the MDMS 2800. In this example, the weave patterns of the plurality of conductive-fibers 1308 is optimized and the input-signal-source 1318 produces AC voltage-signals 1316 that generate an electric-field that repels electrons, protons, or both. This application will utilize higher frequencies than the dust repellent application of the MDMS 2800 and can be superimposed on the plurality of conductive-fibers 1308 to produce multiple types of waveforms with wider spectral range in a dual-use implementation. As an example, the patterns of the conductive-fibers may be varied to create different zones of spatial patterns of the conductive-fibers where the spatial separation of the conductive-fibers vary from zone-to-zone and the spatial separation of the applied waveforms of the AC voltage-signals vary from zone-to-zone.

Moreover, the plurality of conductive-fibers 1308 can also be utilized for energy harvesting where the MDMS 2800 can be incorporated in the fabric-materials of spacesuits, mountaineering clothing and equipment, and government and military suits and devices. In general, the plurality of conductive-fibers 1308 can be tuned to operate in the frequencies for dust mitigation and a second frequency (or frequencies) for receiving ambient electromagnetic energy that may be rectified into harvested into received electrical power. In addition, in the case of CNT-fibers for the conductive-fibers, piezoelectric elements can be embedded within the CNT-fibers or the fabric-material to harvest mechanical energy from the movement of the wearer and transform it into electrical power. Furthermore, the CNT-fibers can be configured to receive ambient thermal energy (e.g., external heat-energy, radiation from the Sun, heat from the body of the wearer) which is converted to electrical power via the CNT-fibers acting as thermoelectric converters.

Moreover, the plurality of conductive-fibers 1308 may also be utilized for anti-jamming applications in wearable communication systems or systems utilizing fabric-materials such as, for example, an antenna utilizing a fabric-material. In this case, the fabric-material and plurality of conductive-fibers can utilized in combination with a fabric based antenna system that may be part of a wearable communication system by utilizing CNT-fibers for the conductive-fibers. In this example, the CNT-fibers may operate as sensors capable of detecting a jamming signal or the MDMS 2800 can also include embedded electric-field sensors capable of detecting the jamming signal. Once a jamming signal is detected, the MDMS 2800 may include additional devices, components, or systems capable of producing an anti-jamming AC voltage-signal with a higher frequency than the frequencies produced by the MDMS 2800 to mitigate the dust from the shield. In order to produce these anti-jamming AC voltage-signals, the MDMS controller 2801 may be in signal communication with an external communication system.

Figure 29A:
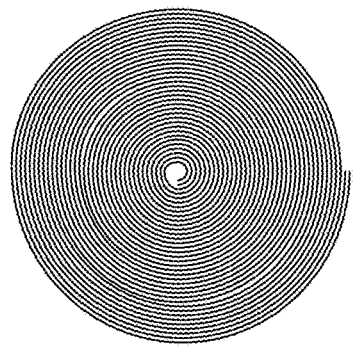
FIG. 29A is a front-view of an example of a first implementation of a printed flexible conductor and conductive-fiber pattern for use with the MDMS in accordance with the present disclosure.
Figure 29B:
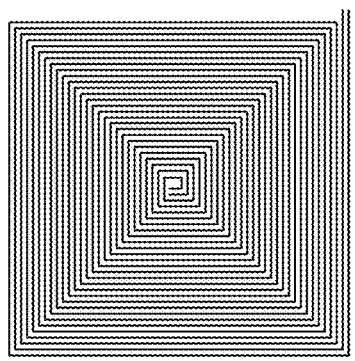
FIG. 29B is a front-view of an example of a second implementation of a printed flexible conductor and conductive-fiber pattern for use with the MDMS in accordance with the present disclosure.
Figure 29C:
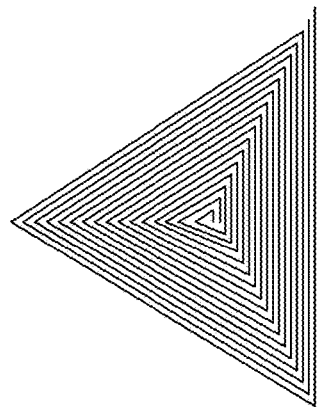
FIG. 29C is a front-view of an example of a third implementation of a printed flexible conductor and conductive-fiber pattern for use with the MDMS in accordance with the present disclosure.
Figure 29D:
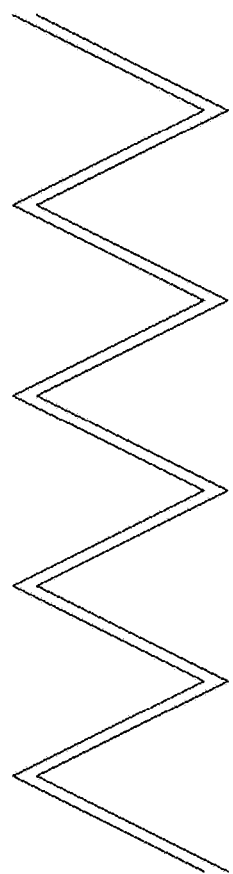
FIG. 29D is a front-view of an example of a fourth implementation of a printed flexible conductor and conductive-fiber pattern for use with the MDMS in accordance with the present disclosure.

Turning to FIGS. 29A, 29B, 29C, and 29D, front-views of examples of different implementations of printed flexible conductor and/or conductive-fiber patterns are shown for use with the MDMS 1300 in accordance with the present disclosure. The patterns may be placed on the fabric-material and in signal communication with an active controller (i.e., the MDMS controller) to better control dust repelling action. The various shapes provide varying optimizing dust repelling and particle collection actions. The printed patterns may be then attached to a flexible-material, fabric-material, and/or surface of the appropriate dielectric properties. In these examples, FIG. 29A shows approximately parallel spirals, FIG. 29B shows approximately parallel concentric rectangles, FIG. 29C shows approximately parallel concentric triangles, and FIG. 29D shows approximately parallel zig-zags. In this example, the approximately parallel concentric triangles shown in FIG. 29C can be implemented on tips of the fingers (of the finger section 302) to intensify the electric-field at the pointed corners of the fingers (i.e., sections 330, 332, 334, 336, and 338). Moreover, the parallel zig-zags orientation (shown in FIG. 29D) of the conductive-fibers may also be utilized on the inner finger surface 312.

It is appreciated by those of ordinary skill in the art that while most of the examples in this disclosure have been directed to spacesuits, gloves, and mitts, the disclosure also applies to other types of devices that utilizes flexible-material or fabric-material such as electric fences, dust protection systems for wearable communication, radiation protection, thermal protection, umbrella antennas, tents, canopy surfaces, flexible solar collectors, flexible solar cells, self-cleaning antennas, deployable structures, inflatables, CNT-fiber embedded devices with piezoelectric-mechanical motion for mountaineering, etc.

As an example of operation, a few ortho-fabric-material test coupons of approximately three inches by three inches were applied with multiple configuration of MDMS 1300 to test the use of CNT-fibers as electrodes and the resulting dust removal capability when the electrodes were applied with a multi-phase AC voltage-signal.

Figure 30:
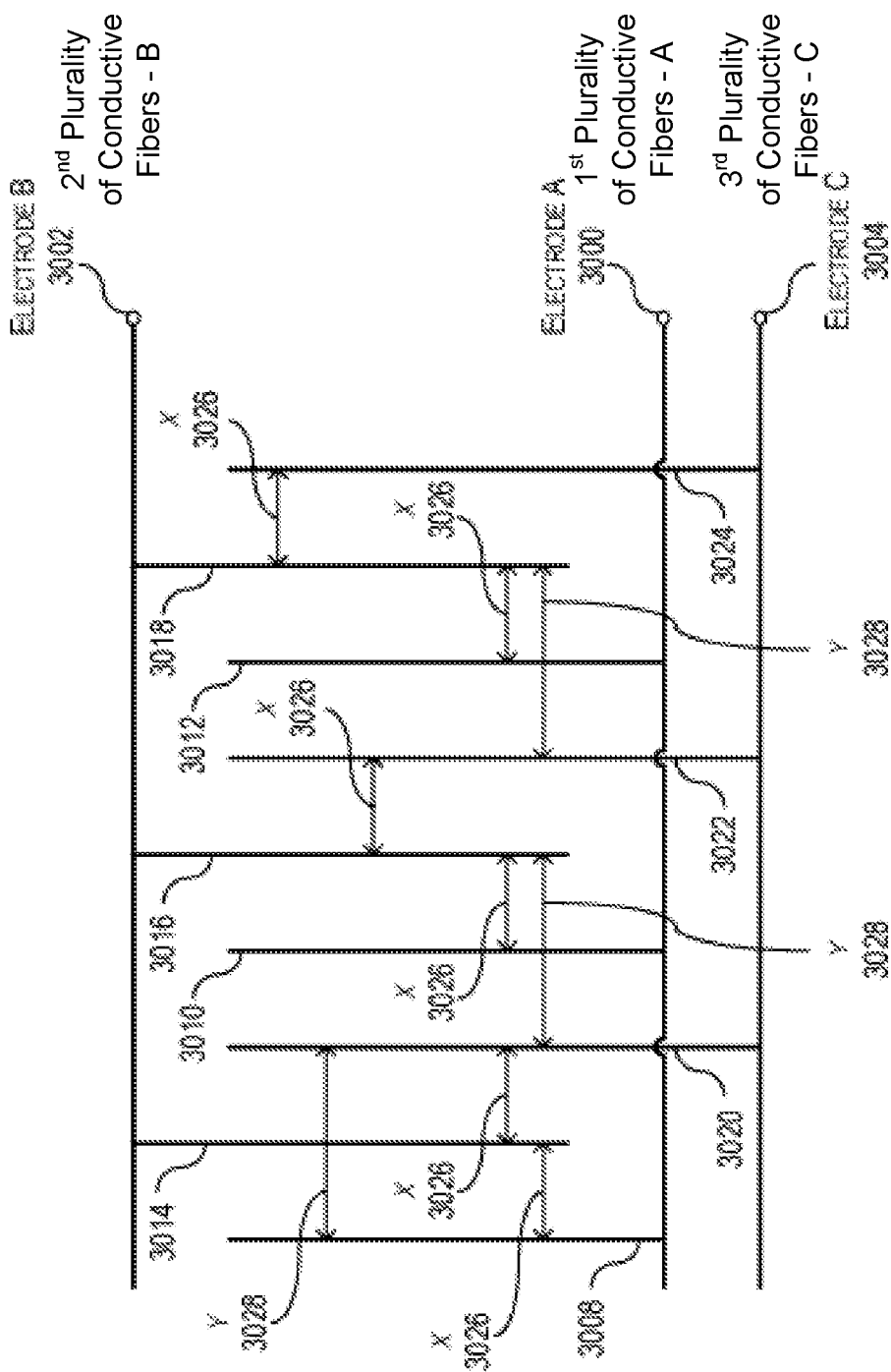
FIG. 30 is a circuit diagram of an example of an implementation of the electrodes of the MDMS in accordance with the present disclosure.

FIG. 30 is a circuit diagram of an example of an implementation of the electrodes of the MDMS 1300 in accordance with the present disclosure. In this example, three electrodes are shown as electrode A 3000, electrode B 3002, and electrode C 3004. Each of the electrodes can be in signal communication with a sub-pluralities of the conductive-fibers on the fabric-material 1302. As an example and for purpose of simplicity of illustration, electrode A 3000 is shown in signal communication a first plurality of conductive-fibers that are shown a three conductive-fibers 3008, 3010, and 3012. Similarly, electrode B 3002 is shown in signal communication with a second plurality of conductive-fibers that are shown a three conductive-fibers 3014, 3016, and 3018 and electrode C 3004 is shown in signal communication with a third plurality of conductive-fibers that are shown a three conductive-fibers 3020, 3022, and 3024. In this example, the location of the individual conductive-fibers may be utilized, in combination with the input-signal-source, to either remove dust particles of a given size or to collect those particles. The location of the individual conductive-fibers resulting in spacing between the individual conductive-fibers that may be utilized to discriminate between particle sizes. In this example, the spacing between the conductive-fibers of the electrode A 3000 and electrode B 3002 is distance x 3026. Moreover, the spacing between the conductive-fibers of the electrode B 3002 and electrode C 3006 is also distance x 3026. The spacing between the conductive-fibers of the electrode A 3000 and electrode C 3006 is a larger distance y 3028. In this example, the distances x 3026 and y 3028 can be utilized to discriminate between particle sizes. As an example, when particles having a size about the distance x 3026 are desired, the MDMS controller can energize the three electrodes (i.e., electrode A 3000, electrode B 3002, and electrode C 3004) by directing the input-signal-source 1318 to drive the three electrodes with a three-phase (i.e., 120 degree phase shifted) signal. If, instead, particles having a size about the distance y 3028 are desired, the MDMS controller may only energize the electrode A 3000 and electrode C 3004 by directing the input-signal-source 1318 to drive the electrode A 3000 and electrode C 3004 with a two-phase (i.e., 180 degree phase shifted) signal. Alternatively, if a standing-wave electric-field is desired, the MDMS controller may only energize the electrode A 3000 and electrode C 3004 by directing the input-signal-source 1318 to drive the electrode A 3000 is a sinusoidal signal by directing the input-signal-source 1318 to drive the electrode A 3000 with, for example, a signal equal to $V_p \sin(\omega t)$, where $V_p$ is the amplitude of the voltage applied (as described earlier), $\omega$ is the angular frequency of the signal in radians and t is time. In this example, electrode B 3002 and electrode C 3004 are set to zero.

In this example, the electrode A 3000, electrode B 3002, and electrode C 3004 can receive phase-shifted signals from the input-signal-source that may vary based on the different input signals and configuration of the conductive-fibers. For example, the input-signal-source can produce a 120 degree phase shift for a three phase signal, 90 degrees phase shift for a four phase signal, 180 degree phase shift for a two phase signal, etc.

Figure 31:
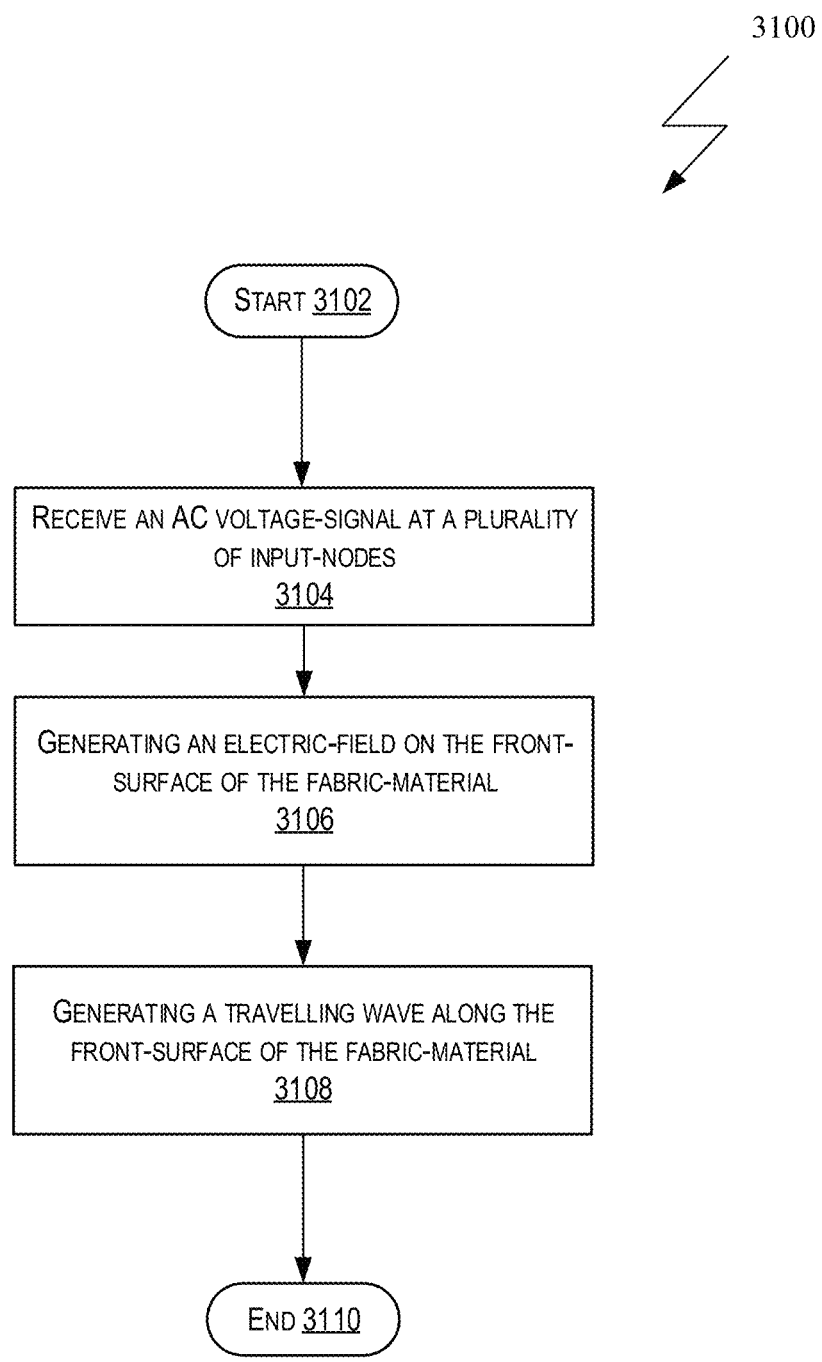
FIG. 31 is a flowchart illustrating an example of an implementation of a method of dust mitigation performed by the MDMS in operation in accordance with the present disclosure.

In FIG. 31, a flowchart is shown illustrating an example of an implementation of a method 3100 of dust mitigation performed by the MDMS 1300 in operation in accordance with the present disclosure. In this example, the MDMS 1300 will be assumed to be the MDMS 1300 shown in FIG. 13.

The method 3100 begins 3102 by receiving 3104 an AC voltage-signal from an input-signal-source at the plurality of input-nodes and generating 3106 an electric-field on the front-surface of the fabric-material with the plurality of conductive-fibers. The method 3100 further includes generating 3108 a traveling-wave, from the electric-field, that travels along the front-surface of the fabric-material in a second direction that is approximately transverse to the first direction (i.e., the traveling-wave travels perpendicular to the direction of the length of the conductive-fibers) and then the method 3100 ends 3110.

In this example, receiving 3104 the AC voltage-signal can include receiving at least one sensor data signal from at least one sensor within the fabric-material, where the sensor data signal indicates if any dust particles are on a shield of the MDMS and producing the AC voltage-signal based in response to receiving the at least one sensor data signal. Moreover, the method 3100 can further include producing a vibration on the fabric-material based on the at least one sensor data signal.

Figure 32:
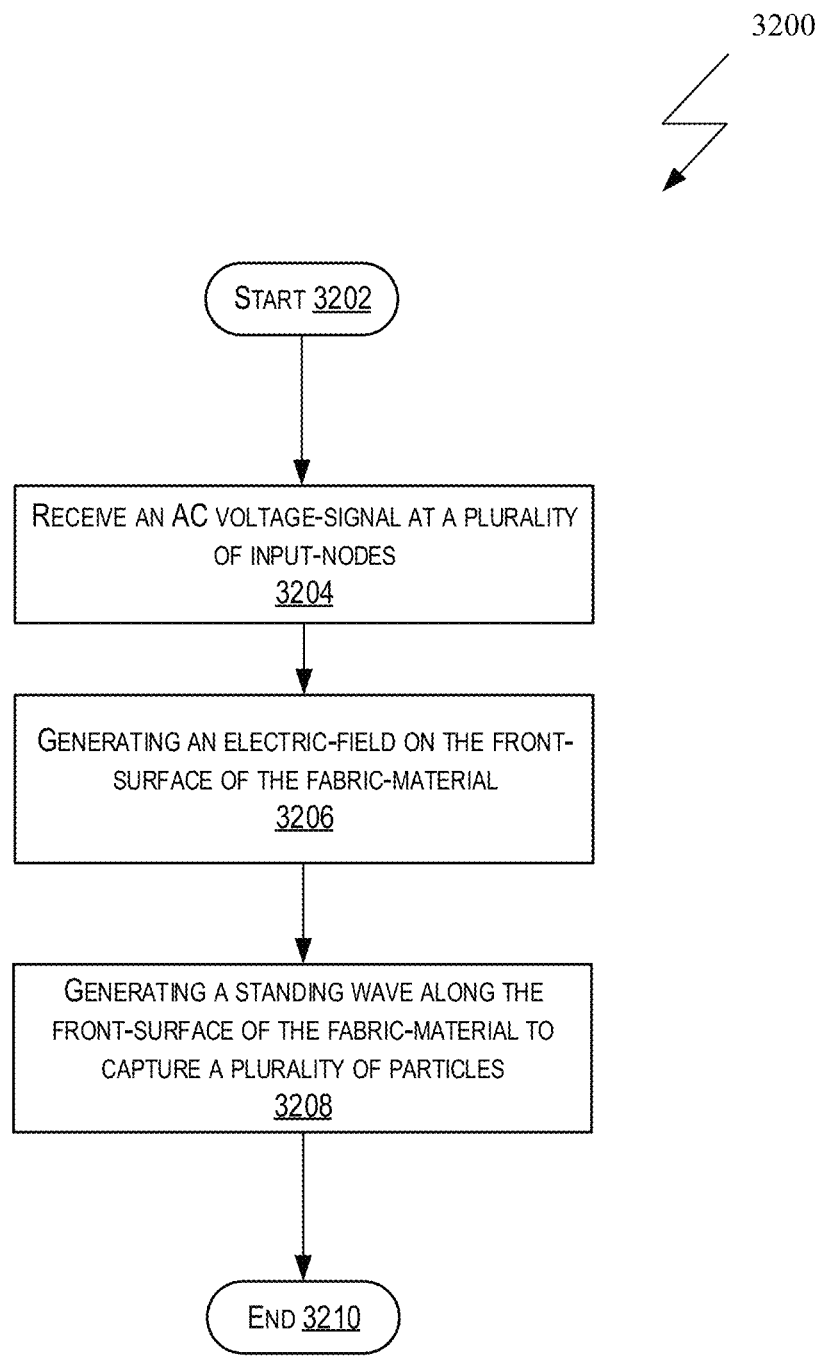
FIG. 32 is a flowchart illustrating an example of an implementation of a method of particle collection performed by the MDMS in operation in accordance with the present disclosure.

Turning to FIG. 32, a flowchart is shown illustrating an example of an implementation of a method 3200 of particle collection performed by the MDMS in operation in accordance with the present disclosure. Again, in this example, the MDMS 1300 will be assumed to be the MDMS 1300 shown in FIG. 13.

The method 3200 begins 3202 receiving 3204 an AC voltage-signal from an input-signal-source at the plurality of input-nodes and generating 3206 an electric-field on the front-surface of the fabric-material with the plurality of conductive-fibers. The method 3200 further includes generating 3208 a standing-wave, from the electric-field, along the front-surface of the fabric-material to capture a plurality of particles and then the method 3100 ends 3210. In this example, the plurality of conductive-fibers can include a first sub-plurality of conductive-fibers, a second sub-plurality of conductive-fibers, and a third sub-plurality of conductive-fibers. Moreover, generating 3206 the electric-field on the front-surface of the fabric-material with the plurality of conductive-fibers may include having the MDMS controller selectively cause the input-signal-source to produce a phase shift of approximately 120 degrees between the first sub-plurality of conductive-fibers, second sub-plurality of conductive-fibers, and third sub-plurality of conductive-fibers if the AC voltage-signal is a two-phase signal. The MDMS controller may also selectively cause the input-signal-source to produce a phase shift of approximately 180 degrees between the first sub-plurality of conductive-fibers and the third sub-plurality of conductive-fibers. If the AC voltage-signal is a four-phase signal, generating 3206 the electric-field on the front-surface of the fabric-material with the plurality of conductive-fibers can include producing a phase shift of approximately 90 degrees between the first sub-plurality of conductive-fibers, second sub-plurality of conductive-fibers, and third sub-plurality of conductive-fibers.

It will be understood that various aspects or details of the implementations may be changed without departing from the scope of the disclosure. It is not exhaustive and does not limit the claimed disclosure to the precise form(s) disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure.

What is claimed is:

1. A Multi-use Dust Mitigation System (MDMS) comprising:
   a finger section;
   a hand section physically attached to the finger section;
   a fabric-material within both the finger section and hand section, wherein the fabric-material includes
      a front-surface and
      a back-surface;
   a plurality of conductive-fibers within the fabric-material, wherein the plurality of conductive-fibers are approximately parallel along the fabric-material and are approximately adjacent to the front-surface of the fabric-material; and
   a plurality of input-nodes approximately adjacent to the fabric-material,
      wherein the plurality of input-nodes are
      in signal communication with the plurality of conductive-fibers and
      configured to receive an alternating-current (AC) voltage-signal from an input-signal-source, and
   wherein the plurality of conductive-fibers are configured to generate an electric-field on the front-surface of the fabric-material in response to the plurality of input-nodes receiving the AC voltage-signal from the input-signal-source.

2. The MDMS of claim 1, wherein the plurality of conductive-fibers are a plurality of carbon nanotube (CNT) fibers.

3. The MDMS of claim 1,
   wherein the hand section includes
      a palm section and
      an opisthenar section,
   wherein the finger section includes
      an internal finger surface and
      an external finger surface,
   wherein the plurality of conductive-fibers within the fabric-material are located in the palm section and internal finger surface,
      opisthenar section and external finger surface, or
      both the palm section and internal finger surface and opisthenar section and external finger surface.

4. The MDMS of claim 3,
   wherein plurality of conductive-fibers are approximately parallel along the fabric-material in a first direction,
   wherein the plurality of conductive-fibers are configured
      to generate a traveling-wave, from the electric-field, that travels along the front-surface of the fabric-material in a second direction that is approximately transverse to the first direction or
      wherein the plurality of conductive-fibers are configured to generate a standing-wave, from the electric-field, along the front-surface of the fabric-material in the second direction that is approximately transverse to the first direction.

5. The MDMS of claim 3,
   wherein the plurality of conductive-fibers include a first sub-plurality of conductive-fibers located within the hand section and a second sub-plurality of conductive-fibers located within the finger section,
   wherein the finger section is
      configured as a mitt having a first finger section that is and a second finger section or
      includes five finger sub-sections.

6. The MDMS of claim 5,
   wherein the second sub-plurality of conductive-fibers are approximately parallel along the finger section, and
   wherein the first sub-plurality of conductive-fibers are approximately parallel along the hand section or are approximately parallel spirals.

7. The MDMS of claim 6,
   wherein the palm section includes top palm section, middle palm section, and side palm section, and
   wherein the first sub-plurality of conductive-fibers includes
      a first portion of the first sub-plurality of conductive-fibers that are located within the top palm section and are approximately parallel along a first direction,
      a second portion of the first sub-plurality of conductive-fibers that are located within the middle palm section and are approximately parallel along the first direction, and
      a third portion of the first sub-plurality of conductive-fibers that are located within the side palm section and are approximately parallel along the first direction.

8. The MDMS of claim 3,
   wherein the palm section includes top palm section, middle palm section, and side palm section, and
   wherein the plurality of conductive-fibers includes
      a first sub-plurality of conductive-fibers that are located within the top palm section and are approximately parallel along a third direction,
      a second sub-plurality of conductive-fibers that are located within the middle palm section and are approximately parallel along a fourth direction, and
      a third sub-plurality of conductive-fibers that are located within the side palm section and are approximately parallel along a fifth direction.

9. The MDMS of claim 3,
   wherein the palm section includes top palm section, middle palm section, and side palm section, and
   wherein the plurality of conductive-fibers
      a first sub-plurality of conductive-fibers that are located within the top palm section and are approximately parallel first spirals,
      a second sub-plurality of conductive-fibers that are located within the middle palm section and are approximately parallel second spirals, and
      a third sub-plurality of conductive-fibers that are located within the side palm section and are approximately parallel third spirals.

10. The MDMS of claim 3,
    wherein the palm section includes top palm section, middle palm section, and side palm section, and
    wherein the plurality of conductive-fibers includes
       a first sub-plurality of conductive-fibers that are located within the top palm section and are approximately parallel along a first direction, a second sub-plurality of conductive-fibers that are located within the middle palm section and are approximately parallel spirals, and a third sub-plurality of conductive-fibers that are located within the side palm section and are approximately parallel.

11. The MDMS of claim 1, further including
a weave of the fabric-material, wherein the fabric-material includes
a plurality of fabric-material welt threads,
a plurality of fabric-material warp threads, and
a plurality of insulating threads,
a sub-weave of the weave of the fabric-material, wherein the sub-weave includes the plurality of conductive-fibers, the plurality of insulating threads, and the plurality of fabric-material welt threads, wherein the plurality of insulating threads are spaced in-between the plurality of conductive-fibers.

12. The MDMS of claim 11, wherein the plurality of conductive-fibers are configured as a series of approximately parallel plurality of conductive-fibers along the fabric-material in a first direction.

13. The MDMS of claim 1, further including an input-signal-source in signal communication with the plurality of conductive-fibers, wherein the input-signal-source is a multi-phase input-signal-source.

14. The MDMS of claim 13, further including a MDMS controller in signal communication with the input-signal-source, wherein the MDMS controller is configured to selectively cause the input-signal-source to produce a single phase AC signal that is transmitted to the plurality of conductive-fibers to generate a standing-wave or cause the input-signal-source to produce a multi-phase signal that is transmitted to the plurality of conductive-fibers to generate a traveling-wave.

15. The MDMS of claim 14, wherein the MDMS controller is further configured to selectively cause the input-signal-source to produce a variable phase shift in the multi-phase signal, the multi-phase signal with a variable voltage waveform, and the multi-phase signal with a variable phase for individual conductive-fibers within the plurality of conductive-fibers.

16. The MDMS of claim 15,
wherein the plurality of conductive-fibers include
a first sub-plurality of conductive-fibers,
a second sub-plurality of conductive-fibers, and
a third sub-plurality of conductive-fibers,
wherein the MDMS controller is configured to selectively cause the input-signal-source to
produce a phase shift of approximately 120 degrees between the first sub-plurality of conductive-fibers, second sub-plurality of conductive-fibers, and third sub-plurality of conductive-fibers and
produce a phase shift of approximately 180 degrees between the first sub-plurality of conductive-fibers and third sub-plurality of conductive-fibers.

17. The MDMS of claim 13,
wherein the input-signal-source is configured to produce the AC voltage-signal having a plurality of AC phased-signals that are transmitted to the plurality of input-nodes and
wherein a voltage, frequency, and phase of each AC phased-signal, of the plurality of AC phased-signals, is fixed or individually varied by a MDMS controller.

18. The MDMS of claim 17, further including
a plurality of sensors within the fabric-material,
wherein the plurality of sensors produce a plurality of sensor data signals,
wherein the plurality of sensors are in signal communication with the MDMS controller, and
wherein the MDMS controller is configured to receive the plurality of sensor data signals and, in response, adjust the voltage, frequency, and phase of each AC phased-signal, of the plurality of AC phased-signals.

19. The MDMS of claim 18, further including a plurality of actuators within the fabric-material.

20. The MDMS of claim 19,
wherein the actuators are in signal communication with the MDMS controller and
wherein the MDMS controller is configured to produce an actuation signal that is transmitted to the plurality of actuators in response to the MDMS receiving the plurality of sensor data signals.

21. A method for dust mitigation utilizing a Multi-use Dust Mitigation System (MDMS), wherein the MDMS includes a finger section, a hand section physically attached to the finger section, a fabric-material within both the finger section and hand section, wherein the fabric-material includes a front-surface and a back-surface, a plurality of conductive-fibers within the fabric-material approximately parallel along the fabric-material and approximately adjacent to the front-surface of the fabric-material, and a plurality of input-nodes in signal communication with the plurality of conductive-fibers, the method comprising:
receiving an alternating-current (AC) voltage-signal from an input-signal-source at the plurality of input-nodes; and
generating, by the plurality of conductive-fibers, an electric-field on the front-surface of the fabric-material with the plurality of conductive-fibers in response to the plurality of input-nodes receiving the AC voltage-signal from the input-signal-source.

22. The method of claim 21, wherein the plurality of conductive-fibers extend in a first direction along the fabric-material,
wherein the method further comprises generating a traveling-wave, from the electric-field, that travels along the front-surface of the fabric-material in a second direction that is approximately transverse to a first direction,
wherein receiving the AC voltage-signal includes:
receiving at least one sensor data signal from at least one sensor within the fabric-material, wherein the sensor data signal indicates if any dust particles are on a shield of the MDMS and
producing the AC voltage-signal based in response to receiving the at least one sensor data signal.

23. The method of claim 22, further including producing a vibration on the fabric-material based on the at least one sensor data signal.

24. The method of claim 21, further comprising
generating a standing-wave, from the electric-field, along the front-surface of the fabric-material to capture a plurality of particles.

25. The method of claim 24,
wherein the plurality of conductive-fibers include
a first sub-plurality of conductive-fibers,
a second sub-plurality of conductive-fibers, and
a third sub-plurality of conductive-fibers,
wherein generating the electric-field on the front-surface of the fabric-material with the plurality of conductive-fibers includes producing a phase shift of approximately 120 degrees between the first sub-plurality of conductive-fibers, second sub-plurality of conductive-fibers, and third sub-plurality of conductive-fibers.

\* \* \* \* \*